United States Patent
Ikeda et al.

(10) Patent No.: US 10,209,791 B2
(45) Date of Patent: Feb. 19, 2019

(54) ELECTRONIC DEVICE AND PANEL DEVICE

(71) Applicant: KYOCERA CORPORATION, Kyoto (JP)

(72) Inventors: Tomoyoshi Ikeda, Yokohama (JP); Fumiaki Nakao, Kawasaki (JP); Kenji Kono, Yokohama (JP); Tomotake Aono, Yokohama (JP); Katsuhiko Shimizu, Yamato (JP); Shigeto Hattori, Yokohama (JP); Jun Takeda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 482 days.

(21) Appl. No.: 14/402,764

(22) PCT Filed: May 21, 2013

(86) PCT No.: PCT/JP2013/003245
§ 371 (c)(1),
(2) Date: Nov. 21, 2014

(87) PCT Pub. No.: WO2013/175778
PCT Pub. Date: Nov. 28, 2013

(65) Prior Publication Data
US 2016/0034057 A1     Feb. 4, 2016

(30) Foreign Application Priority Data

May 22, 2012  (JP) ................................ 2012-116880
May 22, 2012  (JP) ................................ 2012-116885
(Continued)

(51) Int. Cl.
*G06F 3/041*      (2006.01)
*H04M 1/03*      (2006.01)
(Continued)

(52) U.S. Cl.
CPC .............. *G06F 3/041* (2013.01); *G06F 3/016* (2013.01); *H04M 1/03* (2013.01); *H04R 7/045* (2013.01);
(Continued)

(58) Field of Classification Search
CPC ....................................................... G06F 3/041
See application file for complete search history.

(56) References Cited

U.S. PATENT DOCUMENTS

| 6,723,937 B2 | 4/2004 | Englemann et al. |
| 7,119,798 B2 | 10/2006 | Yoshikawa et al. |

(Continued)

FOREIGN PATENT DOCUMENTS

| JP | H10293644 A | 11/1998 |
| JP | 2000-013478 A | 1/2000 |

(Continued)

OTHER PUBLICATIONS

An Office Action; "Decision of Refusal," issued by the Japanese Patent Office dated Mar. 1, 2016, which corresponds to Japanese Patent Application No. 2012-117005 and is related to U.S. Appl. No. 14/402,764; with English language concise explanation.
(Continued)

*Primary Examiner* — Carolyn R Edwards
(74) *Attorney, Agent, or Firm* — Studebaker & Brackett PC

(57) ABSTRACT

An electronic device can effectively transmit sound even if a force is applied to a panel by an ear. The electronic device includes a panel (10) and a vibration unit (30) that vibrates the panel (10) to generate air-conducted sound and vibration sound that is transmitted through a portion of a human body. The intensity of vibration of the vibration unit (30) changes in accordance with the force applied to the panel (10).

2 Claims, 33 Drawing Sheets

(30) Foreign Application Priority Data

| May 22, 2012 | (JP) | 2012-116887 |
| May 22, 2012 | (JP) | 2012-116906 |
| May 22, 2012 | (JP) | 2012-116908 |
| May 22, 2012 | (JP) | 2012-116922 |
| May 22, 2012 | (JP) | 2012-117005 |
| May 22, 2012 | (JP) | 2012-117023 |

(51) Int. Cl.
*H04R 7/04* (2006.01)
*G06F 3/01* (2006.01)
*H04M 1/02* (2006.01)
*H04R 17/00* (2006.01)

(52) U.S. Cl.
CPC .......... *H04M 1/0266* (2013.01); *H04R 17/00* (2013.01); *H04R 2400/03* (2013.01); *H04R 2440/05* (2013.01); *H04R 2460/03* (2013.01); *H04R 2460/13* (2013.01); *H04R 2499/11* (2013.01); *H04R 2499/15* (2013.01)

(56) References Cited

U.S. PATENT DOCUMENTS

| 7,633,076 | B2 | 12/2009 | Huppi et al. |
| 7,728,822 | B2 | 6/2010 | Shiga |
| 8,614,431 | B2 | 12/2013 | Huppi et al. |
| 8,736,558 | B2 | 5/2014 | East et al. |
| 8,773,373 | B2 | 7/2014 | Sato et al. |
| 8,823,662 | B2 | 9/2014 | Aono |
| 8,949,743 | B2 | 2/2015 | Kida et al. |
| 2002/0144886 | A1 | 10/2002 | Engelmann et al. |
| 2002/0149561 | A1 | 10/2002 | Fukumoto et al. |
| 2003/0231170 | A1 | 12/2003 | Yoshikawa et al. |
| 2004/0133366 | A1* | 7/2004 | Sullivan ............... G06F 3/0418 |
| | | | 702/56 |
| 2006/0022958 | A1 | 2/2006 | Shiga |
| 2007/0075965 | A1 | 4/2007 | Huppi et al. |
| 2007/0097073 | A1* | 5/2007 | Takashima ............. G06F 3/016 |
| | | | 345/156 |
| 2009/0265669 | A1 | 10/2009 | Kida et al. |
| 2010/0141408 | A1* | 6/2010 | Doy ........................ G06F 3/016 |
| | | | 340/407.2 |
| 2010/0156818 | A1* | 6/2010 | Burrough ............... G06F 3/016 |
| | | | 345/173 |
| 2010/0302184 | A1 | 12/2010 | East et al. |
| 2011/0090070 | A1* | 4/2011 | Modarres ............. B06B 1/0622 |
| | | | 340/407.2 |
| 2011/0141046 | A1 | 6/2011 | Sato et al. |
| 2011/0260991 | A1 | 10/2011 | Aono |
| 2012/0013220 | A1 | 1/2012 | Kawata et al. |
| 2012/0062491 | A1* | 3/2012 | Coni ....................... G06F 3/016 |
| | | | 345/173 |
| 2012/0126962 | A1 | 5/2012 | Ujii et al. |
| 2012/0154318 | A1 | 6/2012 | Aono |
| 2012/0154329 | A1 | 6/2012 | Shinozaki |
| 2013/0163785 | A1* | 6/2013 | Lee ........................ H03J 7/00 |
| | | | 381/103 |
| 2013/0265270 | A1* | 10/2013 | Tempas ................. A61H 23/02 |
| | | | 345/174 |
| 2014/0104241 | A1 | 4/2014 | Huppi et al. |

FOREIGN PATENT DOCUMENTS

| JP | 2001-350592 A | 12/2001 |
| JP | 2002-149312 A | 5/2002 |
| JP | 2002-373540 A | 12/2002 |
| JP | 2003-169115 A | 6/2003 |
| JP | 2004-021697 A | 1/2004 |
| JP | 2005-332063 A | 12/2005 |
| JP | 2006-007919 A | 1/2006 |
| JP | 2006-017568 A | 1/2006 |
| JP | 2006-40005 A | 2/2006 |
| JP | 2007-019898 A | 1/2007 |
| JP | 2007-133698 A | 5/2007 |
| JP | 2009-038819 A | 2/2009 |
| JP | 2010-020405 A | 1/2010 |
| JP | 2010-507870 A | 3/2010 |
| JP | 2010-198289 A | 9/2010 |
| JP | 2011-028663 A | 2/2011 |
| JP | 2011-034150 A | 2/2011 |
| JP | 2011-048669 A | 3/2011 |
| JP | 2011-048696 A | 3/2011 |
| JP | 2011-053744 A | 3/2011 |
| JP | 2011-061316 A | 3/2011 |
| JP | 2011-507088 A | 3/2011 |
| JP | 2011-138536 A | 7/2011 |
| JP | 2011-146006 A | 7/2011 |
| JP | 2011-233971 A | 11/2011 |
| JP | 2012-022537 A | 2/2012 |
| JP | 2012-048584 A | 3/2012 |
| JP | 2012-64210 A | 3/2012 |
| JP | 2012-093897 A | 5/2012 |
| JP | 2012-249252 A | 12/2012 |
| JP | 2013-150160 A | 8/2013 |
| WO | 01/54450 A2 | 7/2001 |
| WO | 2009-147741 | 12/2009 |
| WO | 2011/051722 A2 | 5/2011 |

OTHER PUBLICATIONS

An Office Action; "Notice of Reasons for Rejection," issued by the Japanese Patent Office dated Mar. 15, 2016, which corresponds to Japanese Patent Application No. 2012-117023 and is related to U.S. Appl. No. 14/402,764; with English language concise explanation.
An Office Action; "Notice of Reasons for Rejection," issued by the Japanese Patent Office dated Sep. 1, 2015, which corresponds to Japanese Patent Application No. 2012-116908 and is related to U.S. Appl. No. 14/402,764; with English language concise explanation.
International Search Report; PCT/JP2013/003245; dated Aug. 20, 2013.
Written Opinion of the International Searching Authority; PCT/JP2013/003245; dated Aug. 20, 2013; with concise explanation.
An Office Action; "Notice of Reasons for Rejection," issued by the Japanese Patent Office dated Sep. 8, 2015, which corresponds to Japanese Patent Application No. 2012-116887 and is related to U.S. Appl. No. 14/402,764; with English language concise explanation.
An Office Action; "Notice of Reasons for Rejection," issued by the Japanese Patent Office dated Sep. 8, 2015, which corresponds to Japanese Patent Application No. 2012-117005 and is related to U.S. Appl. No. 14/402,764; with English language concise explanation.
An Office Action; "Notice of Reasons for Rejection," issued by the Japanese Patent Office dated Sep. 15, 2015, which corresponds to Japanese Patent Application No. 2012-116906 and is related to U.S. Appl. No. 14/402,764; with English language concise explanation.
An Office Action; "Notice of Reasons for Rejection," issued by the Japanese Patent Office dated Apr. 12, 2016, which corresponds to Japanese Patent Application No. 2012-116885 and is related to U.S. Appl. No. 14/402,764; with English language concise explanation.
An Office Action; "Notice of Reasons for Rejection," issued by the Japanese Patent Office dated Aug. 2, 2016, which corresponds to Japanese Patent Application No. 2012-116885 and is related to U.S. Appl. No. 14/402,764; with English language concise explanation.
JP Office Action dated Dec. 6, 2016 from corresponding JP Appl No. 2012-116887, with concise statement of relevance, 3 pp.

* cited by examiner

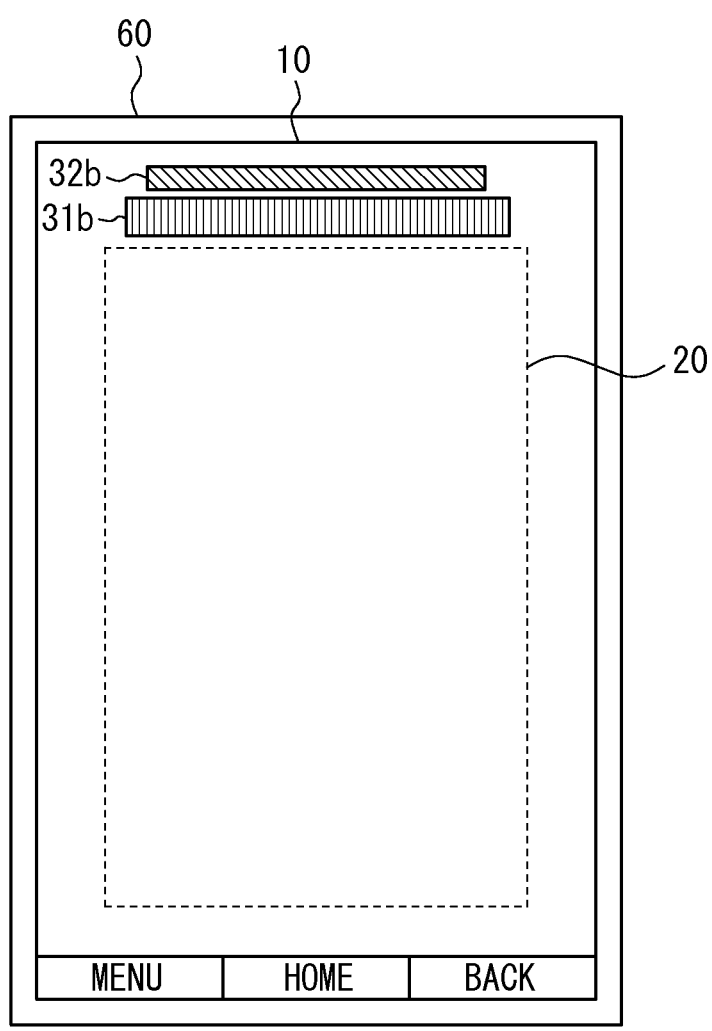

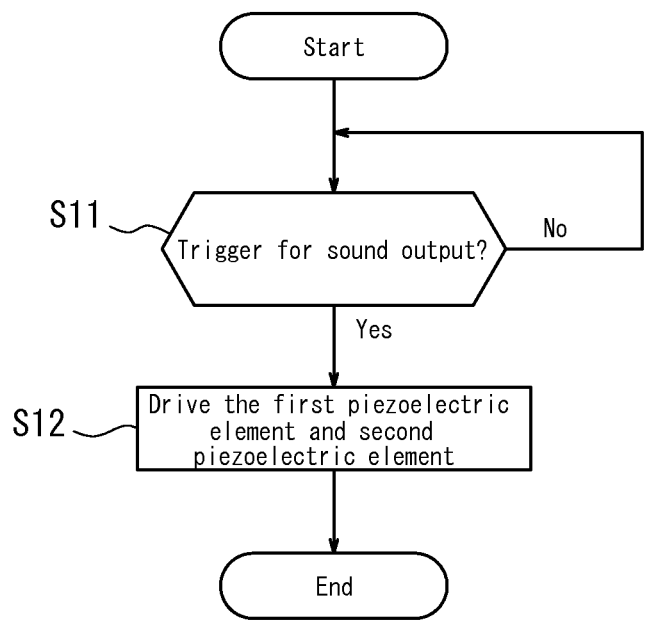

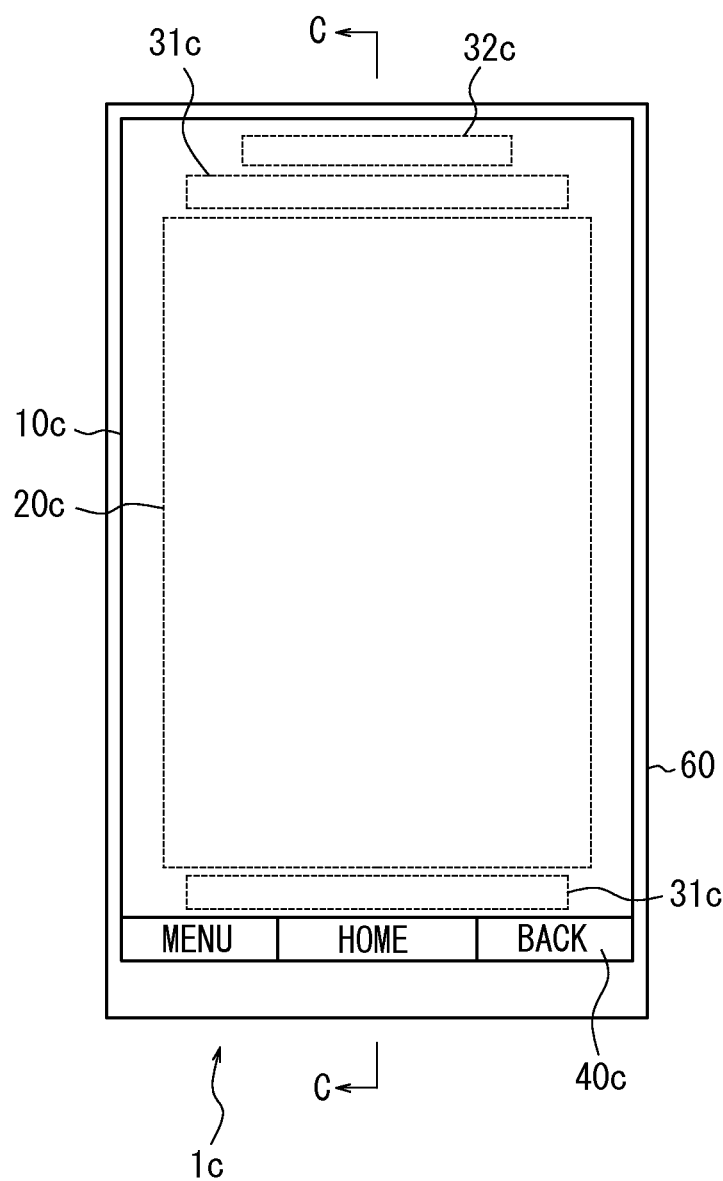
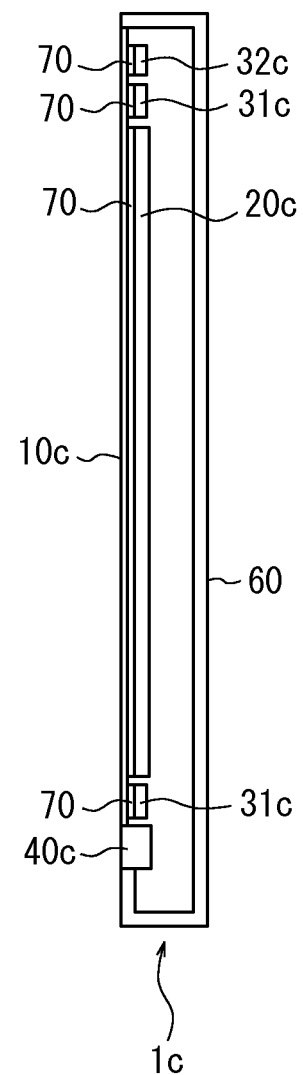

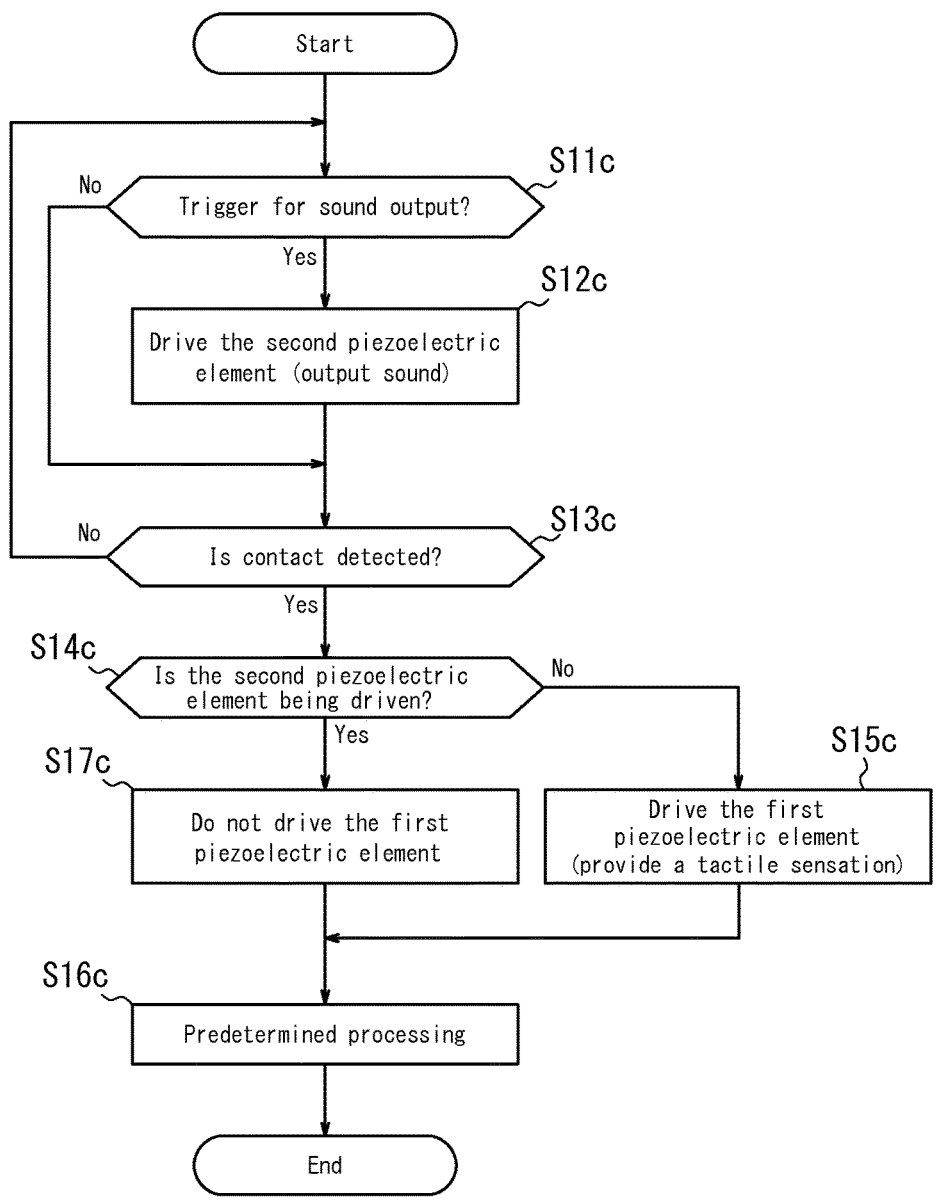

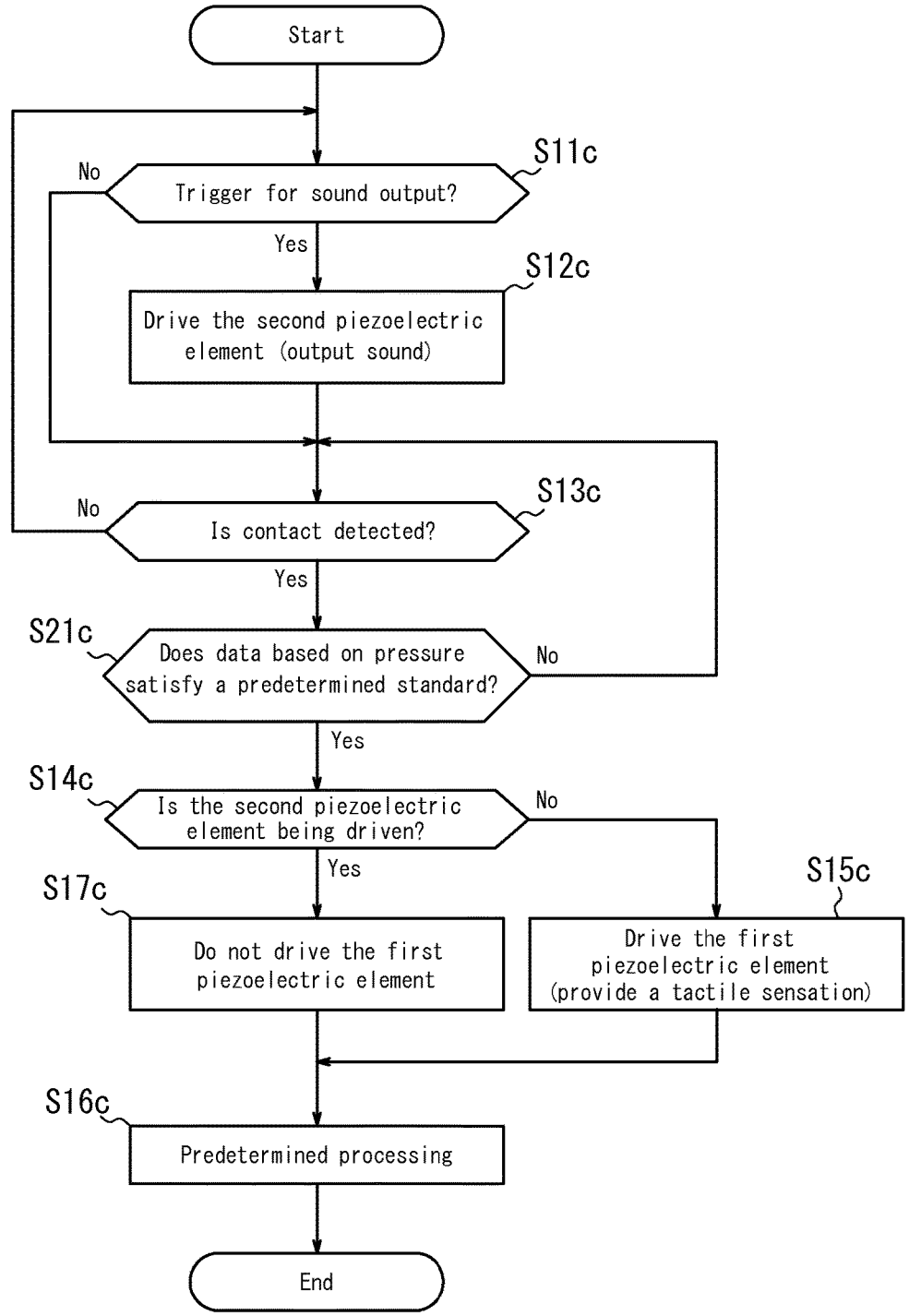

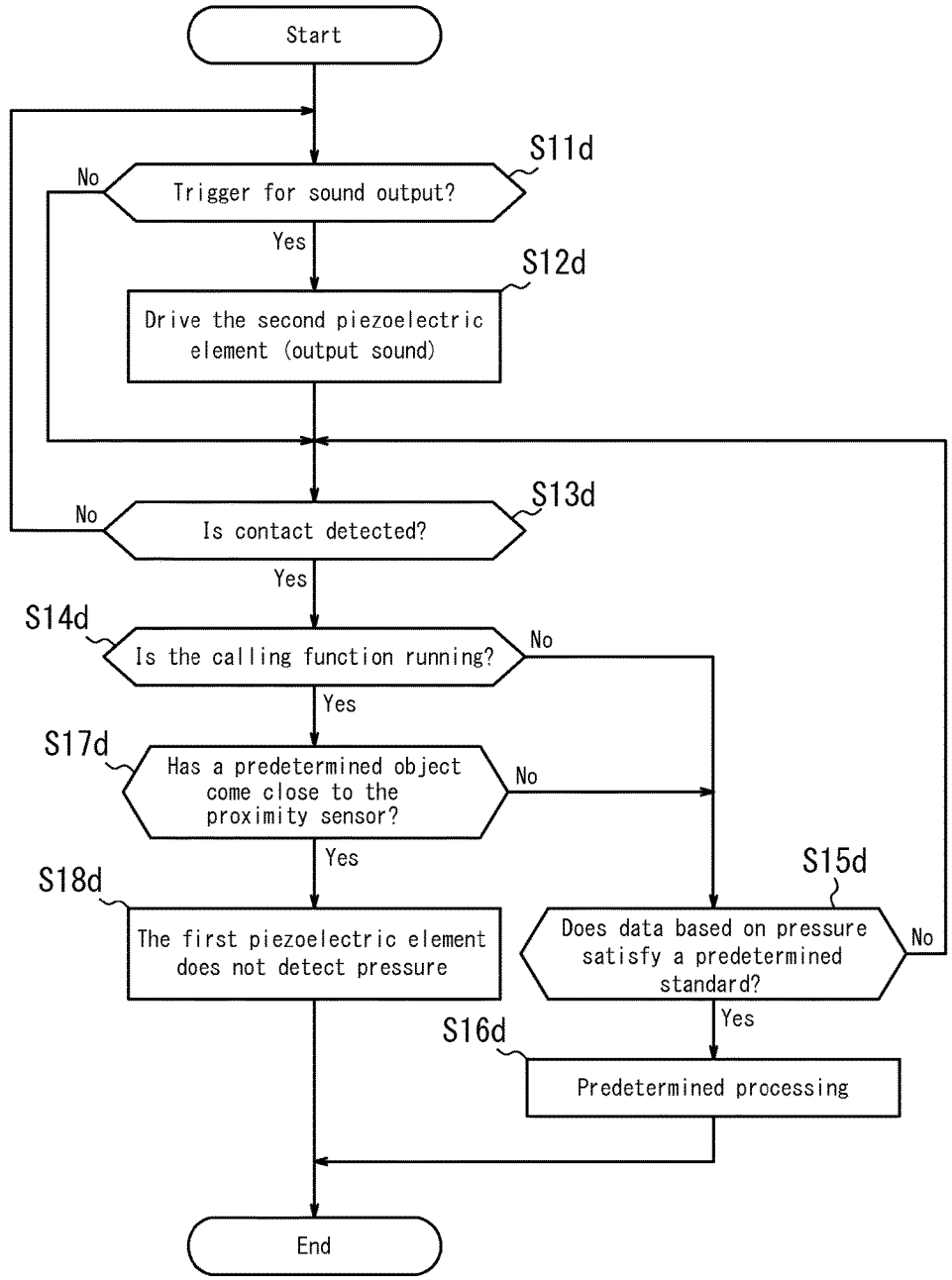

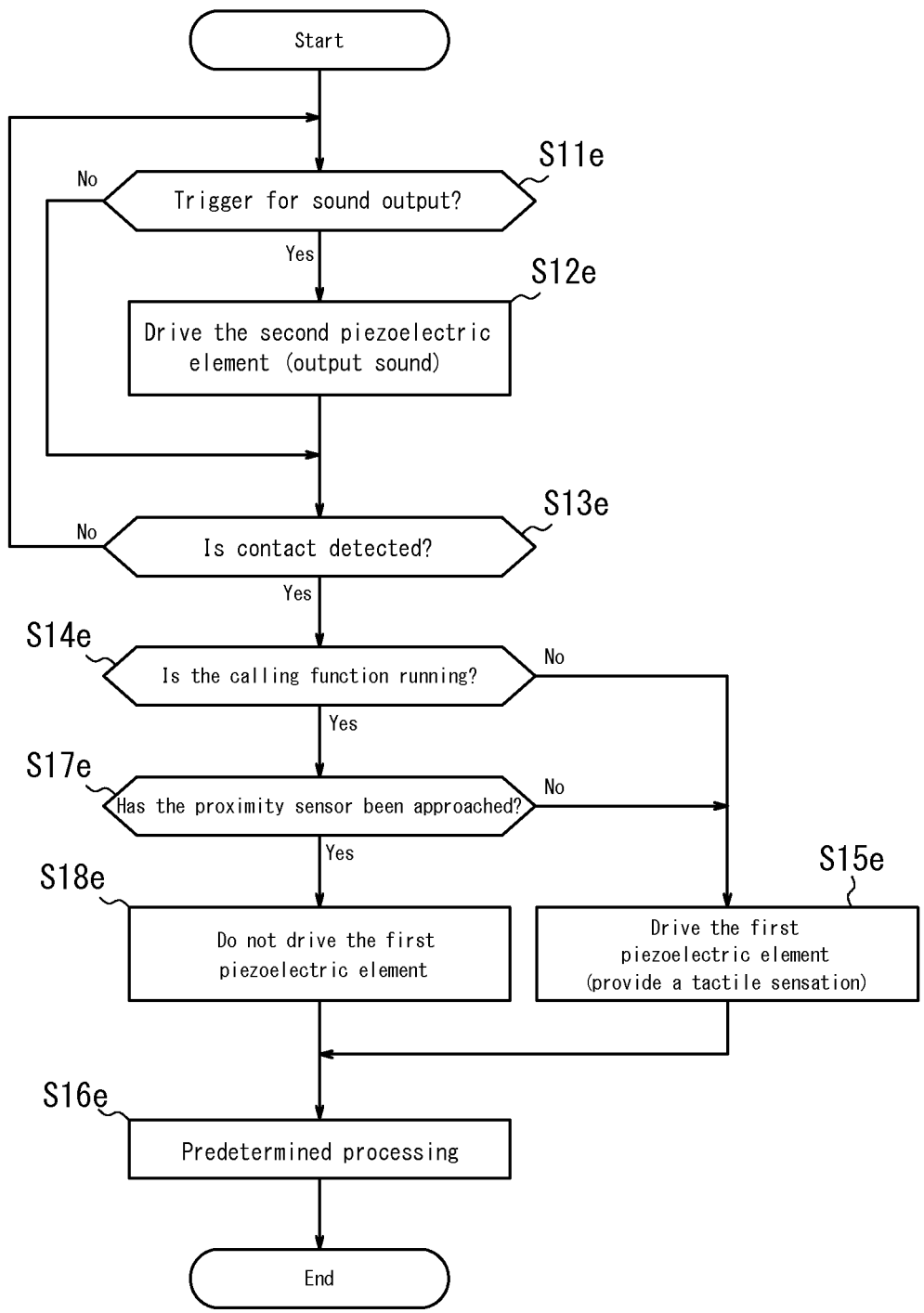

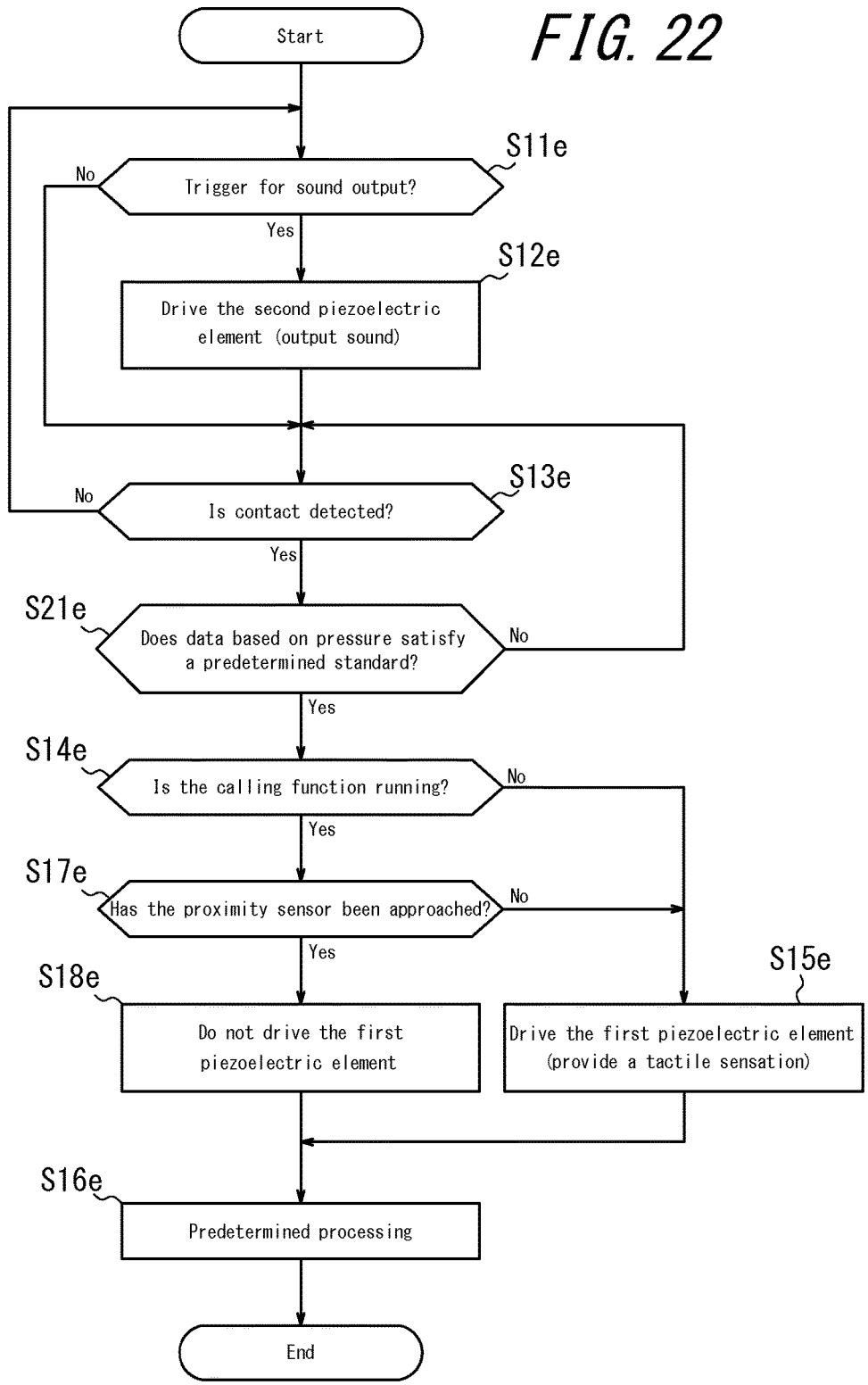

ELECTRONIC DEVICE AND PANEL DEVICE

CROSS-REFERENCE TO RELATED APPLICATIONS

This application claims priority to and the benefit of Japanese Patent Application No. 2012-116880 filed May 22, 2012, Japanese Patent Application No. 2012-116885 filed May 22, 2012, Japanese Patent Application No. 2012-116887 filed May 22, 2012, Japanese Patent Application No. 2012-116906 filed May 22, 2012, Japanese Patent Application No. 2012-116908 filed May 22, 2012, Japanese Patent Application No. 2012-116922 filed May 22, 2012, Japanese Patent Application No. 2012-117005 filed May 22, 2012, and Japanese Patent Application No. 2012-117023 filed May 22, 2012, the entire contents of which are incorporated herein by reference.

TECHNICAL FIELD

The present invention relates to an electronic device and a panel device provided with a panel such as a touch panel. In greater detail, the present invention relates to an electronic device that executes predetermined processing, such as executing application software (referred to below as an "application"), based on an operation on a touch sensor.

BACKGROUND

In recent years, electronic devices provided with a touch panel are being widely used as a component to detect user operation in mobile terminals such as smartphones, information devices such as tablet PCs, calculators, or ticket vending machines, household appliances such as microwave ovens, televisions, or lighting appliances, industrial devices (factory automation equipment), and the like.

An electronic device provided with a touch panel typically displays the image of an operation key or button, an icon, or the like (referred to below as an "object") on the display screen of a display unit such as a liquid crystal display disposed on the back face of the touch panel. In such an electronic device, when the user contacts the touch panel at a position corresponding to an object displayed on the display screen, the touch panel detects contact at that position. Hence, in such an electronic device, a user interface with a high degree of freedom can be implemented in accordance with a variety of application software.

Many types of such a touch panel are known, including a resistive film type, a capacitive type, and an optical type. All of these types of touch panels, however, simply detect an operation by the user's finger, a stylus pen, or the like. Upon being contacted, the touch panel itself is not physically displaced like a mechanical push-button switch. Accordingly, even if the user performs an operation on the touch panel, the user cannot receive any feedback for the operation.

To address this issue, a feedback method for generating vibration upon detection of an operation on the touch panel has been proposed (for example, see Patent Literature 1). Patent Literature 1 discloses an example of using a piezoelectric element as a vibration unit. By causing a piezoelectric element to expand and contract, this vibration unit can cause the touch panel to flex, generating vibration. In this way, the input device in Patent Literature 1 can provide a tactile sensation to the user when the user operates the touch panel. In other words, a recent electronic device such as a mobile phone provided with a touch panel, as disclosed in Patent Literature 1, has a function (referred to below as a "tactile sensation providing function") to provide a tactile sensation to the user by vibrating a vibration unit, such as a vibrator or piezoelectric element included in the electronic device, when the user touches the touch panel, thereby notifying the user that the user operation was input into the electronic device. As well as providing the tactile sensation, by executing predetermined processing based on the operation, the electronic device can notify the user that the operation has been appropriately recognized.

CITATION LIST

Patent Literature 1: JP 2011-34150 A

SUMMARY

In the electronic device that provides a tactile sensation as described above, a better tactile sensation can be provided by providing the tactile sensation not only when contact by the user on the touch panel is detected, but rather when the touch panel is also being pressed by the user to a certain degree. In order to implement such provision of a tactile sensation, a pressure detection unit that detects pressure on the touch panel is provided in the electronic device, and the vibration unit is driven when a certain degree of pressure is applied to the touch panel. A piezoelectric element may be used as such a pressure detection unit. When using a piezoelectric element as the vibration unit that provides a tactile sensation, the piezoelectric element may also be configured to serve the function of the pressure detection unit.

With this approach, by appropriately adjusting the amplitude, frequency, and the like when the vibration unit vibrates, a realistic tactile sensation, such as that obtained when pressing an actual mechanical key or button, can be provided when the user operates the touch panel. Furthermore, with this approach, the occurrence of erroneous operations can be reduced, since the electronic device does not detect an operation in which the user unintentionally contacts the touch panel lightly, but rather only detects an operation in which the user intentionally applies pressure to the touch panel.

The inventors examined a new electronic device provided with a function to vibrate a panel by applying a predetermined electric signal (audio signal) to a piezoelectric element in order to transmit air-conducted sound and vibration sound to a user by transmitting the vibration of the panel to the user's body (referred to below as a "function to transmit air-conducted sound and the like"). By disposing such a piezoelectric element for sound transmission in the panel, an electronic device that transmits sound through the panel can be achieved.

In order to achieve these two functions, i.e. the tactile sensation providing function and the function to transmit air-conducted sound and the like, with one electronic device, the inventors assumed that a piezoelectric element for the tactile sensation providing function and another piezoelectric element for the function to transmit air-conducted sound and the like would be provided in the electronic device. In other words, the inventors assumed that by disposing a piezoelectric element for sound transmission as well as a piezoelectric element for tactile sensation provision as disclosed in Patent Literature 1 in one panel, one device could both provide a tactile sensation and transmit sound. Furthermore, as described above, with the structure for providing a tactile sensation, a piezoelectric element configured as a pressure detection unit may be included to detect pressure on the touch panel by the user.

The inventors assumed that if such an electronic device that transmits sound by vibrating the panel is a communication device, such as a mobile phone or a smartphone, the user would use the electronic device to listen to sound by contacting an ear to the panel of the electronic device when conversing.

In this mode of use, when the panel of the electronic device is a touch panel that detects contact by the user's finger or the like, the touch panel ends up detecting contact by the user's ear when the user contacts the ear to the electronic device and converses. Therefore, based on detection of contact to the touch panel by the user's ear, this electronic device runs the risk of starting execution of predetermined processing, such as to display a character or to terminate the call, against the user's intentions.

One possible way of resolving such a problem would, for example, be to provide a proximity sensor in such an electronic device and control the electronic device not to execute the above-described predetermined processing when detecting that the user's ear or the like is close to or contacting the touch panel during a call. If, for example, the user brings the ear or the like close to the touch panel rapidly during a call, however, the proximity sensor or the like may not be able to detect the proximity with sufficient speed. In this case, as before, a problem occurs in that execution of some sort of unintended processing may begin due to contact by the user's ear or the like to the touch panel during a call.

Additionally, as described above, when for example a piezoelectric element for the tactile sensation providing function and another piezoelectric element for the function to transmit air-conducted sound and the like are disposed in the panel, then for example in a small electronic device such as a mobile terminal, the panel and the piezoelectric elements are relatively small, which may prevent a sufficient acoustic effect from being achieved even when sound is output by vibrating the panel.

Furthermore, when attaching a plurality of piezoelectric elements for different uses to one panel and driving the piezoelectric element for tactile sensation provision while the piezoelectric element for sound transmission is being driven to generate vibration, a problem occurs due to interference between the vibrating piezoelectric elements.

It is thought that this problem will also occur other than when including a piezoelectric element for transmitting both air-conducted sound and vibration sound, as described above, in addition to the piezoelectric element for tactile sensation provision. For example, when a piezoelectric element for transmitting one of air-conducted sound and vibration sound or a piezoelectric element for providing a tactile sensation with a different resonance frequency is also included in addition to a piezoelectric element for tactile sensation provision, there is a risk of problems due to interference occurring.

Also, if the piezoelectric element for sound transmission is driven and vibration is generated while this pressure detection unit is detecting pressure, there is a risk of the vibration that generates sound being detected by the pressure detection unit as noise. If the vibration pertaining to sound generation is thus detected by the pressure detection unit as pressure on the touch panel, predetermined processing not intended by the user may be executed, leading to malfunction.

When, for example, a piezoelectric element for a tactile sensation providing function and another piezoelectric element for a function to transmit air-conducted sound and the like are included in the panel, then depending on the positions at which these piezoelectric elements are disposed, it may not be possible to provide a tactile sensation and transmit sound effectively to the user.

The inventors also assumed that in such an electronic device that vibrates the panel to output sound, the sound output from the panel is made audible only when the user contacts or brings the ear close to the panel, so that the sound does not spread over a wide range. When such an electronic device is, for example, a communication device or the like, then there is a risk of power being wastefully consumed if sound is always output in response to a trigger for outputting sound while the communication function is being executed.

For example, it is assumed that even while the communication function is running, the user may wish to perform an operation on the panel using a finger or the like. In other words, even if the user is communicating using the communication device, the user might use the communication device to confirm a schedule or refer to an address book. In such a case, power is wastefully consumed if sound is output in response to a trigger for outputting sound.

In the above-described mode of use, in cases such as when surrounding sound is loud or the other party's voice is quiet, the user may press the ear firmly against the panel to make the other person's voice more audible. In this case, depending on the pressure with which the ear is pressed against the panel, vibration of the panel may be obstructed, leading to the problem of sound not effectively being transmitted.

The present invention has been conceived in light of these considerations and provides an electronic device that can effectively transmit sound even when a force is applied to the panel by an ear.

An electronic device according to the present invention for resolving the above problems includes: a panel; and a vibration unit configured to vibrate the panel to generate air-conducted sound and vibration sound that is transmitted through a portion of a human body, such that an intensity of vibration of the vibration unit changes in accordance with a force applied to the panel.

The electronic device according to the present invention may include a detection unit configured to detect the force applied to the panel.

In the electronic device according to the present invention, the vibration unit may detect the force applied to the panel.

In the electronic device according to the present invention, when the force applied to the panel is at least a predetermined threshold, the vibration unit may make the intensity of vibration of the panel larger than when the force applied to the panel is less than the predetermined threshold.

In the electronic device according to the present invention, the predetermined threshold may be 5 N.

According to the electronic device of the present invention, sound can be effectively transmitted even when a force is applied to the panel by an ear so that vibration of the panel is blocked.

BRIEF DESCRIPTION OF DRAWINGS

The present invention will be further described below with reference to the accompanying drawings, wherein:

FIG. 6 illustrates a housing structure of the electronic device according to Embodiment 2;

FIG. 7 is a flowchart representing an example of operations by the electronic device according to Embodiment 2;

FIGS. 12(A) and 12(B) illustrate an example of a housing structure of the electronic device according to Embodiment 4;

FIG. 13 is a flowchart illustrating processing by the electronic device according to Embodiment 4;

FIG. 14 is a flowchart illustrating processing by an electronic device according to Embodiment 5;

FIG. 17 is a flowchart illustrating processing by the electronic device according to Embodiment 6;

FIG. 21 is a flowchart illustrating processing by the electronic device according to Embodiment 8;

FIG. 22 is a flowchart illustrating processing by the electronic device according to Embodiment 9;

DESCRIPTION OF EMBODIMENTS

The following describes embodiments of the present invention.

Embodiment 1

Figure 1:
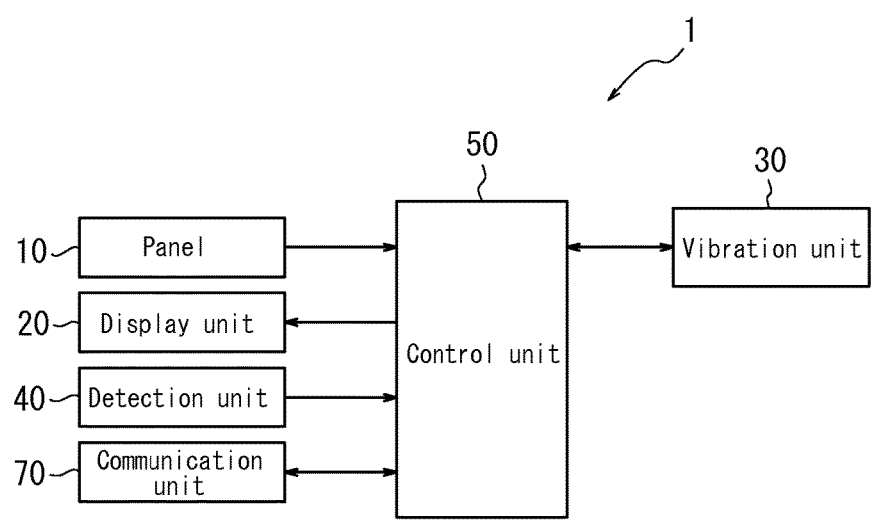
FIG. 1 is a functional block diagram of an electronic device according to Embodiment 1.

An embodiment of the present invention is described below in detail with reference to the accompanying drawings. FIG. 1 is a functional block diagram of an electronic device 1b according to an embodiment of the present invention. The electronic device 1b is, for example, a mobile phone (smartphone) and includes a panel 10, a display unit 20, a vibration unit 30, a detection unit 40, a control unit 50, and a communication unit 70. When the electronic device 1 of the present embodiment functions as a mobile phone, vibration of the panel 10 caused by the vibration unit 30 generates sound that is transmitted inside the human body. The sound is transmitted inside the human body by vibration of the middle ear or the inner ear via soft tissue (such as cartilage) of the human body.

The panel 10 is a touch panel that detects contact or is a cover panel or the like that protects the display unit 20. The panel 10 is, for example, made from glass or a synthetic resin such as acrylic or the like. The panel 10 is preferably plate-like in shape. The panel 10 may be a flat plate or may be a curved panel, the surface of which is smoothly inclined. When the panel 10 is a touch panel, the panel 10 detects contact by the user's finger, a pen, a stylus pen, or the like. Any detection system may be used in the touch panel, such as a capacitive system, a resistive film system, a surface acoustic wave system (or an ultrasonic wave system), an infrared system, an electromagnetic induction system, a load detection system, or the like. The panel 10 is preferably rectangular.

The display unit 20 is a display device such as a liquid crystal display, an organic EL display, an inorganic EL display, or the like. The display unit 20 is provided on the back face of the panel 10. The display unit 20 is disposed on the back face of the panel 10 by a joining member (for example, adhesive). The display unit 20 may be disposed at a distance from the panel 10 and supported by the housing of the electronic device 1.

The vibration unit 30 is formed by elements that, upon application of an electric signal (voltage), either expand and contract or bend (flex) in accordance with the electromechanical coupling coefficient of their constituent material. Ceramic or crystal elements, for example, may be used for the vibration unit 30. The vibration unit 30 may be a unimorph, bimorph, or laminated piezoelectric element. Examples of a laminated piezoelectric element include a laminated unimorph element with layers of unimorph (for example, 16 or 24 layers) and a laminated bimorph element with layers of bimorph (for example, 16 or 24 layers). Such a laminated piezoelectric element may be configured with a laminated structure formed by a plurality of dielectric layers composed of, for example, lead zirconate titanate (PZT) and electrode layers disposed between the dielectric layers. Unimorph expands and contracts upon the application of an electric signal (voltage), and bimorph bends upon the application of an electric signal (voltage). The vibration unit 30 is a piezoelectric element for transmitting sound. The vibration unit 30 is preferably disposed on the back face of the panel 10 by a joining member (for example, adhesive).

The detection unit 40 detects pressure on the panel 10 and is configured using, for example, an element such as a strain gauge sensor, a piezoelectric element, or the like that experiences a change in physical or electrical characteristics (strain, resistance, voltage, or the like) in response to pressure. When the detection unit 40 is configured using a piezoelectric element or the like, for example, the magnitude of the voltage (voltage value (referred to below simply as "data")), which is an electrical characteristic, of the piezoelectric element changes in accordance with the magnitude of the load (force) of the pressure on the touch face of the panel 10 (or the speed at which the magnitude of the load (force) changes (acceleration)). The control unit 50 acquires the data by the detection unit 40 notifying the control unit 50 of the data, or by the control unit 50 detecting data pertaining to the piezoelectric element of the detection unit 40. In other words, the control unit 50 acquires the data based on pressure on the touch face of the panel 10 from the detection unit 40. Note that when the detection unit 40 is configured using a piezoelectric element, the vibration unit 30 may be configured using a piezoelectric element that also serves as the detection unit 40.

The control unit 50 applies an electric signal to the vibration unit 30 to drive the vibration unit 30, thus controlling sound output. The voltage that the control unit 50 applies to the vibration unit 30 may, for example, be ±15 V. This is higher than ±5 V, i.e. the applied voltage of a so-called panel speaker for conduction of sound by air-conducted sound rather than vibration sound. Note that the magnitude of the applied voltage used may be appropriately adjusted in accordance with the fixation strength of the panel 10 with respect to the housing or a support member, or in accordance with the performance of the vibration unit 30. The control unit 50 drives the vibration unit 30 based on a trigger for sound output from a predetermined application or the like (based on an audio signal or the like).

Here, the control unit 50 varies the intensity of vibration of the vibration unit 30 in accordance with a force that is applied to the panel 10 and detected by the detection unit 40. In other words, when the force applied to the panel 10 is a predetermined threshold or greater, the control unit 50 makes the vibration of the panel 10 larger than when the force applied to the panel 10 is less than the predetermined threshold. In greater detail, when the force applied to the panel 10, i.e. the data based on pressure, is a predetermined threshold or greater, the control unit 50 makes the voltage applied to the vibration unit 30 larger than when the force is less than the predetermined threshold. For example, when the force applied to the panel 10 is a predetermined threshold or greater, the control unit 50 sets the vibration amplitude of the vibration unit 30 to A and causes the vibration unit 30 to vibrate. Conversely, when the force applied to the panel 10 is less than the predetermined threshold, the control unit 50 sets the vibration amplitude of the vibration unit 30 to B (in this case, A>B) and causes the vibration unit 30 to vibrate. The predetermined threshold is preferably 5 N or the data value (such as 1 V) based on pressure detected (acquired) by the control unit 50 when a force of 5 N is applied to the panel 10.

When the control unit 50 applies an electric signal to the vibration unit 30, the vibration unit 30 to which the electric signal is applied expands and contracts in the direction of the long sides. At this point, the panel 10 to which the vibration unit 30 is attached deforms in conjunction with the expansion and contraction of the vibration unit 30. The panel 10 thus vibrates. The panel 10 flexes due to expansion and contraction or bending of the vibration unit 30. The panel 10 is bent directly by the vibration unit 30. Stating that "the panel 10 is bent directly by the vibration unit" differs from the phenomenon utilized in known panel speakers, whereby the panel deforms upon vibration of a particular region of the panel due to the inertial force of a piezoelectric actuator constituted by a vibration unit disposed in the casing. Stating that "the panel 10 is bent directly by the vibration unit" refers instead to how expansion and contraction or bending (flexure) of the vibration unit directly bends the panel via the joining member or via the joining member and the below-described reinforcing member.

When the vibration unit 30 expands and contracts and the panel 10 vibrates, then along with generating air-conducted sound, the panel 10 generates vibration sound that is transmitted via a part of the user's body when the user brings a part of the body (such as the cartilage of the outer ear) into contact. The control unit 50 transmits air-conducted sound and vibration sound to an object that contacts the panel 10. For example, the control unit 50 can apply an electric signal, corresponding to an audio signal related to the other party's voice, to the vibration unit 30 to generate air-conducted sound and vibration sound that correspond to the audio signal. The audio signal may be related to ringtones, music including songs, or the like. Note that the audio signal pertaining to the electric signal may be based on music data stored in internal memory of the electronic device 1, or may be music data stored on an external server or the like and played back over a network.

The panel 10 vibrates not only in the region in which the vibration unit 30 is attached, but also in a region separate from the attachment region. In the region of vibration, the panel 10 includes a plurality of locations at which the panel 10 vibrates in a direction intersecting the main surface of the panel 10. At each of these locations, the value of the vibration amplitude changes over time from positive to negative or vice-versa. At a given instant during vibration of the panel 10, portions with a relatively large vibration amplitude and portions with a relatively small vibration amplitude appear to be distributed randomly or cyclically over nearly the entire panel 10. In other words, a plurality of vibration waves are detected across the entire panel 10.

The communication unit 70 is used to communicate with other electronic devices or the like. With the communication unit 70, the user of the electronic device 1 can talk with the user of another electronic device or the like. During a call, a microphone (not illustrated) picks up the sound spoken by the user of the electronic device 1. The panel 10 also vibrates to output sound spoken by the user of another electronic device or the like.

Figure 2:
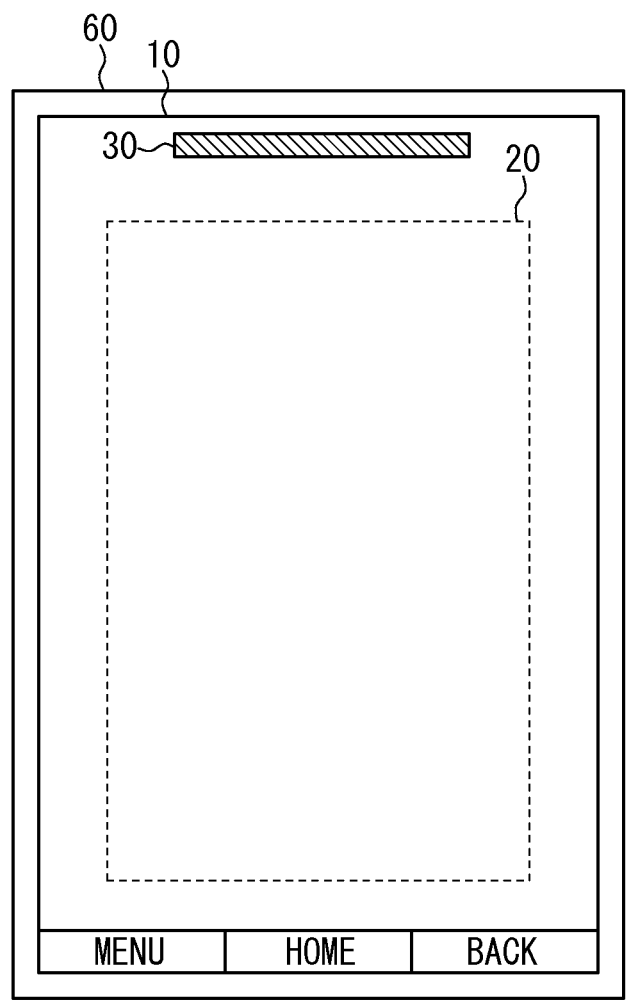
FIG. 2 illustrates a housing structure of the electronic device according to Embodiment 1.

FIG. 2 illustrates a housing structure of the electronic device 1 according to the present embodiment. The electronic device 1 illustrated in FIG. 2 is a smartphone in which a touch panel that is a glass plate is disposed on the front face of a housing 60 (for example a metal or resin case) as the panel 10. The panel 10 is supported by the housing 60, and the display unit 20 and vibration unit 30 are each adhered to the panel 10 by a joining member. The joining member is adhesive with thermosetting properties, ultraviolet curable properties, or other such properties; double-sided tape; or the like. The joining member may, for example, be optical elasticity resin, which is clear and colorless acrylic ultraviolet curing adhesive. In the example illustrated in FIG. 2, the panel 10, the display unit 20, and the vibration unit 30 are rectangular, yet this example is not limiting.

The display unit 20 is disposed in approximately the center in the transverse direction of the panel 10. The vibration unit 30 is disposed at a predetermined distance from an edge of the panel 10 in the longitudinal direction, near the edge so that the direction of the long sides of the vibration unit 30 extends along a short side of the panel 10. The display unit 20 and the vibration unit 30 are disposed side by side, in parallel directions, on the inner face of the panel 10.

Figure 3:
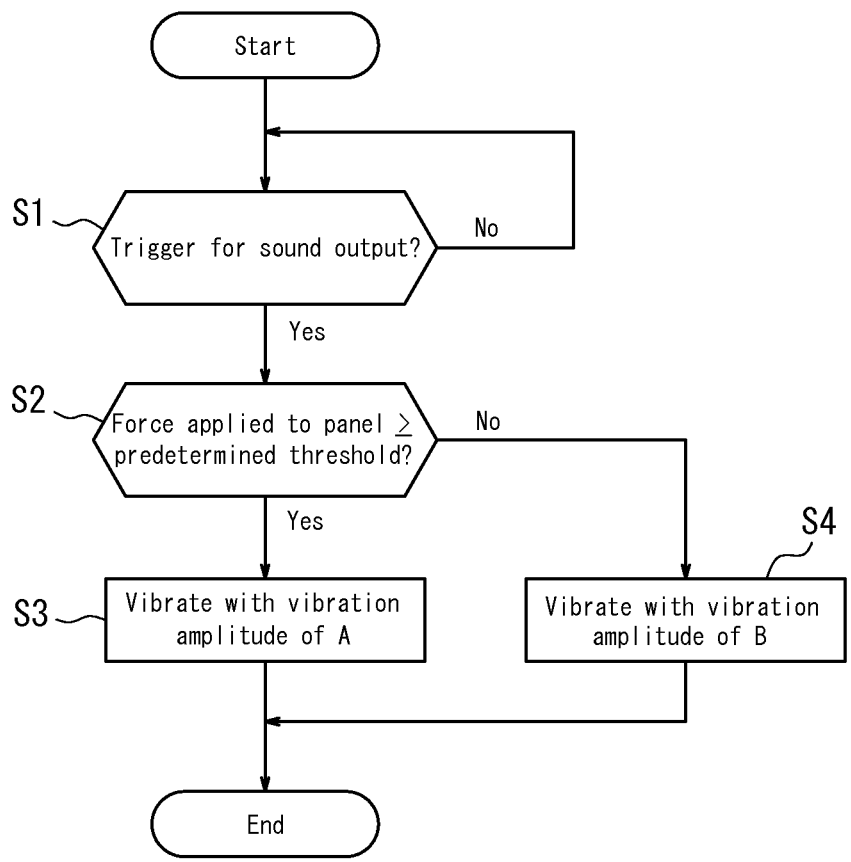
FIG. 3 is a flowchart representing operations of the electronic device according to Embodiment 1.

Next, with reference to the flowchart in FIG. 3, the operations of the electronic device 1 according to the present embodiment are described.

First, the control unit 50 detects whether there is a trigger for sound output from a predetermined application or the like (step S1). When there is a trigger for sound output, processing proceeds to step S2. When there is no trigger for sound output, step S1 is repeated.

When there is a trigger for sound output, the control unit 50 determines whether the force that is applied to the panel 10 and detected by the detection unit 40 is a predetermined threshold or greater (step S2). When the force is a predetermined threshold or greater, processing proceeds to step S3. When the force is less than a predetermined threshold, processing proceeds to step S4.

When the force applied to the panel 10 is a predetermined threshold or greater, the control unit 50 sets the vibration amplitude of the vibration unit 30 to A and causes the vibration unit 30 to vibrate (step S3). Processing then terminates. Conversely, when the force applied to the panel 10 is less than a predetermined threshold, the control unit 50 sets the vibration amplitude of the vibration unit 30 to B and causes the vibration unit 30 to vibrate (step S4). Processing then terminates.

In this way, according to the electronic device 1 of the present embodiment, even if a force is applied to the panel 10 by the ear, the intensity of vibration of the vibration unit 30 is changed in accordance with the force applied to the panel 10. Hence, sound can be effectively transmitted.

By vibration of the panel 10, the electronic device 1 can transmit, to the user, air-conducted sound as well as vibration sound that is transmitted through a part of the user's body (such as the cartilage of the outer ear). Therefore, when sound is output at a volume equivalent to a known dynamic receiver, the sound that is transmitted to the periphery of the electronic device 1 by air vibrations due to vibration of the panel 10 is smaller than with a dynamic receiver. Accordingly, the electronic device 1 is appropriate for listening to recorded messages, for example, on the train or the like.

The electronic device 1 transmits vibration sound by vibration of the panel 10, and therefore even if the user is wearing earphones or headphones, for example, the user can hear sound through the earphones or headphones and through a part of the body by contacting the electronic device 1 against the earphones or headphones.

The electronic device 1 transmits sound to a user by vibration of the panel 10. Therefore, if the electronic device 1 is not provided with a separate dynamic receiver, it is unnecessary to form an opening (sound discharge port) for sound transmission in the housing 60, thereby simplifying waterproof construction of the electronic device 1. On the other hand, if the electronic device 1 is provided with a dynamic receiver, the sound discharge port should be blocked by a member permeable by gas but not liquid. Gore-Tex (registered trademark) is an example of a member permeable by gas but not liquid.

The above electronic device 1 varies the intensity of vibration in accordance with the force applied to the panel 10 between two levels based on a predetermined threshold, yet this example is not limiting. A plurality of thresholds may be established to vary the intensity between multiple levels. Furthermore, the intensity of vibration may be varied continuously in accordance with the force applied to the panel 10.

Embodiment 2

Figure 4:
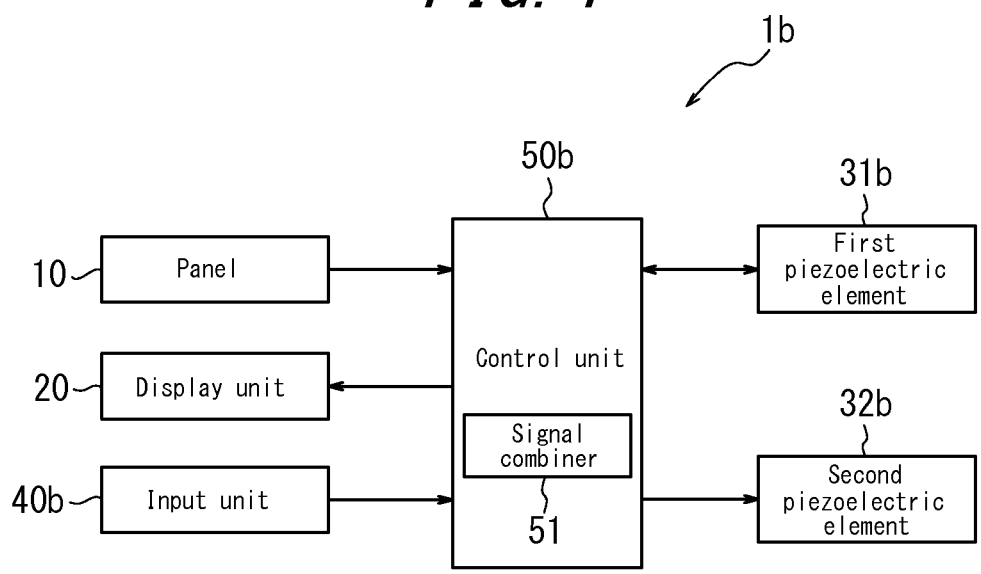
FIG. 4 is a functional block diagram of an electronic device according to Embodiment 2.

The following describes Embodiment 2 of the present invention. Where the structure is the same as in Embodiment 1, the same reference signs are used, and a description thereof is omitted. Embodiment 2 of the present invention is described below in detail with reference to the accompanying drawings. FIG. 4 is a functional block diagram of an electronic device 1b according to Embodiment 2 of the present invention. The electronic device 1b is, for example, a mobile phone (smartphone) and is provided with a panel 10, a display unit 20, a first piezoelectric element 31b, a second piezoelectric element 32b, an input unit 40b, and a control unit 50b. When the electronic device 1b of the present embodiment functions as a mobile phone, vibration of the panel 10 caused by the first piezoelectric element 32b and the second piezoelectric element 32b generates sound transmitted inside the human body. The sound is transmitted inside the human body by vibration of the middle ear or the inner ear via soft tissue (such as cartilage) of the human body.

The first piezoelectric element 31b is formed by elements that, upon application of an electric signal (voltage), either expand and contract or bend (flex) in accordance with the electromechanical coupling coefficient of their constituent material. Ceramic or crystal elements, for example, may be used. The first piezoelectric element 31b may be a unimorph, bimorph, or laminated piezoelectric element. Examples of a laminated piezoelectric element include a laminated unimorph element with layers of unimorph (for example, 16 or 24 layers) and a laminated bimorph element with layers of bimorph (for example, 16 or 24 layers). Such a laminated piezoelectric element may be configured with a laminated structure formed by a plurality of dielectric layers composed of, for example, lead zirconate titanate (PZT) and electrode layers disposed between the dielectric layers. Unimorph expands and contracts upon the application of an electric signal (voltage), and bimorph bends upon the application of an electric signal (voltage). The first piezoelectric element 31b is a piezoelectric element for providing a tactile sensation to a contacting object that is in contact with the panel 10. The first piezoelectric element 31b is preferably rectangular, expanding or contracting in the direction of the long sides. The first piezoelectric element 31b is preferably disposed on the back face of the panel 10 by a joining member (for example, adhesive).

The second piezoelectric element 32b is formed by elements that, upon application of an electric signal (voltage), either expand and contract or bend (flex) in accordance with the electromechanical coupling coefficient of their constituent material. Ceramic or crystal elements, for example, may be used. The second piezoelectric element 32b may be a unimorph, bimorph, or laminated piezoelectric element. Examples of a laminated piezoelectric element include a laminated unimorph element with layers of unimorph (for example, 16 or 24 layers) and a laminated bimorph element with layers of bimorph (for example, 16 or 24 layers). Such a laminated piezoelectric element may be configured with a laminated structure formed by a plurality of dielectric layers composed of, for example, lead zirconate titanate (PZT) and electrode layers disposed between the dielectric layers. Unimorph expands and contracts upon the application of an electric signal (voltage), and bimorph bends upon the application of an electric signal (voltage). The second piezoelectric element 32b is a piezoelectric element for transmitting sound. The second piezoelectric element 32b is preferably rectangular, expanding or contracting in the direction of the long sides. The second piezoelectric element 32b is preferably disposed on the back face of the panel 10 by a joining member (for example, adhesive).

The input unit 40b detects operation input by the user and may be configured, for example, using operation buttons (operation keys). Note that when the panel 10 is a touch panel, the panel 10 can also detect an operation by the user by detecting contact by the user.

The control unit 50b is a processor that controls the electronic device 1b. The control unit 50b applies a predetermined electric signal to the first piezoelectric element 31b and the second piezoelectric element 32b. Upon the panel 10 detecting contact, the control unit 50b applies an electric signal to the first piezoelectric element 31b to drive the first piezoelectric element 31b. Instead of the panel 10 detecting contact and the control unit 50b applying an electric signal to the first piezoelectric element 31b, the electronic device 1b may include a pressure detection unit (not illustrated) that detects pressure on the panel 10. The first piezoelectric element 31b may then be driven upon data based on pressure on the panel 10 satisfying a predetermined standard.

The pressure detection unit detects pressure on the panel 10 and is configured using, for example, an element such as a strain gauge sensor, a piezoelectric element, or the like that experiences a change in physical or electrical characteristics (strain, resistance, voltage, or the like) in response to pressure. When the pressure detection unit is configured using a piezoelectric element or the like, for example, the magnitude of the voltage (voltage value (referred to below simply as "data")), which is an electrical characteristic, of the piezoelectric element changes in accordance with the magnitude of the load (force) of the pressure on the touch face of the panel 10 (or the speed at which the magnitude of the load (force) changes (acceleration)). The control unit 50b acquires the data by the pressure detection unit notifying the control unit 50b of the data, or by the control unit 50b detecting data pertaining to the piezoelectric element of the pressure detection unit. In other words, the control unit 50b acquires the data based on pressure on the touch face of the panel 10 from the pressure detection unit. Note that when the pressure detection unit is configured using a piezoelectric element, the first piezoelectric element 31b may also serve as the pressure detection unit.

The control unit 50b also applies an electric signal to the second piezoelectric element 32b to drive the second piezoelectric element 32b, thus controlling sound output. The voltage that the control unit 50b applies to the second piezoelectric element 32b may, for example, be ±15 V. This is higher than ±5 V, i.e. the applied voltage of a so-called panel speaker for conduction of sound by air-conducted sound rather than vibration sound. In this way, even if the user presses the panel 10 against the user's body for example with a force of 3 N or greater (a force of 5 N to 10 N), sufficient vibration is generated in the panel 10 to allow for generation of a vibration sound transmitted via a part of the user's body. Note that the magnitude of the applied voltage used may be appropriately adjusted in accordance with the fixation strength of the panel 10 with respect to the housing or a support member, or in accordance with the performance of the first piezoelectric element 31b or the second piezoelectric element 32b. The control unit 50b also drives the second piezoelectric element 32b based on a trigger for sound output from a predetermined application or the like (based on an audio signal (sound signal) or the like).

When outputting sound, the control unit 50b also performs control to drive the first piezoelectric element 31b in addition to the second piezoelectric element 32b. The control unit 50b includes a signal combiner 51. The signal combiner 51 combines the control signal pertaining to provision of a tactile sensation and the control signal pertaining to sound output, providing the result to the first piezoelectric element 31b. Since the signal combiner 51 of the control unit 50b thus combines the control signal pertaining to provision of a tactile sensation and the control signal pertaining to sound output, the tactile sensation providing function of the first piezoelectric element 31b is not obstructed.

As described above, the first piezoelectric element 31b is a piezoelectric element for providing a tactile sensation to a contacting object that is in contact with the panel 10. The piezoelectric element for providing a tactile sensation is preferably larger in size than the piezoelectric element for transmitting sound. In other words, the first piezoelectric element 31b is preferably larger than the second piezoelectric element 32b. Therefore, the resonance frequency of the first piezoelectric element 31b is lower than the resonance frequency of the second piezoelectric element 32b. In this case, the first piezoelectric element 31b preferably transmits low-pitched sound, and the second piezoelectric element 32b preferably transmits high-pitched sound.

Figure 5A:
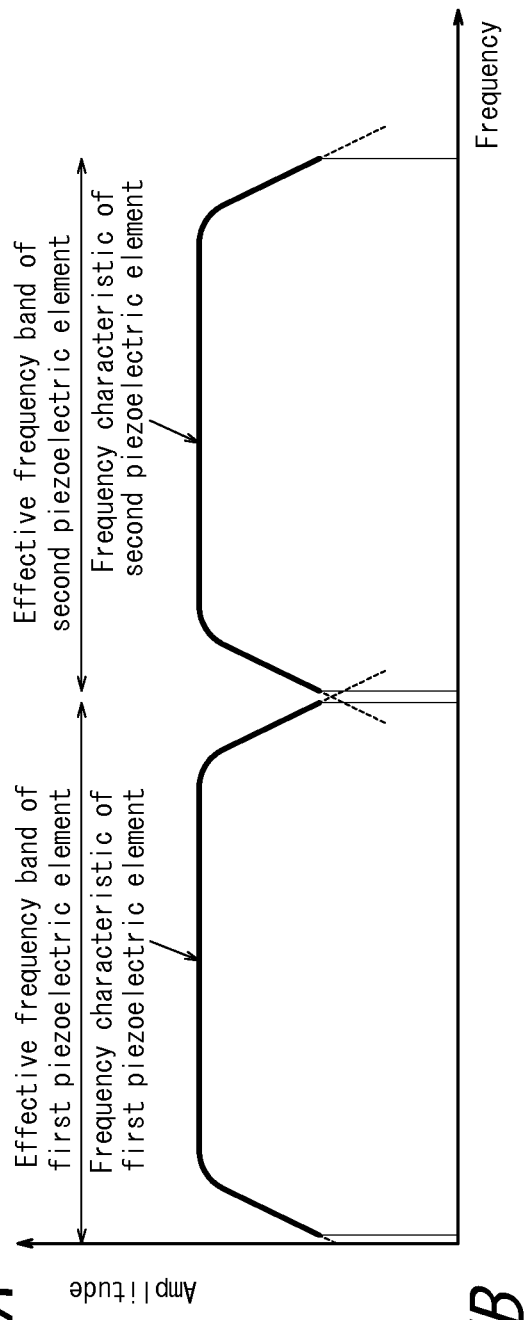
FIGS. 5(a) and 5(b) illustrate an example of the relationship between the effective frequency band of the first piezoelectric element and that of the second piezoelectric element according to Embodiment 2.
Figure 5B:
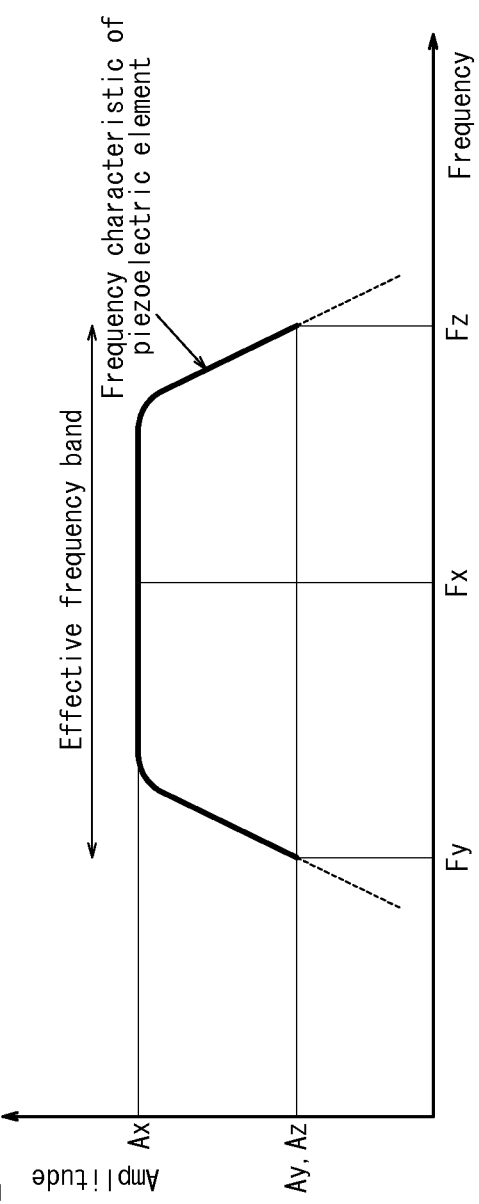

FIGS. 5(a) and 5(b) illustrate the relationship between the effective frequency band of the first piezoelectric element 31b and that of the second piezoelectric element 32b in Embodiment 2. The effective frequency band of the piezoelectric element is the effective frequency band in which the piezoelectric element can emit aurally effective sound. In greater detail, for example taking the amplitude (maximum amplitude) within the resonance frequency of the piezoelectric element as a standard, the effective frequency band of the piezoelectric element is the band of the frequencies having an amplitude of at least ½ of the maximum amplitude. FIG. 5(b) is a conceptual diagram pertaining to the resonance frequency and the effective frequency band of a certain piezoelectric element. In FIG. 5(b), the resonance frequency is Fx, and the effective frequency band is from Fy to Fz. The amplitude at Fx is Ax. The amplitude at a certain frequency Fy (Fy<Fx) is Ay, and the amplitude at a certain frequency Fz (Fx<Fz) is Az. As illustrated in FIG. 5(b), Ay and Az are ½ of Ax, and the amplitude between Fy and Fz is ½ or more of Ax. The effective frequency band may, for example, be the band of frequencies having an amplitude of at least ⅓ of the maximum amplitude and may be set appropriately in accordance with the product being used. The effective frequency band may also be a 3 dB bandwidth centering on the resonance frequency. The resonance frequency and the effective frequency band of the piezoelectric element may also be the resonance frequency and effective frequency band in a vibration system with the piezoelectric element mounted on a touch panel.

In FIG. 5(a), the effective frequency band of the first piezoelectric element 31b and the effective frequency band of the second piezoelectric element 32b do not overlap. In greater detail, for example the effective frequency band of the first piezoelectric element 31b is 1 Hz or more to less than 400 Hz, and the effective frequency band of the second piezoelectric element 32b is 400 Hz or more to less than 20000 Hz. In this case, when outputting sound the control unit 50b performs control so that the sound included in the effective frequency band of the first piezoelectric element 31b is output by the first piezoelectric element 31b, and the sound included in the effective frequency band of the second piezoelectric element 32b is output by the second piezoelectric element 32b. When outputting sound in this way, the first piezoelectric element 31b and the second piezoelectric element 32b complement each other.

Upon the control unit 50b applying an electric signal to the first piezoelectric element 31b and the second piezoelectric element 32b, the first piezoelectric element 31b and the second piezoelectric element 32b to which the electric signal has been applied expand and contract in the direction of the long sides. At this point, the panel 10 to which the first piezoelectric element 31b and the second piezoelectric element 32b are attached deforms in accordance with expansion and contraction of the first piezoelectric element 31b and the second piezoelectric element 32b, and the panel 10 vibrates. The panel 10 flexes due to expansion and contraction or to bending of the first piezoelectric element 31b and the second piezoelectric element 32b. The panel 10 is bent directly by the first piezoelectric element 31b and the second piezoelectric element 32b. Stating that "the panel 10 is bent directly by the piezoelectric element" differs from the phenomenon utilized in known panel speakers, whereby the panel deforms upon vibration of a particular region of the panel due to the inertial force of a piezoelectric actuator constituted by a vibration unit disposed in the casing. Stating that "the panel 10 is bent directly by the piezoelectric element" refers instead to how expansion and contraction or bending (flexure) of the piezoelectric element directly bends the panel via the joining member or via the joining member and the below-described reinforcing member.

When the first piezoelectric element 31b or the second piezoelectric element 32b expands and contracts and the panel 10 vibrates, then along with generating air-conducted sound, the panel 10 generates vibration sound transmitted via a part of the user's body when the user brings a part of the body (such as the cartilage of the outer ear) into contact. The control unit 50b transmits air-conducted sound and vibration sound to an object that contacts the panel 10. For example, the control unit 50b can apply an electric signal, corresponding to an audio signal related to the other party's voice, to the second piezoelectric element 32b to generate air-conducted sound and vibration sound that correspond to the audio signal. The audio signal may be related to ringtones, music including songs, or the like. Note that the audio signal pertaining to the electric signal may be based on music data stored in internal memory of the electronic device 1b, or may be music data stored on an external server or the like and played back over a network.

The panel 10 vibrates not only in the region in which the first piezoelectric element 31b and the second piezoelectric element 32b are attached, but also in a region separate from the attachment region. In the region of vibration, the panel 10 includes a plurality of locations at which the panel 10 vibrates in a direction intersecting the main surface of the panel 10. At each of these locations, the value of the vibration amplitude changes over time from positive to negative or vice-versa. At a given instant during vibration of the panel 10, portions with a relatively large vibration amplitude and portions with a relatively small vibration amplitude appear to be distributed randomly or cyclically over nearly the entire panel 10. In other words, a plurality of vibration waves are detected across the entire panel 10. The voltage that the control unit 50b applies to the second piezoelectric element 32b may be ±15 V to prevent damping of the above-described vibration of the panel 10 even if the user presses the panel 10 against the user's body with a force of, for example, 5 N to 10 N. Therefore, the user can hear sound by contacting a region distant from the above-described attachment region of the panel 10 to the ear.

FIG. 6 illustrates a housing structure of the electronic device 2b according to the present embodiment. The electronic device 1b illustrated in FIG. 6 is a smartphone in which a touch panel that is a glass plate is disposed on the front face of a housing 60 (for example a metal or resin case) as the panel 10. The panel 10 and the input unit 40b are supported by the housing 60, and the display unit 20, first piezoelectric element 31b, and second piezoelectric element 32b are each adhered to the panel 10 by a joining member. The joining member is adhesive with thermosetting properties, ultraviolet curable properties, or other such properties; double-sided tape; or the like. The joining member may, for example, be optical elasticity resin, which is clear and colorless acrylic ultraviolet curing adhesive. In the example illustrated in FIG. 6, the panel 10, display unit 20, first piezoelectric element 31b, and second piezoelectric element 32b are each rectangular.

The display unit 20 is disposed in approximately the center in the transverse direction of the panel 10. The first piezoelectric element 31b is disposed at a predetermined distance from an edge of the panel 10 in the longitudinal direction, near the edge so that the direction of the long sides of the first piezoelectric element 31b extends along a short side of the panel 10. The display unit 20 and the first piezoelectric element 31b are disposed side by side, in parallel directions, on the inner face of the panel 10.

The second piezoelectric element 32b is disposed at a predetermined distance from an edge of the panel 10 in the longitudinal direction, near the edge so that the direction of the long sides of the second piezoelectric element 32b extends along a short side of the panel 10. Note that the positions at which the first piezoelectric element 31b and the second piezoelectric element 32b are disposed are only non-limiting examples. For example, the second piezoelectric element 32b may be disposed so that the direction of the long sides thereof extends along a long side of the panel 10. Alternatively, the second piezoelectric element 32b may be disposed near the opposite edge from the edge at which the first piezoelectric element 31b is disposed. In other words, the first piezoelectric element 31b and the second piezoelectric element 32b may respectively be disposed along the two short sides. This case is preferable in that the first piezoelectric element 31b and the second piezoelectric element 32b do not operate in a direction to obstruct each other's vibration.

Next, with reference to the flowchart in FIG. 7, the operations of the electronic device 1b according to Embodiment 2 are described.

First, the control unit 50b detects whether there is a trigger for sound output from a predetermined application or the like (step S11). When there is a trigger for sound output, processing proceeds to step S12. When there is no trigger for sound output, step S11 is repeated.

In the case of a trigger for sound output, when outputting sound the control unit 50b performs control so that the sound included in the effective frequency band of the first piezoelectric element 31b is output by the first piezoelectric element 31b, and the sound included in the effective frequency band of the second piezoelectric element 32b is output by the second piezoelectric element 32b (step S12). Processing then terminates.

In this way, according to the electronic device 1b of the present embodiment, when outputting sound, the sound included in the effective frequency band of the first piezoelectric element 31b is output by the first piezoelectric element 31b, and the sound included in the effective frequency band of the second piezoelectric element 32b is output by the second piezoelectric element 32b. Therefore, in the case that a piezoelectric element for the tactile sensation providing function and a piezoelectric element for the function to transmit air-conducted sound and the like are provided, the first piezoelectric element 31b and the second piezoelectric element 32b output sound while complementing each other's effective frequency band, thereby improving the acoustic effect.

By vibration of the panel 10, the electronic device 1b can transmit, to the user, air-conducted sound as well as vibration sound that is transmitted through a part of the user's body (such as the cartilage of the outer ear). Therefore, when sound is output at a volume equivalent to a known dynamic receiver, the sound that is transmitted to the periphery of the electronic device 1b by air vibrations due to vibration of the panel 10 is smaller than with a dynamic receiver. Accordingly, the electronic device 1b is appropriate for listening to recorded messages, for example, on the train or the like.

The electronic device 1b transmits vibration sound by vibration of the panel 10, and therefore even if the user is wearing earphones or headphones, for example, the user can hear sound through the earphones or headphones and through a part of the body by contacting the electronic device 1b against the earphones or headphones.

The electronic device 1b transmits sound to a user by vibration of the panel 10. Therefore, if the electronic device 1b is not provided with a separate dynamic receiver, it is unnecessary to form an opening (sound discharge port) for sound transmission in the housing 60, thereby simplifying waterproof construction of the electronic device 1b. On the other hand, if the electronic device 1b is provided with a dynamic receiver, the sound discharge port should be blocked by a member permeable by gas but not liquid. Gore-Tex (registered trademark) is an example of a member permeable by gas but not liquid.

Embodiment 3

The following describes Embodiment 3 of the present invention. Where the structure is the same as in Embodiment 1 or 2, the same reference signs are used, and a description thereof is omitted. An electronic device 2b of Embodiment 2 differs from the electronic device 1b of Embodiment 1 in the relationship between the effective frequency bands of the first piezoelectric element 31b and the second piezoelectric element 32b. In greater detail, the difference is that the effective frequency band of the first piezoelectric element 31b overlaps with the effective frequency band of the second piezoelectric element 32b.

Figure 8:
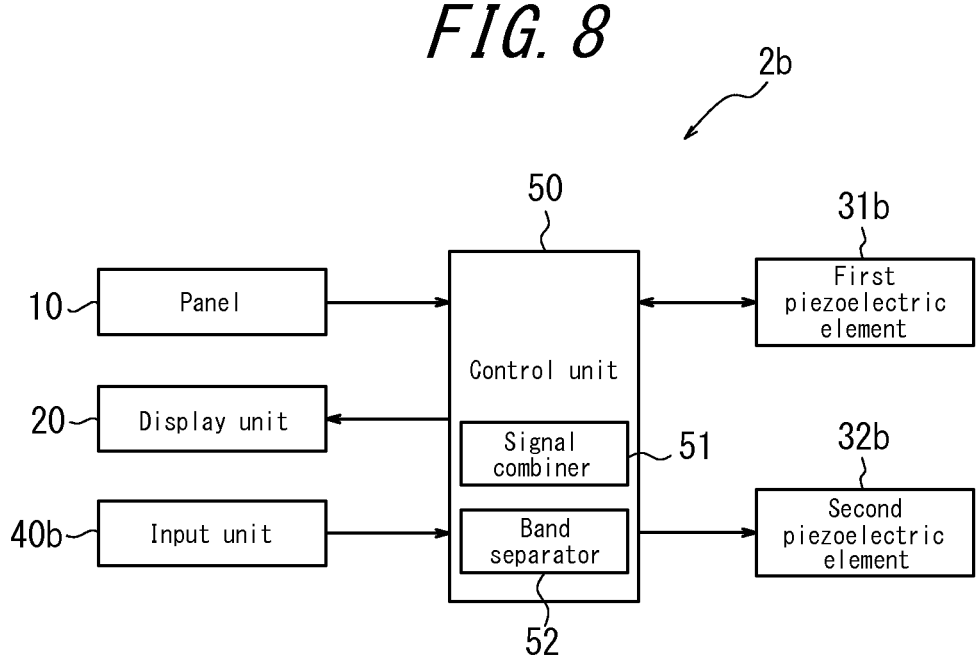
FIG. 8 is a functional block diagram of an electronic device according to Embodiment 3.

FIG. 8 is a functional block diagram of an electronic device 2b according to Embodiment 3 of the present invention. The electronic device 2b according to Embodiment 2 differs in that, in addition to the structure of the electronic device 1b according to Embodiment 1, the control unit 50b includes a band separator 52.

Since the effective frequency band of the first piezoelectric element 31b and the effective frequency band of the second piezoelectric element 32b overlap, the band separator 52 separates the frequency band so that the combined frequency characteristic becomes flat. In greater detail, the volume of the frequency region in which the effective frequency band of the first piezoelectric element 31b and the effective frequency band of the second piezoelectric element 32b overlap becomes extremely large as compared to the volume of other frequency regions. Therefore, based on the frequency band, the band separator 52 separates the signal pertaining to sound that is output so that the volume of the overlapping frequency region does not diverge too far from the volume of the non-overlapping portion and provides the separated signals to the first piezoelectric element 31b and the second piezoelectric element 32b.

The user may wish to emphasize output of low-pitched sound, for example for a low-frequency effect. In this case, it is effective for the band separator 52 not to separate the signal pertaining to sound that is output so that the volume of the frequency region in which the effective frequency band of the first piezoelectric element 31b overlaps with the effective frequency band of the second piezoelectric element 32b, i.e. the low-pitched sound, is greater than the volume of other frequency regions.

Figure 9:
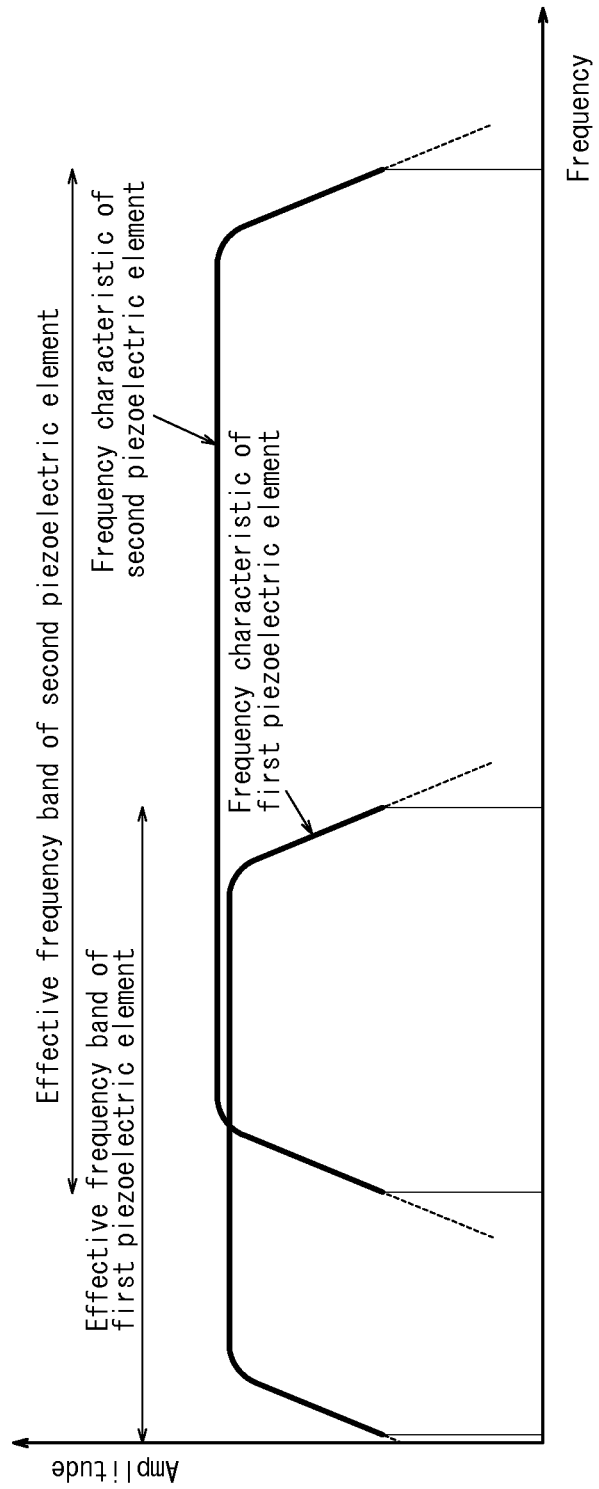
FIG. 9 illustrates another example of the relationship between the effective frequency band of the first piezoelectric element and that of the second piezoelectric element according to Embodiment 3.

FIG. 9 illustrates the relationship between the effective frequency band of the first piezoelectric element 31b and that of the second piezoelectric element 32b according to Embodiment 2. In FIG. 9, the effective frequency band of the first piezoelectric element 31b and the effective frequency band of the second piezoelectric element 32b overlap. In greater detail, for example the effective frequency band of the first piezoelectric element 31b is 1 Hz or more to less than 400 Hz, and the effective frequency band of the second piezoelectric element 32b is 200 Hz or more to less than 20000 Hz. In this case, when emphasizing low-pitched sound in the sound that is output, the control unit 50b also performs control to drive the first piezoelectric element 31b in addition to the second piezoelectric element 32b. On the other hand, when not emphasizing low-pitched sound, the control unit 50b drives the second piezoelectric element 32b without driving the first piezoelectric element 31b. The input unit 40b detects operation input from the user regarding whether to emphasize low-pitched sound. Based on the operation input from the user, the input unit 40b turns a setting to emphasize low-pitched sound (referred to below as a "low-pitched sound emphasis setting") on or off.

Figure 10:
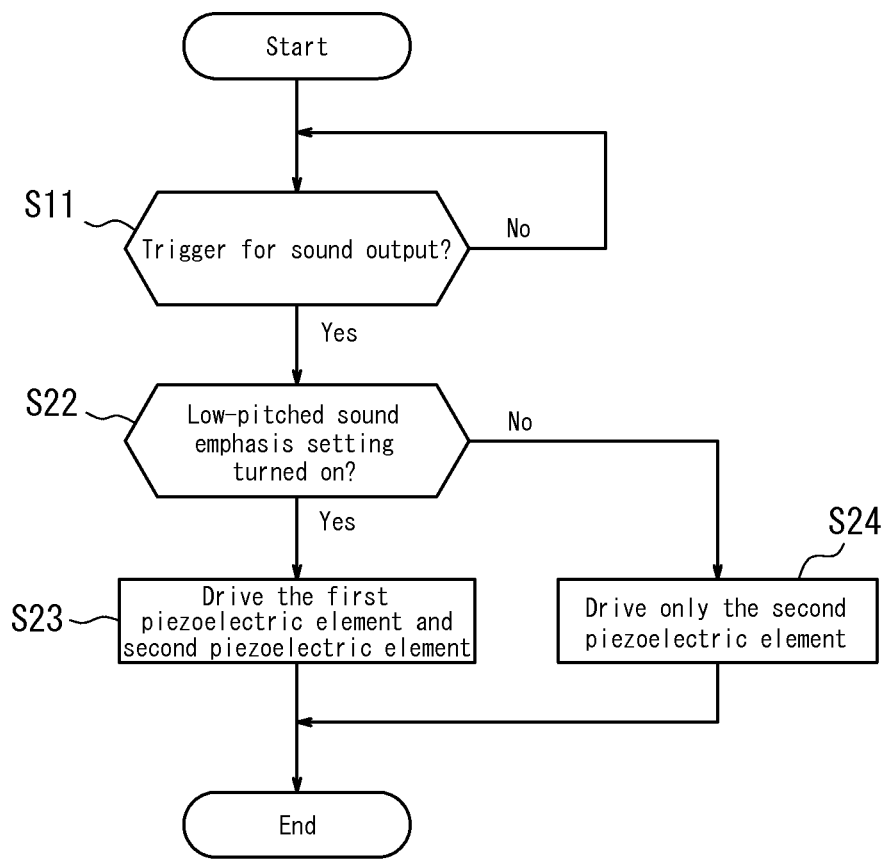
FIG. 10 is a flowchart representing another example of operations by the electronic device according to Embodiment 3.

Next, with reference to the flowchart in FIG. 10, the operations of the electronic device 2b according to Embodiment 3 are described. Where the operations are the same as in Embodiment 2, the same reference signs are used, and a description thereof is omitted.

When there is a trigger for sound output in step S11, the control unit 50b determines whether the low-pitched sound emphasis setting of the electronic device 2b is turned on (step S22). When the low-pitched sound emphasis setting is turned on, processing proceeds to step S23. When the low-pitched sound emphasis setting is turned off, processing proceeds to step S24.

When the low-pitched sound emphasis setting is turned on, the control unit 50b also performs control to drive the first piezoelectric element 31b in addition to the second piezoelectric element 32b for the sound that is output (step S23). Processing then terminates. On the other hand, when the low-pitched sound emphasis setting is turned off, the control unit 50b drives the second piezoelectric element 32b without driving the first piezoelectric element 31b (step S24). Processing then terminates.

In this way, according to the electronic device 2*b* of Embodiment 3, when emphasizing low-pitched sound in the sound that is output, control is performed to drive the first piezoelectric element 31*b* in addition to the second piezoelectric element 32*b*. Hence, when both a piezoelectric element for a tactile sensation providing function and a piezoelectric element for the function to transmit air-conducted sound and the like are provided, the acoustic effect can be improved.

In Embodiment 3, the low-pitched sound emphasis setting is switched by using the first piezoelectric element 31*b* and the second piezoelectric element 32*b* or only using the second piezoelectric element 32*b*, yet switching is not limited in this way. For example, in accordance with the degree of low-pitched sound emphasis, the intensity of vibration of the first piezoelectric element 31*b* may be varied in addition to the second piezoelectric element 32*b*. Alternatively, in accordance with the degree of low-pitched sound emphasis, the band that is separated by the band separator 52 may be varied.

Embodiment 4

The following describes an electronic device according to Embodiment 4 of the present invention with reference to the drawings. Where the structure is the same as in Embodiments 1 through 3, the same reference signs are used, and a description thereof is omitted. The electronic device according to the present invention may be a mobile phone, a smartphone, a tablet PC, or the like provided with a touch panel. The present invention is not, however, limited to such mobile devices and may be any of a variety of electronic devices such as a household appliance, industrial device (factory automation equipment), dedicated terminal, or the like provided with a touch panel.

Figure 11:
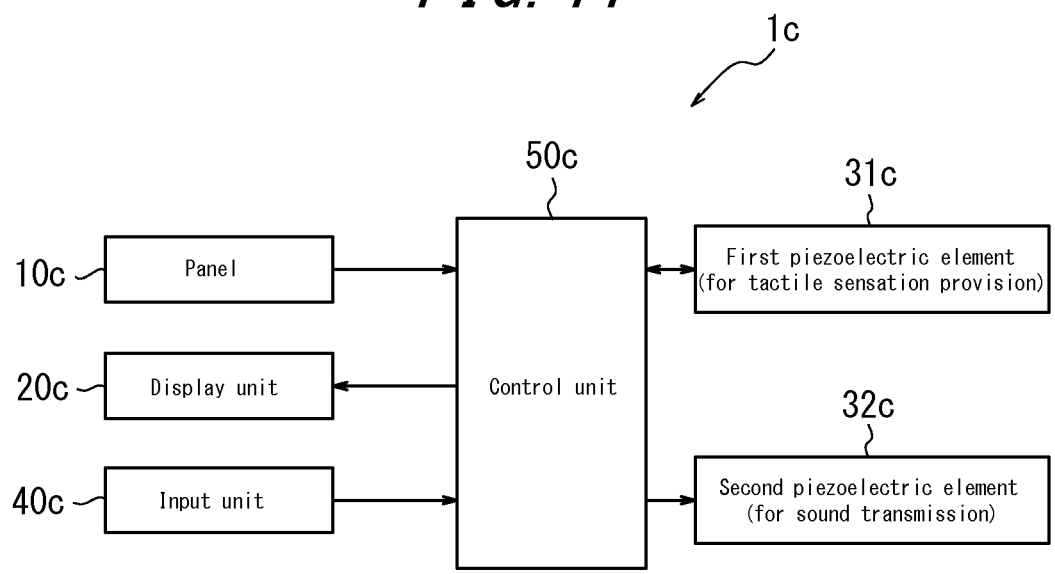
FIG. 11 is a functional block diagram of an electronic device according to Embodiment 4.

FIG. 11 is a functional block diagram of an electronic device according to Embodiment 4 of the present invention.

As illustrated in FIG. 11, an electronic device 1*c* according to Embodiment 4 of the present invention includes a panel 10*c*, a display unit 20*c*, a first piezoelectric element 31*c*, a second piezoelectric element 32*c*, an input unit 40*c*, and a control unit 50*c*. When the electronic device 1*c* of the present embodiment functions as a mobile phone, vibration of the panel 10*c* caused by the second piezoelectric element 32*c* generates sound that is transmitted inside the human body. The sound is transmitted inside the human body by vibration of the middle ear or the inner ear via soft tissue (such as cartilage) of the human body.

The panel 10*c* may be a touch panel that detects contact or a cover panel or the like that protects the display unit 20*c*. The panel 10*c* is preferably made from, for example, glass or a synthetic resin such as acrylic or the like. The panel 10*c* is, for example, made from glass or a synthetic resin such as acrylic or the like. The panel 10*c* is preferably plate-like in shape. The panel 10*c* may be a flat plate or may be a curved panel, the surface of which is smoothly inclined. When the panel 10*c* is a touch panel, the panel 10*c* detects contact by the user's finger, a stylus pen, or the like. Any detection system may be used in the touch panel, such as a capacitive system, a resistive film system, an optical system, a surface acoustic wave system (or an ultrasonic wave system), an infrared system, an electromagnetic induction system, a load detection system, or the like.

Using appropriate means, the panel 10*c* is preferably disposed in a housing or the like in a manner allowing for vibration. In other words, if all of the edges of the panel 10*c* are firmly fixed to a housing or the like, the amplitude when vibrating the panel 10*c* is restricted, and the user cannot be provided with a good tactile sensation. Accordingly, the panel 10*c* is preferably disposed in the housing or the like in a manner allowing for vibration by, for example, disposing the panel 10*c* on the housing via an elastic member or partially fixing the panel 10*c* to the housing.

When the panel 10*c* is configured using a member such as a touch panel, the panel 10*c* detects contact on the touch face by the user's finger, a stylus pen, or the like, and outputs information on the position of the contact. With this output, the control unit 50*c* can acquire the position of contact detected by the panel 10*c*.

The display unit 20*c* is a display device such as a liquid crystal display, an organic EL display, an inorganic EL display, or the like. The display unit 20*c* can display a variety of information and images, as well as objects such as keys, buttons, or the like on the screen. The display unit 20*c* is provided on the back face of the panel 10*c*. The display unit 20*c* is disposed on the back face of the panel 10*c* by a joining member (for example, adhesive). The display unit 20*c* may be disposed at a distance from the panel 10*c* and supported by the housing of the electronic device 1*c*. When the panel 10*c* is configured using a member such as a touch panel, the panel 10*c* is preferably configured using, for example, a transparent member or the like, with the display unit 20*c* disposed at the back face thereof. In this case, an object such as a key, button, or the like can be rendered on the display unit 20*c*, and an operation by which the user presses the object can be detected on the panel 10*c*. Such display on the display unit 20*c* can be implemented by control with the control unit 50*c*.

The first piezoelectric element 31*c* and the second piezoelectric element 32*c* are formed by elements that, upon application of an electric signal (voltage), either expand and contract or bend (flex) in accordance with the electromechanical coupling coefficient of their constituent material. For these piezoelectric elements, ceramic or crystal elements, for example, may be used. The first piezoelectric element 31*c* and the second piezoelectric element 32*c* may be a unimorph, bimorph, or laminated piezoelectric element. Examples of a laminated piezoelectric element include a laminated unimorph element with layers of unimorph (for example, 16 or 24 layers) and a laminated bimorph element with layers of bimorph (for example, 16 or 24 layers). Such a laminated piezoelectric element may be configured with a laminated structure formed by a plurality of dielectric layers composed of, for example, lead zirconate titanate (PZT) and electrode layers disposed between the dielectric layers. Unimorph expands and contracts upon the application of an electric signal (voltage), and bimorph bends upon the application of an electric signal (voltage).

The first piezoelectric element 31*c* and the second piezoelectric element 32*c* are preferably disposed on the back face of the panel 10*c* (the side facing the inside of the electronic device 1*c*). The first piezoelectric element 31*c* and the second piezoelectric element 32*c* are attached to the panel 10*c* by a joining member (for example, double-sided tape). The first piezoelectric element 31*c* and the second piezoelectric element 32*c* may be attached to the panel 10*c* with an intermediate member (for example, sheet metal) therebetween. Once disposed on the back face of the panel 10*c*, the first piezoelectric element 31*c* and the second piezoelectric element 32*c* are separated from the inner surface of the housing by a predetermined distance. The first piezoelectric element 31*c* and the second piezoelectric element 32*c* are preferably separated from the inner surface of the housing by the predetermined distance even when expanding and contracting or bending. In other words, the distance between the first piezoelectric element 31c and second piezoelectric element 32c and the inner face of the housing is preferably larger than the maximum amount of deformation of the first piezoelectric element 31c and the second piezoelectric element 32c.

In the present embodiment, the first piezoelectric element 31c is a piezoelectric element mainly used for providing a tactile sensation. Accordingly, the first piezoelectric element 31c is preferably a piezoelectric element designed to have a suitable frequency characteristic for providing a predetermined tactile sensation based on an electric signal from the control unit 50c. On the other hand, in the present embodiment, the second piezoelectric element 32c is a piezoelectric element mainly used for transmitting sound. Accordingly, the second piezoelectric element 32c is preferably a piezoelectric element designed to have a suitable frequency characteristic for transmitting a predetermined sound based on an electric signal from the control unit 50c. In the present embodiment, the first piezoelectric element and the second piezoelectric element are thus disposed in the panel 10c as different piezoelectric elements.

The input unit 40c detects operation input by the user and may be configured, for example, using operation buttons (operation keys). The input operation by the user detected by the input unit 40c is transmitted to the control unit 50c as an electric signal. When the panel 10c is a touch panel, the panel 10c can also detect contact by the user.

The control unit 50c is a processor that controls the electronic device 1c. The control unit 50c applies a predetermined electric signal to the first piezoelectric element 31c and the second piezoelectric element 32c. Upon the panel 10c detecting contact, the control unit 50c applies an electric signal to the first piezoelectric element 31c to drive the first piezoelectric element 31c.

The control unit 50c also applies an electric signal to the second piezoelectric element 32c to drive the second piezoelectric element 32c, thus controlling sound output. In this way, when controlling sound output by driving the second piezoelectric element 32c, the control unit 50c can perform control to drive the second piezoelectric element 32c based on a trigger for sound output from a predetermined application or the like (based on an audio signal (sound signal) or the like).

The voltage that the control unit 50c applies to the second piezoelectric element 32c may, for example, be ±15 V. This is higher than ±5 V, i.e. the applied voltage of a so-called panel speaker for conduction of sound by air-conducted sound rather than vibration sound. In this way, even if the user presses the panel 10c against the user's body for example with a force of 3 N or greater (a force of 5 N to 10 N), sufficient vibration is generated in the panel 10c to allow for generation of a vibration sound transmitted via a part of the user's body. Note that the magnitude of the applied voltage used may be appropriately adjusted in accordance with the fixation strength of the panel 10c with respect to the housing or a support member, or in accordance with the performance of the first piezoelectric element 31c or the second piezoelectric element 32c.

Upon the control unit 50c applying an electric signal to the first piezoelectric element 31c and the second piezoelectric element 32c, the first piezoelectric element 31c and the second piezoelectric element 32c to which the electric signal has been applied expand and contract in the direction of the long sides of each element. At this point, the panel 10c to which the first piezoelectric element 31c and the second piezoelectric element 32c are attached deforms in accordance with expansion and contraction of the first piezoelectric element 31c and the second piezoelectric element 32c, and the panel 10c vibrates. The panel 10c flexes due to expansion and contraction or to bending of the first piezoelectric element 31c and the second piezoelectric element 32c. The panel 10c is bent directly by the first piezoelectric element 31c and the second piezoelectric element 32c. Stating that "the panel 10c is bent directly by the piezoelectric element" differs from the phenomenon utilized in known panel speakers, whereby the panel deforms upon vibration of a particular region of the panel due to the inertial force of a piezoelectric actuator constituted by a piezoelectric element disposed in the casing. Stating that "the panel 10c is bent directly by the piezoelectric element" refers instead to how expansion and contraction or bending (flexure) of the piezoelectric element directly bends the panel via the joining member or via the joining member and the below-described reinforcing member.

When the second piezoelectric element 32c expands and contracts and the panel 10c vibrates, then along with generating air-conducted sound, the panel 10c generates vibration sound that is transmitted via a part of the user's body when the user brings a part of the body (such as the cartilage of the outer ear) into contact. The control unit 50c transmits air-conducted sound and vibration sound to an object that contacts the panel 10c. For example, the control unit 50c can apply an electric signal, corresponding to an audio signal related to the other party's voice, to the second piezoelectric element 32c to generate air-conducted sound and vibration sound that correspond to the audio signal. The audio signal may be related to ringtones, music including songs, or the like. Note that the audio signal pertaining to the electric signal may be based on music data stored in internal memory of the electronic device 1c, or may be music data stored on an external server or the like and played back over a network.

The panel 10c vibrates not only in the region in which the second piezoelectric element 32c is attached, but also in a region separate from the attachment region. In the region in which vibration is generated, the panel 10c includes a plurality of locations at which the panel 10c vibrates in a direction intersecting the main surface of the panel 10c. At each of these locations, the value of the vibration amplitude changes over time from positive to negative or vice-versa. At a given instant during vibration of the panel 10c, portions with a relatively large vibration amplitude and portions with a relatively small vibration amplitude appear to be distributed randomly or cyclically over nearly the entire panel 10c. In other words, a plurality of vibration waves are detected across the entire panel 10c. The voltage that the control unit 50c applies to the second piezoelectric element 32c may be ±15 V to suppress damping of the above-described vibration of the panel 10c even if the user presses the panel 10c against the user's body with a force of, for example, 5 N to 10 N. Therefore, the user can hear sound by contacting a region distant from the above-described attachment region of the panel 10c to the ear.

FIGS. 12(A) and 12(B) illustrate an example of a housing structure of the electronic device 1c according to Embodiment 1. FIG. 12(A) is a front view, and FIG. 2(B) is a cross-sectional view along the C-C line in FIG. 2(A).

The electronic device 1c illustrated in FIGS. 12(A) and 12(B) is a smartphone in which a touch panel that is a glass plate is disposed on the front face of a housing 60 (for example a metal or resin case) as the panel 10c. The panel 10c and the input unit 40c are supported by the housing 60. The display unit 20c, first piezoelectric elements 31c, and second piezoelectric element 32c are each adhered to the panel 10c via a joining member 70. Note that in the example illustrated in FIG. 12(A), the first piezoelectric elements 31c and the second piezoelectric element 32c are adhered to the back face of the panel. To illustrate this fact, the first piezoelectric elements 31c and the second piezoelectric element 32c are shown with dashed lines in FIG. 12(A). The joining member 70 is adhesive with thermosetting properties, ultraviolet curable properties, or other such properties; double-sided tape; or the like. The joining member 70 may, for example, be optical elasticity resin, which is clear and colorless acrylic ultraviolet curing adhesive. The panel 10c, display unit 20c, first piezoelectric elements 31c, and second piezoelectric element 32c are each generally rectangular.

As illustrated in FIG. 12(A), the display unit 20c is disposed in approximately the center in the transverse direction of the panel 10c. The first piezoelectric elements 31c and the second piezoelectric element 32c are disposed at a predetermined distance from an edge of the panel 10c in the longitudinal direction, near the edge so that the longitudinal direction of the first piezoelectric elements 31c and the second piezoelectric element 32c extends along a short side of the panel 10c.

In FIGS. 12(A) and 12(B), the display unit 20c, first piezoelectric elements 31c, and second piezoelectric element 32c are disposed side by side, in parallel directions, on the back face of the panel 10c, yet the arrangement of these components is not limited to this example. For example, at least one of the first piezoelectric elements 31c and the second piezoelectric element 32c may be disposed in parallel to the longitudinal direction of the electronic device 1c (the lengthwise direction in FIG. 12(A)). In other words, in the present embodiment, any configuration that allows the first piezoelectric elements 31c and the second piezoelectric element 32c to transmit vibration to the panel 10c by being attached to the panel 10c may be adopted.

Furthermore, FIGS. 12(A) and 12(B) illustrate a configuration in which the display unit 20c is adhered to the back face of the panel 10c via the joining member 70, yet the arrangement of the display unit 20c is also not limited to the illustrated example. For example, the display unit 20c may be adhered to the back face of the panel 10c without the joining member 70 therebetween or may be disposed inside the housing 60 instead of being adhered to the panel 10c. When disposing the display unit 20c inside the housing 60, the display unit 20c may be fixed directly on the inside of the housing 60 or may be fixed to a substrate, or to a holder for the display unit, disposed on the inside of the housing 60. If the display unit 20c is disposed on the back face of the panel 10c, as illustrated in FIGS. 12(A) and 12(B), then when the panel 10c and the display unit 20c form a touch panel, any user interface may be displayed on the display unit 20c, and user operation can be detected by the panel 10c. In FIG. 12(A), the display unit 20c is illustrated with a dashed line to indicate that the display unit 20c is adhered to the back face of the panel 10c.

In FIGS. 12(A) and 12(B), in the space enclosed by the housing 60 and the panel 10c, illustration is omitted for components other than the display unit 20c, first piezoelectric elements 31c, second piezoelectric element 32c, input unit 40c, and joining member 70. Accordingly, apart from what is illustrated in FIGS. 12(A) and 12(B), the electronic device 1c may be provided with elements such as the control unit 50c and a variety of substrates, components, or the like. Furthermore, in FIG. 12(A), regarding the region in which display by the display unit 20c does not need to be transmitted to the panel 10c (i.e. the region where the panel 10c and display unit 20c do not overlap), the region near the edges of the panel 10c is preferably painted or covered with a bezel. The first piezoelectric elements 31c, second piezoelectric element 32c, and the like can thus be prevented from being seen from the exterior of the electronic device 1c.

Next, the processing performed by the control unit 50c according to the present embodiment is described.

In the electronic device 1c according to the present embodiment, the control unit 50c performs control to output sound by driving the second piezoelectric element 32c. In this way, in the electronic device 1c, the second piezoelectric element can implement the function of outputting audio and transmitting the audio to the user. In the electronic device 1c according to the present embodiment, the control unit 50c also performs control to drive the first piezoelectric elements 31c upon the panel 10c detecting contact. In this way, in the electronic device 1c, the first piezoelectric elements can implement the function of providing a tactile sensation to the user by generating vibration.

On the other hand, as described above, when providing a plurality of piezoelectric elements for different uses in one panel and driving the piezoelectric element for tactile sensation provision to generate vibration while the piezoelectric element for sound transmission is being vibrated to output sound, there is a risk of interference occurring due to the vibration of both piezoelectric elements. Therefore, in the present embodiment, the processing described below is performed via control by the control unit 50c.

FIG. 13 is a flowchart illustrating processing by the control unit 50c in the electronic device 1c according to Embodiment 4.

Upon the start of processing according to the present embodiment, the control unit 50c first determines whether a trigger for outputting sound has occurred (step S11c). Here, a trigger for outputting sound is envisioned as taking on a variety of forms, such as an instruction to sound a ring tone from a calling application when a call is received or an instruction to play back music or the like from a music player application. In other words, a trigger for outputting sound may be any instruction that serves as an occasion for vibrating the panel 10c to output sound by driving the second piezoelectric element 32c for sound output in the electronic device 1c.

When a trigger for outputting sound has occurred in step S11c, the control unit 50c performs control to output sound by driving the second piezoelectric element 32c (step S12c).

Once the second piezoelectric element has been driven in step S12c, the control unit 50c determines whether the panel 10c has detected contact by the user's finger, ear, or the like (step S13c). Note that when a trigger for outputting sound has not occurred in step S11c, the control unit 50c proceeds to step S13c without driving the second piezoelectric element 32c.

When the panel 10c has not detected contact in step S13c, the control unit 50c returns to step S11c and continues processing. Conversely, when the panel 10c has detected contact in step S13c, the control unit 50c determines whether the second piezoelectric element is being driven (step S14c).

When determining in step S14c that the second piezoelectric element is not being driven, the control unit 50c performs control to provide a tactile sensation by driving the first piezoelectric elements 31c, since at this point, no problem of interference arises even if vibration is generated to provide a tactile sensation (step S15c). In other words, when there is contact on the panel 10c in step S13c and sound is not being output in step S14c, a tactile sensation is provided based on the contact. Accordingly, the user can confirm, via a tactile sensation, that the operation in which the user touched the panel 10c has been properly detected by the electronic device 1c.

Once the first piezoelectric elements are driven in step S15c, then based on the position of the contact detected in step S13c, the control unit 50c preferably performs control to execute predetermined processing associated with the position (step S16c). When, for example, the position of the contact detected on the panel 10c in step S13c corresponds to the position at which an icon for launching an address book application is displayed on the display unit 20c, this predetermined processing may be processing to launch the address book application. When the position of the contact detected on the panel 10c in step S13c corresponds, for example, to the position at which a character key is displayed on the display unit 20c, this predetermined processing may be processing to display the character key on the display unit 20c.

Even if contact is detected on the panel 10c in step S13c, when no processing is associated with the position of the detected contact, the control unit 50c preferably terminates the processing of the present embodiment without executing predetermined processing in step S16c. The case of no processing being associated with the position of detected contact is envisioned as being, for example, the case of the position of contact detected on the panel 10c in step S13c corresponding to a position at which no object, such as an icon or key, is displayed on the display unit 20c.

Conversely, when determining that the second piezoelectric element is being driven in step S14c (while the control unit 50c is driving the second piezoelectric element), the control unit 50c performs control so as not to drive the first piezoelectric elements 31c, since at this point, the problem of interference arises if vibration is generated to provide a tactile sensation (step S17c). In other words, when there is contact on the panel 10c in step S13c and sound is being output in step S14c, a tactile sensation based on the contact is not provided. Accordingly, in the present embodiment, while the second piezoelectric element is being driven and sound is being output, interference does not occur due to vibration of both piezoelectric elements as a result of driving the first piezoelectric element that provides a tactile sensation. After step S17c, based on the position of the contact detected in step S13c, the control unit 50c preferably performs control to execute predetermined processing associated with the position, without providing a tactile sensation (step S16c).

In this way, in the present embodiment, the control unit 50c performs control to output sound by driving the second piezoelectric element 32c and performs control, based on contact on the panel 10c, to drive the first piezoelectric elements 31c and to execute predetermined processing. Furthermore, in the present embodiment, while driving the second piezoelectric element 32c, the control unit 50c executes the predetermined processing based on the contact on the panel 10c without driving the first piezoelectric elements 31c.

In the above-described embodiment, an example has been described in which, when a plurality of first piezoelectric elements 31c are provided as illustrated in FIGS. 12(A) and 12(B) (two in the example in FIGS. 12(A) and 12(B)), all of the first piezoelectric elements 31c are controlled not to be driven while the second piezoelectric element 32c is being driven. By performing such control, even if a plurality of piezoelectric elements are provided for different purposes, the electronic device 1c according to the present embodiment can substantially prevent interference due to vibration of these piezoelectric elements.

Conversely, depending on the specifications of the electronic device 1c, there may be circumstances in which a first piezoelectric element should be driven to provide a tactile sensation even while the second piezoelectric element 32c is being driven to output sound. In such a case, in the present embodiment, while the second piezoelectric element 32c is being driven to output sound, performing control so as not to drive a portion of the plurality of first piezoelectric elements 31c allows for a reduction in the interference due to these piezoelectric elements.

In this case, while driving the second piezoelectric element 32c, the control unit 50c preferably performs control, based on the contact on the panel 10c, so as to execute predetermined processing without driving the first piezoelectric element 31c that, among the first piezoelectric elements 31c, is disposed closest to the second piezoelectric element 32c. For example, when an upper and a lower first piezoelectric element 31c are provided as illustrated in FIGS. 12(A) and 12(B), control may be performed while driving the second piezoelectric element 32c so as not to drive the upper first piezoelectric element 31c, which out of the two first piezoelectric elements 31c is the one closer to the second piezoelectric element 32c.

In this case as well, as described above, when contact is detected on the panel 10c in step S13c, execution of predetermined processing in step S16c may be omitted when no processing is associated with the position of the detected contact.

For example, if the piezoelectric element for tactile sensation provision is driven to provide a tactile sensation while the piezoelectric element for transmitting sound is being driven to generate sound, the piezoelectric element for tactile sensation provision also vibrates the panel, and therefore this vibration is overlaid on the air-conducted sound or vibration sound as noise. When such an electronic device is a communication device, a microphone is normally included. Therefore, in such an electronic device, if a piezoelectric element is driven to provide a tactile sensation while another piezoelectric element is being driven to generate sound, the vibration pertaining to provision of the tactile sensation ends up being picked up by the microphone as noise. Furthermore, while the piezoelectric element for sound transmission is being driven to generate sound, the user may listen to audio by pressing the ear against the panel of such an electronic device. If vibration pertaining to provision of a tactile sensation is generated while the user is listening to audio by pressing the ear against the panel of the electronic device in this way, the user may be surprised or feel uncomfortable. The electronic device 1c according to the present embodiment, however, can eliminate such an inconvenience.

Embodiment 5

Next, an electronic device according to Embodiment 5 of the present invention is described. Where the structure is the same as in Embodiments 1 through 4, the same reference signs are used, and a description thereof is omitted. The electronic device 2c according to Embodiment 5 has the structure of the electronic device 1c according to Embodiment 4, with changes to the control by the control unit 50c. Accordingly, Embodiment 5 of the present invention can basically be implemented with an electronic device having the same structure as the electronic device 1c described in Embodiment 4. Therefore, the same explanation as in Embodiment 4 is omitted.

In Embodiment 4, when contact is detected on the panel 10c, control is performed to execute predetermined processing as necessary without driving the first piezoelectric elements 31c while the second piezoelectric element 32c is being driven. In Embodiment 5, after pressure by the user on the panel 10c increases while contact is continually being detected on the panel, control is performed to execute predetermined processing as necessary without driving the first piezoelectric elements 31c while the second piezoelectric element 32c is being driven.

In order to implement such control, in the present embodiment, the first piezoelectric elements 31c attached to the panel 10c detect pressure on the panel 10c. In general, a piezoelectric element generates voltage when pressure is applied and deforms upon application of voltage. Accordingly, the first piezoelectric elements 31c can be configured as both a functional unit that provides a tactile sensation by generating vibration (tactile sensation providing unit) and a functional unit that detects pressure on the panel 10c (pressure detection unit).

Such a pressure detection unit detects pressure on the touch face of the panel 10c and may be configured using, for example, any number of strain gauge sensors, piezoelectric elements, or the like that experience a change in physical or electrical characteristics (strain, resistance, voltage, or the like) in response to pressure.

When the pressure detection unit is configured using a piezoelectric element, for example, the magnitude of the voltage (voltage value), which is an electrical characteristic, of the piezoelectric element changes in accordance with the magnitude of the load (force) of the pressure on the panel 10c (or the speed at which the magnitude of the load (force) changes (acceleration)). In this case, the pressure detection unit can notify the control unit 50c of the magnitude of the voltage (voltage value (referred to below simply as "data")). The control unit 50c acquires the data by the pressure detection unit notifying the control unit 50c of the data, or by the control unit 50c detecting data pertaining to the piezoelectric element of the pressure detection unit. In other words, the control unit 50c acquires the data based on pressure on the panel 10c. That is, the control unit 50c acquires the data based on pressure from the pressure detection unit. When the data based on pressure satisfies a predetermined standard, the control unit 50c can determine that an operation intended by the user has been performed and can generate predetermined vibration. This predetermined standard may be set appropriately in accordance with the load characteristics when pressing the push-button switch that is intended to be represented. Stating that the data based on pressure satisfies a predetermined standard may refer to the voltage value (data) reaching a predetermined standard, to the voltage value (data) exceeding a predetermined standard, or to detection of a voltage value (data) equivalent to a predetermined standard.

In Embodiment 5 as well, the control unit 50c performs control to output sound by driving the second piezoelectric element 32c. In this way, in the electronic device 1c, the second piezoelectric element can implement the function of outputting audio and transmitting the audio to the user. With regard to this point, Embodiment 5 is the same as Embodiment 4.

On the other hand, in Embodiment 5, when the data based on pressure detected by the first piezoelectric elements 31c satisfies a predetermined standard while the panel 10c is detecting contact, the control unit 50c performs control to drive the first piezoelectric elements 31c and to execute predetermined processing as necessary. In this way, in the electronic device 1c, the first piezoelectric elements can implement the function of providing a tactile sensation to the user by generating vibration while pressure from the user is being applied to the element. Therefore, in Embodiment 5, the frequency, amplitude, intensity, and the like when the first piezoelectric elements generate vibration can be appropriately adjusted to allow for provision of a realistic tactile sensation such as that obtained when actually pressing a mechanical key.

Next, the processing performed by the control unit 50c according to the present embodiment is described. FIG. 14 is a flowchart illustrating processing by the control unit 50c in the electronic device 2c according to Embodiment 5.

As illustrated in FIG. 14, the processing performed by the control unit 50c in Embodiment 5 is the same as the processing pertaining to Embodiment 4 described in FIG. 13, with the insertion of step S21c between step S13c and step S14c. In Embodiment 5, once contact on the panel 10c is detected in step S13c, the control unit 50c determines whether the data based on pressure on the panel 10c detected by the first piezoelectric elements 31c (pressure detection unit) satisfies the above-described predetermined standard (step S21c).

When the data based on pressure on the panel 10c does not satisfy the predetermined standard in step S21c, the control unit 50c returns to step S13c and continues processing. Conversely, when the data based on pressure on the panel 10c satisfies the predetermined standard in step S21c, the control unit 50c determines whether the second piezoelectric element that outputs sound is being driven (step S14c). From step S14c onwards, the processing is the same as in Embodiment 4 described in FIG. 13. In other words, while the second piezoelectric element 32c is being driven, control is performed to execute predetermined processing without driving the first piezoelectric elements 31c, whereas if the second piezoelectric element is not being driven, control is performed to execute predetermined processing after driving the first piezoelectric elements 31c to provide a tactile sensation.

In this way, in the present embodiment, while the second piezoelectric element 32c is being driven, based on pressure on the panel 10c, the control unit 50c performs control to execute predetermined processing without driving the first piezoelectric elements 31c. Accordingly, even if a plurality of piezoelectric elements are provided for different purposes, the electronic device 2c according to the present embodiment can substantially prevent interference due to vibration of these piezoelectric elements. According to the present embodiment, the first piezoelectric elements are driven to provide a tactile sensation while the user is pressing the panel 10c to a certain degree. Hence, a realistic tactile sensation, such as that obtained when actually pressing a mechanical key, is provided. Furthermore, according to the present embodiment, predetermined processing is not executed when only light contact is detected on the panel 10c, but rather is executed when pressure reflecting the user's intent is applied. Therefore, predetermined processing is prevented from being started based on an operation not intended by the user.

In the present embodiment as well, as described in Embodiment 4, when contact is detected on the panel 10c in step S13c, execution of predetermined processing in step S16c may be omitted when no processing is associated with the position of the detected contact. Furthermore, in the present embodiment, as described in Embodiment 4, while the second piezoelectric element 32c is being driven to output sound, performing control so as not to drive a portion of the plurality of first piezoelectric elements 31c allows for a reduction in the interference due to these piezoelectric elements.

In the above-described Embodiment 5, a structure in which the first piezoelectric element 31c functions as both the tactile sensation providing unit and the pressure detection unit has been described. The first piezoelectric element 31c may, however, be given the function of providing a tactile sensation, and a separate pressure detection unit from the first piezoelectric element 31c may be provided. In this case, when the panel 10c is detecting contact in step S13c and data based on pressure detected by the pressure detection unit in step S14c satisfies a predetermined standard, the control unit 50c proceeds to step S14c and continues processing.

In each of the above-described embodiments, the first piezoelectric element is controlled not to provide a tactile sensation while the second piezoelectric element is outputting sound. Conversely, however, the risk of interference due to vibration of both piezoelectric elements may, for example, similarly be reduced by controlling the second piezoelectric element not to output sound while the first piezoelectric element is providing a tactile sensation. In other words, in the present invention, while driving either the second piezoelectric element 32c or the first piezoelectric elements 31c, the control unit 50c may perform control not to drive the other piezoelectric element(s). For example, while driving the first piezoelectric elements 31c, the control unit 50c may perform control not to drive the second piezoelectric element 32c.

In each of the above-described embodiments, a configuration has been described in which an object is displayed on the display unit 20c provided on the back face of the panel, and the panel 10c detects contact by the user. The present invention is not, however, limited to this configuration. For example, a configuration that does not include the display unit 20c may be adopted, with an object being printed directly on the panel 10c with ink or the like.

In the above embodiment, the panel 10c is used to detect contact on the panel 10c. In other words, the panel 10c in the above embodiment is envisioned as being a member such as a so-called touch sensor. The touch panel used in the electronic device according to the present invention, however, may be of any type that is contacted by a contacting object such as a user's finger, a stylus pen, or the like.

For example, the panel used in the electronic device according to the present invention may be a member that does not detect the position of contact on the panel by the contacting object (i.e. a member without a sensing function). In an electronic device with such a structure, further providing a pressure detection unit, for example, that detects pressure on the panel allows for determination, based on the pressure detected by the pressure detection unit, that the panel has been contacted.

By vibration of the panel 10c, the above-described electronic device 1c can transmit, to the user, air-conducted sound as well as vibration sound that is transmitted through a part of the user's body (such as the cartilage of the outer ear). Therefore, when sound is output at a volume equivalent to a known dynamic receiver, the sound that is transmitted to the periphery of the electronic device 1c by air vibrations due to vibration of the panel 10c is smaller than with a dynamic receiver. Accordingly, the electronic device 1c is appropriate for listening to recorded messages, for example, on the train or the like.

The above-described electronic device 1c transmits vibration sound by vibration of the panel 10c, and therefore even if the user is wearing earphones or headphones, for example, the user can hear sound through the earphones or headphones and through a part of the body by contacting the electronic device 1c against the earphones or headphones.

The above-described electronic device 1c transmits sound to a user by vibration of the panel 10c. Therefore, if the electronic device 1c is not provided with a separate dynamic receiver, it is unnecessary to form an opening (sound discharge port) for sound transmission in the housing 60, thereby simplifying waterproof construction of the electronic device 1c. On the other hand, if the electronic device 1c is provided with a dynamic receiver, the sound discharge port should be blocked by a member permeable by gas but not liquid. Gore-Tex (registered trademark) is an example of a member permeable by gas but not liquid.

Embodiment 6

The following describes an electronic device according to Embodiment 6 of the present invention with reference to the drawings. Where the structure is the same as in Embodiments 1 through 5, the same reference signs are used, and a description thereof is omitted. The electronic device according to the present invention may be a mobile phone, a smartphone, a tablet PC, or the like provided with a touch panel. The present invention is not, however, limited to such mobile devices and may be any of a variety of electronic devices such as a household appliance, industrial device (factory automation equipment), dedicated terminal, or the like provided with a touch panel.

Figure 15:
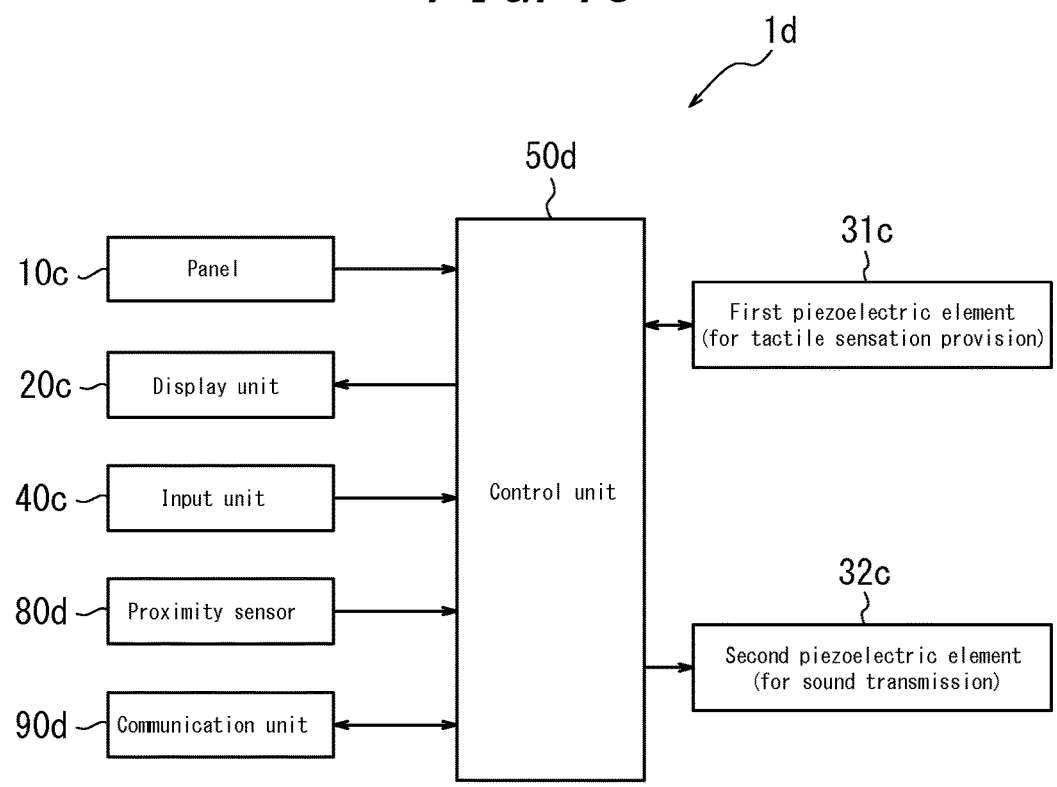
FIG. 15 is a functional block diagram of an electronic device according to Embodiment 6.

FIG. 15 is a functional block diagram of an electronic device according to Embodiment 6 of the present invention.

As illustrated in FIG. 15, an electronic device 1d according to Embodiment 6 of the present invention includes a panel 10c, a display unit 20c, a first piezoelectric element 31c, a second piezoelectric element 32c, an input unit 40c, a control unit 50d, a proximity sensor 80d, and a communication unit 90d. When the electronic device 1d of the present embodiment functions as a mobile phone, vibration of the panel 10c caused by the second piezoelectric element 32c generates sound that is transmitted inside the human body. The sound is transmitted inside the human body by vibration of the middle ear or the inner ear via soft tissue (such as cartilage) of the human body.

In the present embodiment, the first piezoelectric element 31c is a piezoelectric element mainly used for detecting pressure on the panel 10c and for providing a tactile sensation. Accordingly, the first piezoelectric element 31c is preferably a piezoelectric element designed to allow for appropriate detection of pressure on the panel 10c and to have a suitable frequency characteristic for providing a predetermined tactile sensation based on an electric signal from the control unit 50d.

In the present embodiment, once pressure by the user on the panel 10c increases while contact is continually being detected on the panel, control is performed to drive the first piezoelectric element 31c and to execute predetermined processing.

In order to implement such control, the first piezoelectric element 31c attached to the panel 10c detects pressure on the panel 10c. In general, a piezoelectric element generates voltage when pressure is applied and deforms upon application of voltage. Accordingly, the first piezoelectric element 31c can be configured as both a functional unit that detects pressure on the panel 10c (pressure detection unit) and a functional unit that provides a tactile sensation by generating vibration (tactile sensation providing unit).

Such a pressure detection unit detects pressure on the touch face of the panel 10c and may be configured using, for example, any number of strain gauge sensors, piezoelectric elements, or the like that experience a change in physical or electrical characteristics (strain, resistance, voltage, or the like) in response to pressure.

When the pressure detection unit is configured using a piezoelectric element, for example, the magnitude of the voltage (voltage value), which is an electrical characteristic, of the piezoelectric element changes in accordance with the magnitude of the load (force) of the pressure on the panel 10c (or the speed at which the magnitude of the load (force) changes (acceleration)). In this case, the pressure detection unit can notify the control unit 50d of the magnitude of the voltage (voltage value (referred to below simply as "data")). The control unit 50d acquires the data by the pressure detection unit notifying the control unit 50d of the data, or by the control unit 50d detecting data pertaining to the piezoelectric element of the pressure detection unit. In other words, the control unit 50d acquires the data based on pressure on the panel 10c. That is, the control unit 50d acquires the data based on pressure from the pressure detection unit. When the data based on pressure satisfies a predetermined standard, the control unit 50d can determine that an operation intended by the user has been performed and can generate predetermined vibration. This predetermined standard may be set appropriately in accordance with, for example, the load characteristics when pressing the push-button switch that is intended to be represented. Stating that the data based on pressure satisfies a predetermined standard may refer to the voltage value (data) reaching a predetermined standard, to the voltage value (data) exceeding a predetermined standard, or to detection of a voltage value (data) equivalent to a predetermined standard.

On the other hand, in the present embodiment, the second piezoelectric element 32c is a piezoelectric element mainly used for transmitting sound. Accordingly, the second piezoelectric element 32c is preferably a piezoelectric element designed to have a suitable frequency characteristic for transmitting a predetermined sound based on an electric signal from the control unit 50d. In the present embodiment, the first piezoelectric element and the second piezoelectric element are thus disposed in the panel 10c as different piezoelectric elements.

The control unit 50d is a processor that controls the electronic device 1d. As described above, the control unit 50d acquires the data that is based on pressure on the panel 10c as detected by the first piezoelectric element 31c. The control unit 50d also applies a predetermined electric signal to the first piezoelectric element 31c and the second piezoelectric element 32c. For example, based on the pressure on the panel 10c as detected by the first piezoelectric element 31c, the control unit 50d can perform control to apply an electric signal to the first piezoelectric element 31c to drive the first piezoelectric element 31c, thereby vibrating the panel 10c to provide a tactile sensation, and can also perform control to execute predetermined processing.

The control unit 50d also applies an electric signal to the second piezoelectric element 32c to drive the second piezoelectric element 32c, thus controlling sound output. In this way, when controlling sound output by driving the second piezoelectric element 32c, the control unit 50d can perform control to drive the second piezoelectric element 32c based on a trigger for sound output from a predetermined application or the like (based on an audio signal (sound signal) or the like).

The voltage that the control unit 50d applies to the second piezoelectric element 32c may, for example, be ±15 V. This is higher than ±5 V, i.e. the applied voltage of a so-called panel speaker for conduction of sound by air-conducted sound rather than vibration sound. In this way, even if the user presses the panel 10c against the user's body for example with a force of 3 N or greater (a force of 5 N to 10 N), sufficient vibration is generated in the panel 10c to allow for generation of a vibration sound transmitted via a part of the user's body. Note that the magnitude of the applied voltage used may be appropriately adjusted in accordance with the fixation strength of the panel 10c with respect to the housing or a support member, or in accordance with the performance of the first piezoelectric element 31c or the second piezoelectric element 32c.

Upon the control unit 50d applying an electric signal to the first piezoelectric element 31c and the second piezoelectric element 32c, the first piezoelectric element 31c and the second piezoelectric element 32c to which the electric signal has been applied expand and contract in the direction of the long sides of each element. At this point, the panel 10c to which the first piezoelectric element 31c and the second piezoelectric element 32c are attached deforms in accordance with expansion and contraction of the first piezoelectric element 31c and the second piezoelectric element 32c, and the panel 10c vibrates. The panel 10c flexes due to expansion and contraction or to bending of the first piezoelectric element 31c and the second piezoelectric element 32c. The panel 10c is bent directly by the first piezoelectric element 31c and the second piezoelectric element 32c. Stating that "the panel 10c is bent directly by the piezoelectric element" differs from the phenomenon utilized in known panel speakers, whereby the panel deforms upon vibration of a particular region of the panel due to the inertial force of a piezoelectric actuator constituted by a piezoelectric element disposed in the casing. Stating that "the panel 10c is bent directly by the piezoelectric element" refers instead to how expansion and contraction or bending (flexure) of the piezoelectric element directly bends the panel via the joining member or via the joining member and the below-described reinforcing member.

When the second piezoelectric element 32c expands and contracts and the panel 10c vibrates, then along with generating air-conducted sound, the panel 10c generates vibration sound that is transmitted via a part of the user's body when the user brings a part of the body (such as the cartilage of the outer ear) into contact. The control unit 50d transmits air-conducted sound and vibration sound to an object that contacts the panel 10c. For example, the control unit 50d can apply an electric signal, corresponding to an audio signal related to the other party's voice, to the second piezoelectric element 32c to generate air-conducted sound and vibration sound that correspond to the audio signal. The audio signal may be related to ringtones, music including songs, or the like. Note that the audio signal pertaining to the electric signal may be based on music data stored in internal memory of the electronic device 1d, or may be music data stored on an external server or the like and played back over a network.

The panel 10c vibrates not only in the region in which the second piezoelectric element 32c is attached, but also in a region separate from the attachment region. In the region in which vibration is generated, the panel 10c includes a plurality of locations at which the panel 10c vibrates in a direction intersecting the main surface of the panel 10c. At each of these locations, the value of the vibration amplitude changes over time from positive to negative or vice-versa. At a given instant during vibration of the panel 10c, portions with a relatively large vibration amplitude and portions with a relatively small vibration amplitude appear to be distributed randomly or cyclically over nearly the entire panel 10c. In other words, a plurality of vibration waves are detected across the entire panel 10c. The voltage that the control unit 50d applies to the second piezoelectric element 32c may be ±15 V to suppress damping of the above-described vibration of the panel 10c even if the user presses the panel 10c against the user's body with a force of, for example, 5 N to 10 N. Therefore, the user can hear sound by contacting a region distant from the above-described attachment region of the panel 10c to the ear.

Furthermore, in the present embodiment, the user of the electronic device 1d can talk with the user of another electronic device or the like by the control unit 50d executing (running) a calling function. When the calling function is executed in the electronic device 1d, the below-described communication unit 90d communicates with a base station or another communication device via a wired or wireless connection. At this time, functional units pertaining to communication are used as appropriate in the electronic device 1d, such as the second piezoelectric element for outputting sound and a microphone, which is omitted from the drawings. The control unit 50d can also detect that the calling function is being executed in the electronic device 1d. A variety of forms by which the control unit 50d detects execution of the calling function are envisioned. A typical example is that when an application for talking on the phone is being executed (running), the control unit 50d can detect that the calling function is being executed (running). Alternatively, at the time of a call, when the control unit 50d detects that the second piezoelectric element 32c for transmitting sound is being driven, the control unit 50d can detect execution of the calling function. Furthermore, at the time of the call, when the voice of the user or the like is being detected by the non-illustrated microphone, the control unit 50d may detect execution of the calling function.

The proximity sensor 80d detects that a predetermined object, such as the user's ear or the like, has approached the panel 10c to a predetermined distance. A variety of sensors may be used as the proximity sensor 80d. This predetermined distance includes, for example, the state of a predetermined object, such as the user's ear or the like, contacting the proximity sensor 80d (i.e. a distance of zero) and is preferably a distance short enough to allow sufficient transmission of sound to the user's ear or the like by vibration of the second piezoelectric element for outputting sound. By using, for example, a photosensor or the like for the proximity sensor 80d, the proximity sensor 80d can detect that a predetermined object, such as the user's ear or the like, has approached the panel 10c to a predetermined distance when, for example, the user's ear or the like is close to the panel 10c and light is blocked. Furthermore, by using an acceleration sensor, a three-axis sensor, or the like, for example, as the proximity sensor 80d, the proximity sensor 80d can detect that a predetermined object, such as the user's ear or the like, has approached the panel 10c to a predetermined distance when a predetermined condition is satisfied. The result thus detected by the proximity sensor 80d is transmitted to the control unit 50d as an electric signal.

The proximity sensor 80d may also, for example, be a member such as a camera or the like that can acquire an image and detect that a predetermined object, such as the user's ear or the like, has approached to a predetermined distance. In this case, it is possible to determine whether a predetermined object, such as the user's ear or the like, has approached to a predetermined distance by having the control unit 50d process and analyze the image provided by the proximity sensor 80d.

Furthermore, by using a temperature sensor or the like, for example, as the proximity sensor 80d, the proximity sensor 80d may detect the temperature when a predetermined object, such as the user's ear or the like, has approached to a predetermined distance.

Below, the proximity sensor 80d is described as a sensor provided separately from other functional units, yet when another functional unit also serves as the functional unit for the proximity sensor 80d, the proximity sensor 80d need not be provided independently. For example, when the panel 10c can detect contact by an object such as the user's ear, the panel 10c may also fulfill the function of the proximity sensor 80d.

In this case, taking into consideration the area of contact detected by the panel 10c, the control unit 50d preferably detects a predetermined object upon detection of a larger area than a predetermined area, such as that of the user's ear or the like. With this approach, even when detecting an area equal to or less than a predetermined area, such as the user's finger, the control unit 50d can judge that detection has not been made of a predetermined object used in a call.

When, for example, a piezoelectric element such as the first piezoelectric element 31c is caused to function as a pressure detection unit and can detect pressure on the panel 10c by a predetermined object, such as the user's ear or the like, this piezoelectric element may also fulfill the function of the proximity sensor 80d.

When the electronic device 1d is a communication device, the communication unit 90d allows for communication with a base station or another communication device via a wired or wireless connection. When the electronic device 1d communicates with a base station or another communication device wirelessly, the communication unit 90d includes an antenna for such communication.

Figure 16A:
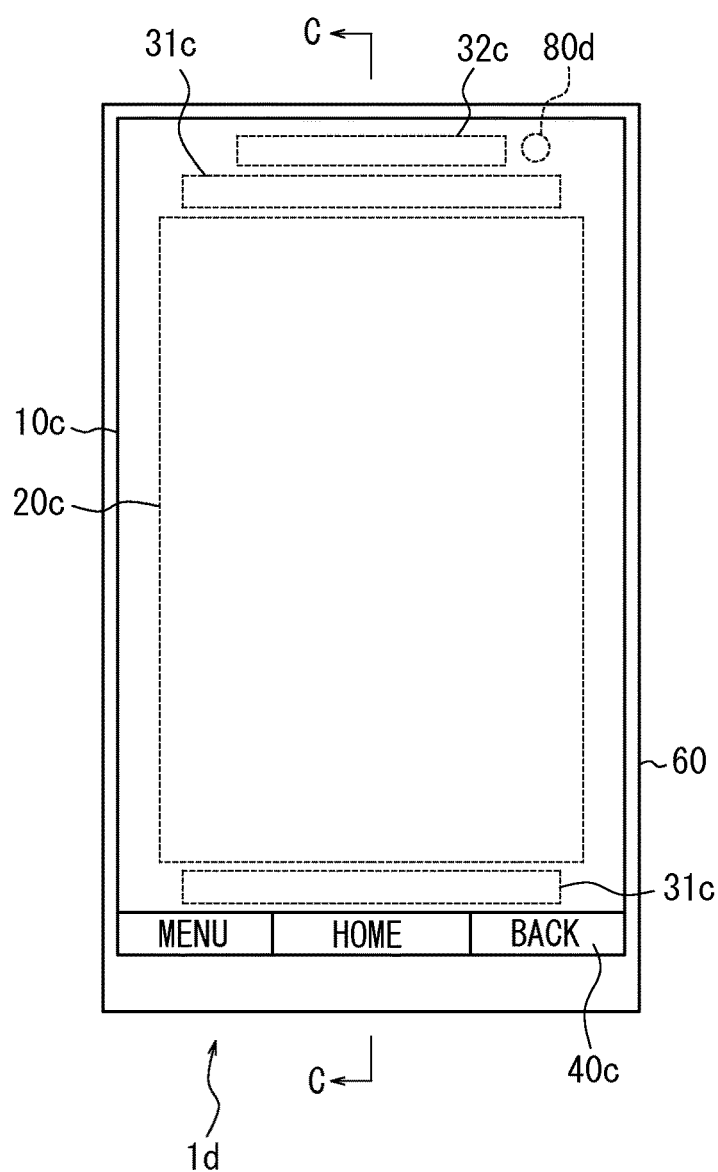
FIGS. 16(A) and 16(B) illustrate an example of a housing structure of the electronic device according to Embodiment 6.
Figure 16B:
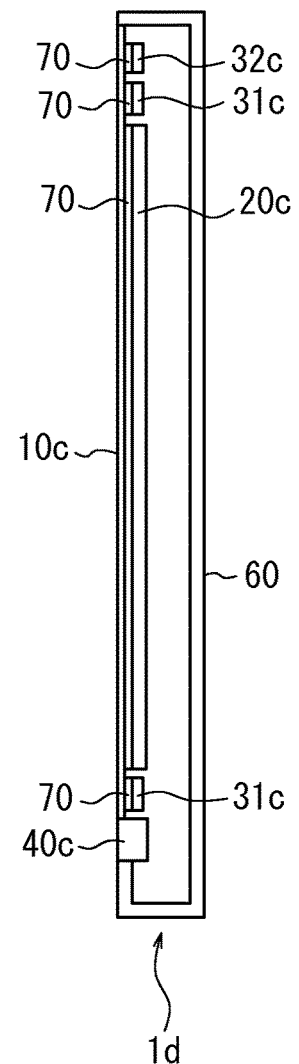

FIGS. 16(A) and 16(B) illustrate an example of a housing structure of the electronic device 1d according to Embodiment 1. FIG. 16(A) is a front view, and FIG. 16(B) is a cross-sectional view along the C-C line in FIG. 17(A).

The electronic device 1d illustrated in FIGS. 16(A) and 16(B) is a smartphone in which a touch panel that is a glass plate is disposed on the front face of a housing 60 (for example a metal or resin case) as the panel 10c. The panel 10c and the input unit 40c are supported by the housing 60. The display unit 20c, first piezoelectric elements 31c, and second piezoelectric element 32c are each adhered to the panel 10c via a joining member 70. Note that in the example illustrated in FIG. 16(A), the first piezoelectric elements 31c and the second piezoelectric element 32c are adhered to the back face of the panel. To illustrate this fact, the first piezoelectric elements 31c and the second piezoelectric element 32c are shown with dashed lines in FIG. 16(A). The joining member 70 is adhesive with thermosetting properties, ultraviolet curable properties, or other such properties; double-sided tape; or the like. The joining member 70 may, for example, be optical elasticity resin, which is clear and colorless acrylic ultraviolet curing adhesive. The panel 10c, display unit 20c, first piezoelectric elements 31c, and second piezoelectric element 32c are each generally rectangular.

As illustrated in FIG. 16(A), the proximity sensor 80d is preferably provided near the second piezoelectric element 32c so as to allow for detection of the user's ear or the like having come close to the location where the second piezoelectric element 32c is provided. As long as the proximity sensor 80d can detect that a portion of the user's body is close to the panel 10c, however, the position at which the proximity sensor 80d is disposed is not limited to the position illustrated in FIG. 16(A). Note that in the example illustrated in FIG. 16(A), the proximity sensor 80d is adhered to the back face of the panel 10c. To illustrate this fact, the proximity sensor 80d is shown with a dashed line in FIG. 16(A).

As illustrated in FIG. 16(A), the display unit 20c is disposed in approximately the center in the transverse direction of the panel 10c. The first piezoelectric elements 31c and the second piezoelectric element 32c are disposed at a predetermined distance from an edge of the panel 10c in the longitudinal direction, near the edge so that the longitudinal direction of the first piezoelectric elements 31c and the second piezoelectric element 32c extends along a short side of the panel 10c.

In FIGS. 16(A) and 16(B), the display unit 20c, first piezoelectric elements 31c, and second piezoelectric element 32c are disposed side by side, in parallel directions, on the back face of the panel 10c, yet the arrangement of these components is not limited to this example. For example, at least one of the first piezoelectric elements 31c and the second piezoelectric element 32c may be disposed in parallel to the longitudinal direction of the electronic device 1d (the lengthwise direction in FIG. 16(A)). In other words, in the present embodiment, any configuration that allows the first piezoelectric elements 31c and the second piezoelectric element 32c to transmit vibration to the panel 10c by being attached to the panel 10c may be adopted.

Furthermore, FIGS. 16(A) and 16(B) illustrate a configuration in which the display unit 20c is adhered to the back face of the panel 10c via the joining member 70, yet the arrangement of the display unit 20c is also not limited to the illustrated example. For example, the display unit 20c may be adhered to the back face of the panel 10c without the joining member 70 therebetween or may be disposed inside the housing 60 instead of being adhered to the panel 10c. When disposing the display unit 20c inside the housing 60, the display unit 20c may be fixed directly on the inside of the housing 60 or may be fixed to a substrate, or to a holder for the display unit, disposed on the inside of the housing 60. If the display unit 20c is disposed on the back face of the panel 10c, as illustrated in FIGS. 16(A) and 16(B), then when the panel 10c and the display unit 20c form a touch panel, any user interface may be displayed on the display unit 20c, and user operation can be detected by the panel 10c. In FIG. 16(A), the display unit 20c is illustrated with a dashed line to indicate that the display unit 20c is adhered to the back face of the panel 10c.

In FIGS. 16(A) and 16(B), in the space enclosed by the housing 60 and the panel 10c, illustration is omitted for components other than the display unit 20c, first piezoelectric elements 31c, second piezoelectric element 32c, input unit 40c, and joining member 70. Accordingly, apart from what is illustrated in FIGS. 16(A) and 16(B), the electronic device 1d may be provided with elements such as the control unit 50d and a variety of substrates, components, or the like. Furthermore, in FIG. 16(A), regarding the region in which display by the display unit 20c does not need to be transmitted to the panel 10c (i.e. the region where the panel 10c and display unit 20c do not overlap), the region near the edges of the panel 10c is preferably painted or covered with a bezel. The first piezoelectric elements 31c, second piezoelectric element 32c, and the like can thus be prevented from being seen from the exterior of the electronic device 1d.

Next, the processing performed by the control unit 50d of the electronic device 1d according to the present embodiment is described.

In the present embodiment, upon execution of the calling function of the electronic device 1d, the control unit 50d performs control to output sound by driving the second piezoelectric element 32c based on an audio signal or the like received by the communication unit 90d from another electronic device. In this way, in the electronic device 1d, the second piezoelectric element can implement the function of outputting audio (sound) during a call and transmitting the audio to the user. In the electronic device 1d according to the present embodiment, the control unit 50d performs control to execute predetermined processing based on pressure on the panel 10c. In this way, in the electronic device 1d, the first piezoelectric element can detect pressure on the panel 10c and can also implement the function of generating vibration to provide a tactile sensation to the user.

On the other hand, when providing a plurality of piezoelectric elements for different uses in one panel, as described above, then if the piezoelectric element for sound transmission is vibrated to output sound while the piezoelectric element for pressure detection is detecting pressure, there is a risk of the pressure detection unit detecting the vibration for sound as noise (and the panel may be detected as being pressed even though it is not being pressed). Therefore, in the present embodiment, the processing described below is performed via control by the control unit 50d.

FIG. 17 is a flowchart illustrating processing by the control unit 50d in the electronic device 1d according to Embodiment 6.

Upon the start of processing according to the present embodiment, the control unit 50d first determines whether a trigger for outputting sound has occurred (step S11d). Here, a trigger for outputting sound is envisioned as taking on a variety of forms, such as an instruction to sound a ring tone from a calling application when a call is received or an instruction to output audio or the like for a call from a calling application. In other words, a trigger for outputting sound may be any of a variety of instructions that serve as an occasion for vibrating the panel 10c to output sound by driving the second piezoelectric element 32c for sound output in the electronic device 1d.

When a trigger for outputting sound has occurred in step S11d, the control unit 50d performs control to output sound by driving the second piezoelectric element 32c (step S12d).

Once the second piezoelectric element has been driven in step S12d, the control unit 50d determines whether the panel 10c has detected contact by the user's finger or the like (step S13d). Note that when a trigger for outputting sound has not occurred in step S11d, the control unit 50d proceeds to step S13d without driving the second piezoelectric element 32c.

When the panel 10c has not detected contact in step S13d, the control unit 50d returns to step S11d and continues processing. Conversely, when the panel 10c has detected contact in step S13d, the control unit 50d determines whether the calling function is running (step S14d).

When judging that the calling function is not running in step S14d, no problem of noise occurs at this point even if pressure is detected on the panel 10c. Accordingly, the control unit 50d determines whether data based on pressure detected by the first piezoelectric elements 31c has satisfied a predetermined standard (step S15d). In order not to detect an operation in which the user unintentionally contacts the panel 10c lightly (and in order to provide the above-described good tactile sensation), the predetermined standard is preferably not set to an extremely low standard. Such a predetermined standard is preferably set by, for example, taking into account the pressure on the panel 10c at the time of a regular user operation, and the setting can preferably be changed afterwards in accordance with user preference.

When the data based on pressure on the panel 10c does not satisfy the predetermined standard in step S15d, the control unit 50d returns to step S13d and continues processing. Conversely, when the data based on pressure on the panel 10c satisfies the predetermined standard in step S15d, then based on the position of the contact detected in step S13d, the control unit 50d preferably performs control to execute predetermined processing associated with the position (step S16d). When, for example, the position of the contact detected on the panel 10c in step S13d corresponds to the position at which an icon for launching an address book application is displayed on the display unit 20c, this predetermined processing may be processing to launch the address book application. When the position of the contact detected on the panel 10c in step S13d corresponds, for example, to the position at which a character key is displayed on the display unit 20c, this predetermined processing may be processing to display the character key on the display unit 20c.

When predetermined processing is executed in step S16d, the control unit 50d may provide a tactile sensation by driving the first piezoelectric elements 31c to drive the panel 10c. In this way, the user can confirm, via a tactile sensation, that the operation the user performed on the panel 10c has been properly detected by the electronic device 1d.

In this case, when data based on pressure detected by the first piezoelectric elements 31c satisfies a predetermined standard while contact is continually being detected on the panel 10c, the first piezoelectric elements 31c are driven to provide a tactile sensation. In this way, in the electronic device 1d, the first piezoelectric elements 31c can implement the function of providing a tactile sensation to the user by generating vibration while pressure from the user is being applied to the element. Therefore, the frequency, amplitude, intensity, and the like when the first piezoelectric elements 31c generate vibration can be appropriately adjusted to allow for provision of a realistic tactile sensation such as that obtained when actually pressing a mechanical key.

Even if contact is detected on the panel 10c in step S13d, when no processing is associated with the position of the detected contact, the control unit 50d preferably terminates the processing of the present embodiment without executing predetermined processing in step S16d. The case of no processing being associated with the position of detected contact is envisioned as being, for example, the case of the position of contact detected on the panel 10c in step S13d corresponding to a position at which no object, such as an icon or key, is displayed on the display unit 20c.

On the other hand, when it is judged in step S14d that the calling function is running, the control unit 50d controls the proximity sensor 80d to determine whether a predetermined object, such as the user's ear or the like, has approached the panel 10c to a predetermined distance (step S17d). In step S17d, when the proximity sensor 80d determines that proximity of a predetermined object, such as the user's ear or the like, has not been detected, then it is assumed that even during a call, the user may wish to perform an operation on the panel 10c, for example to confirm a schedule. Accordingly, in this case, the control unit 50d determines whether data based on pressure detected by the first piezoelectric elements 31c has satisfied a predetermined standard (step S15d) and performs control to execute predetermined processing when the data based on pressure has satisfied a predetermined standard (step S16d).

On the other hand, when it is determined in step S17d that the proximity sensor 80d has detected proximity of a predetermined object, detecting pressure on the panel 10c at that point in time may lead to the problem of noise. Accordingly, in this case, the control unit 50d performs control so that the first piezoelectric elements 31c do not detect pressure on the panel 10c (step S18d). In other words, in the case that the panel 10c is contacted in step S13d, the calling function is running in step S14d, and the user's ear or the like is close to the proximity sensor in step S17d, then the first piezoelectric elements 31c do not detect pressure on the panel 10c. Accordingly, in the present embodiment, while the second piezoelectric element 32c is being driven (vibrated) to output sound, the first piezoelectric elements 31c do not detect pressure, and therefore sound generated by the second piezoelectric element 32c is not detected by the first piezoelectric elements 31c as noise.

After step S18d, since pressure on the panel 10c is not detected by the first piezoelectric elements 31c, the control unit 50d terminates the processing according to the present embodiment without executing predetermined processing in step S16d. In this case, the first piezoelectric elements 31c are also preferably configured not to provide a tactile sensation.

In this way, in the present embodiment, the control unit 50d performs control to output sound by driving the second piezoelectric element 32c upon execution of the calling function and performs control, based on pressure on the panel 10c, to execute predetermined processing. For example, once the data based on pressure detected by the first piezoelectric elements 31c satisfies a predetermined standard, the control unit 50d preferably performs control to drive the piezoelectric element that vibrates the panel 10c. In the present embodiment, while the calling function is running, the control unit 50d performs control, based on results of detection by the proximity sensor 80d, so that the first piezoelectric elements 31c do not detect pressure on the panel.

In the above-described embodiment, an example has been described in which, when a plurality of first piezoelectric elements 31c are provided as illustrated in FIGS. 16(A) and 16(B) (two in the example in FIGS. 16(A) and 16(B)), all of the first piezoelectric elements 31c are controlled not to detect pressure while the second piezoelectric element 32c is being driven. By performing such control, even if a plurality of piezoelectric elements are provided for different purposes, the electronic device 1d according to the present embodiment can substantially prevent the problem of noise due to vibration of the piezoelectric elements.

Conversely, depending on the specifications of the electronic device 1d, there may be circumstances in which a first piezoelectric element should detect pressure even while the second piezoelectric element 32c is being driven to output sound. In such a case, in the present embodiment, while the second piezoelectric element 32c is being driven to output sound, performing control so that a portion of the plurality of first piezoelectric elements 31c does not detect pressure allows for a reduction in the problem of noise due to these piezoelectric elements.

In this case, while executing the calling function, the control unit 50d preferably performs control, based on the results of detection by the proximity sensor 80d, so that the first piezoelectric element 31c that, among the first piezoelectric elements 31c, is disposed closest to the second piezoelectric element 32c does not detect pressure. For example, when an upper and a lower first piezoelectric element 31c are provided as illustrated in FIGS. 16(A) and 16(B), control may be performed while driving the second piezoelectric element 32c so that the upper first piezoelectric element 31c, which out of the two first piezoelectric elements 31c is the one closer to the second piezoelectric element 32c, does not detect pressure.

Embodiment 7

Next, an electronic device according to Embodiment 7 of the present invention is described. Where the structure is the same as in Embodiments 1 through 6, the same reference signs are used, and a description thereof is omitted. The electronic device 2d according to Embodiment 7 has a simplified version of the structure of the electronic device 1d according to Embodiment 6, with changes to the control by the control unit 50d. Accordingly, Embodiment 7 of the present invention can basically be implemented by omitting a portion of the functional units in an electronic device having the same structure as the electronic device 1d described in Embodiment 6. Therefore, the same explanation as in Embodiment 6 is omitted.

In the above-described Embodiment 6, when contact is detected on the panel 10c, the first piezoelectric elements 31c are controlled not to detect pressure while the calling function is running and a predetermined object is close to the proximity sensor 80d. In Embodiment 7, regardless of whether the proximity sensor 80d detects proximity of a predetermined object, control is performed to determine whether to cause the first piezoelectric elements 31c not to detect pressure based on the result of whether the second piezoelectric element 32c is being driven.

Accordingly, the electronic device 2d according to Embodiment 7 can be structured by omitting the proximity sensor 80d from the electronic device 1d described in FIG. 15. The remaining structure may be the same as the electronic device 1d described in FIG. 15.

In Embodiment 7, the control unit 50d performs control to output sound by driving the second piezoelectric element 32c. In this way, in the electronic device 2d as well, the second piezoelectric element 32c can implement the function of outputting audio and transmitting the audio to the user.

Figure 18:
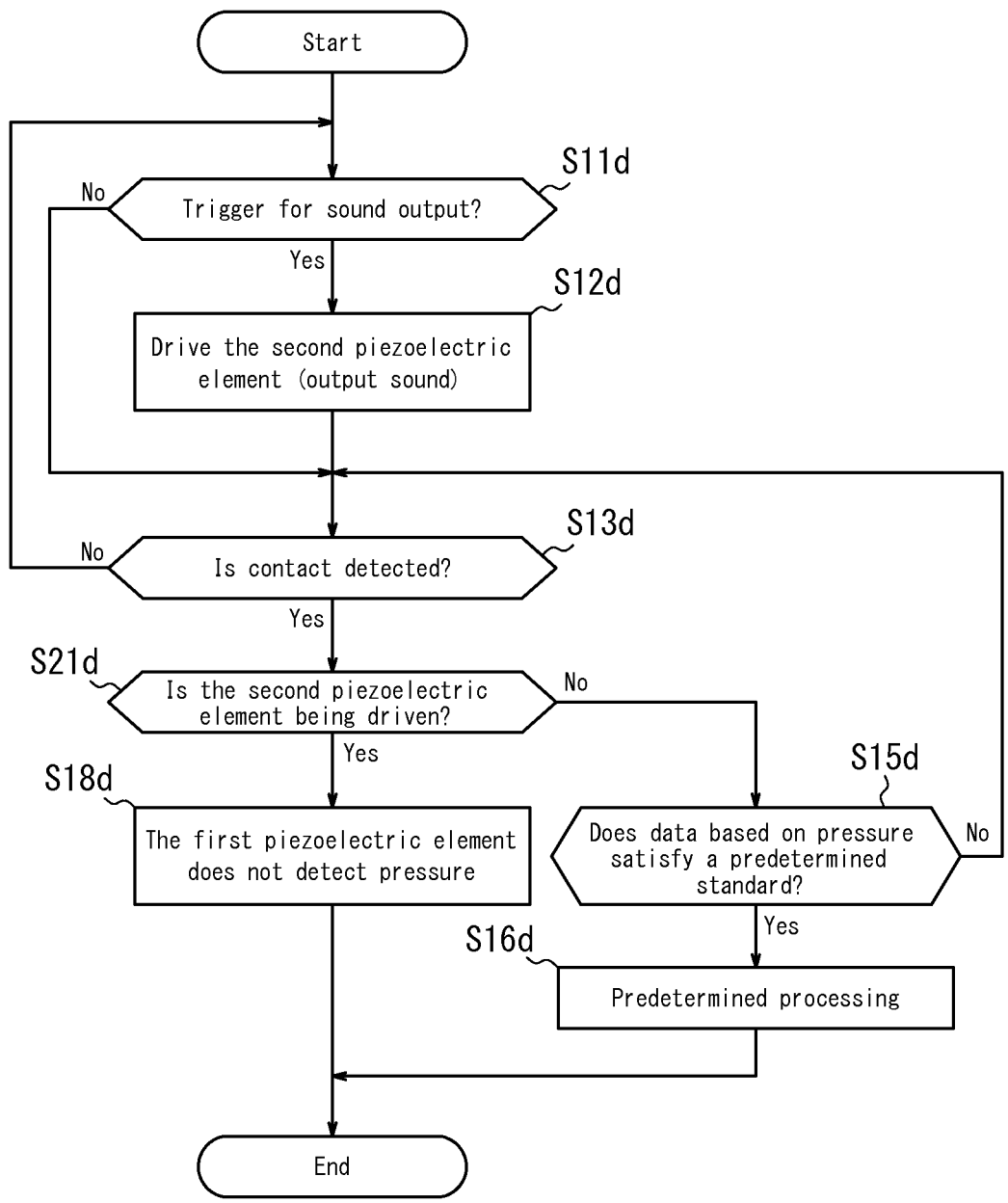
FIG. 18 is a flowchart illustrating processing by the electronic device according to Embodiment 7.

Next, the processing performed by the control unit 50d of the electronic device 2d according to the present embodiment is described. FIG. 18 is a flowchart illustrating processing by the control unit 50d in the electronic device 2d according to Embodiment 7. The following mainly describes the processing that differs from Embodiment 6 described in FIG. 17.

The flowchart in FIG. 18 is the same as the flowchart in FIG. 17, except that the processing in step S14d is replaced by the processing in step S21d, and the processing in step S17d is omitted.

In Embodiment 7, when contact on the panel 10c is detected in step S13d, the control unit 50d determines whether driving of the second piezoelectric element 32c that began in step S12d is still continuing (step S21d). In other words, in step S21d, the control unit 50d determines whether sound is being output due to the second piezoelectric element 32c being driven.

When determining that the second piezoelectric element 32c is not being driven in step S21d, no problem of noise occurs at this point even if pressure is detected on the panel 10c. Accordingly, in this case, the control unit 50d determines whether data based on pressure detected by the first piezoelectric elements 31c has satisfied a predetermined standard (step S15d) and performs control to execute predetermined processing when the data based on pressure has satisfied a predetermined standard (step S16d).

On the other hand, when it is determined in step S21d that the second piezoelectric element 32c is being driven, detecting pressure on the panel 10c at that point in time leads to the problem of noise. Accordingly, in this case, the control unit 50d performs control so that the first piezoelectric elements 31c do not detect pressure (step S18d) and then terminates the processing of the present embodiment.

In this way, in the present embodiment, the control unit 50d performs control to output sound by driving the second piezoelectric element 32c and performs control, based on pressure on the panel 10c, to execute predetermined processing. For example, once the data based on pressure detected by the first piezoelectric elements 31c satisfies a predetermined standard, the control unit 50d preferably performs control to drive the piezoelectric element that vibrates the panel 10c. In the present embodiment, when performing control to output sound by driving the second piezoelectric element 32c, the control unit 50d performs control so that the first piezoelectric elements 31c do not detect pressure on the panel. Accordingly, in the present embodiment as well, while the second piezoelectric element 32c is being driven to output sound, the first piezoelectric elements 31c do not detect pressure, and therefore sound generated by the second piezoelectric element 32c is not detected by the first piezoelectric elements 31c as noise.

In the above-described embodiment, a structure in which the first piezoelectric element 31c functions as both the tactile sensation providing unit and the pressure detection unit has been described. The first piezoelectric element 31c may, however, be given the function of providing a tactile sensation, and a separate pressure detection unit from the first piezoelectric element 31c may be provided. In this case, when the panel 10c is detecting contact in step S13d and data based on pressure detected by the pressure detection unit in step S15d satisfies a predetermined standard, the control unit 50d proceeds to step S16d and continues processing.

In each of the above-described embodiments, a configuration has been described in which an object is displayed on the display unit 20c provided on the back face of the panel, and the panel 10c detects contact by the user. The present invention is not, however, limited to this configuration. For example, a configuration that does not include the display unit 20c may be adopted, with an object being printed directly on the panel 10c with ink or the like.

In the above embodiment, the panel 10c is used to detect contact on the panel 10c. In other words, the panel 10c in the above embodiment is envisioned as being a member such as a so-called touch sensor. The touch panel used in the electronic device according to the present invention, however, may be of any type that is contacted by a contacting object such as a user's finger, a stylus pen, or the like.

For example, the panel used in the electronic device according to the present invention may be a member that does not detect the position of contact on the panel by the contacting object (i.e. a member without a sensing function). In an electronic device with such a structure, further providing a pressure detection unit, for example, that detects pressure on the panel allows for determination, based on the pressure detected by the pressure detection unit, that the panel has been contacted.

By vibration of the panel 10c, the above-described electronic device 1d can transmit, to the user, air-conducted sound as well as vibration sound that is transmitted through a part of the user's body (such as the cartilage of the outer ear). Therefore, when sound is output at a volume equivalent to a known dynamic receiver, the sound that is transmitted to the periphery of the electronic device $1d$ by air vibrations due to vibration of the panel $10c$ is smaller than with a dynamic receiver. Accordingly, the electronic device $1d$ is appropriate for listening to recorded messages, for example, on the train or the like.

The above-described electronic device $1d$ transmits vibration sound by vibration of the panel $10c$, and therefore even if the user is wearing earphones or headphones, for example, the user can hear sound through the earphones or headphones and through a part of the body by contacting the electronic device $1d$ against the earphones or headphones.

The above-described electronic device $1d$ transmits sound to a user by vibration of the panel $10c$. Therefore, if the electronic device $1d$ is not provided with a separate dynamic receiver, it is unnecessary to form an opening (sound discharge port) for sound transmission in the housing $60$, thereby simplifying waterproof construction of the electronic device $1d$. On the other hand, if the electronic device $1d$ is provided with a dynamic receiver, the sound discharge port should be blocked by a member permeable by gas but not liquid. Gore-Tex (registered trademark) is an example of a member permeable by gas but not liquid.

Embodiment 8

The following describes an electronic device according to Embodiment 8 of the present invention with reference to the drawings. Where the structure is the same as in Embodiments 1 through 7, the same reference signs are used, and a description thereof is omitted. The electronic device according to the present invention may be a mobile phone, a smartphone, a tablet PC, or the like provided with a touch panel. The present invention is not, however, limited to such mobile devices and may be any of a variety of electronic devices such as a household appliance, industrial device (factory automation equipment), dedicated terminal, or the like provided with a touch panel.

Figure 19:
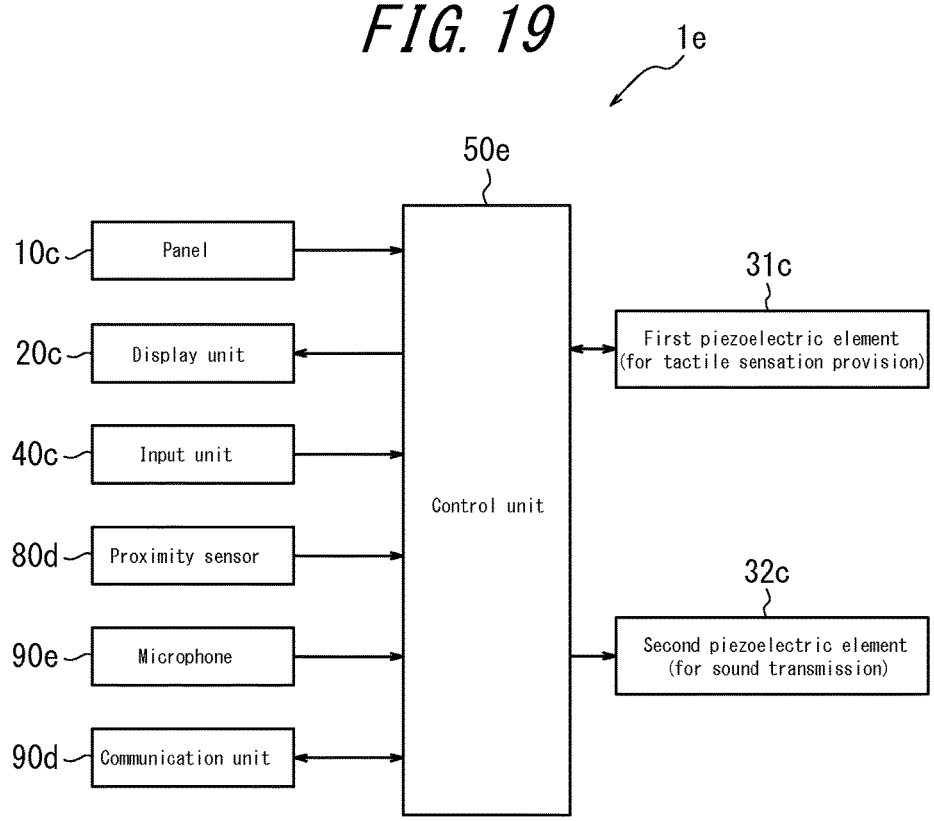
FIG. 19 is a functional block diagram of an electronic device according to Embodiment 8.

FIG. 19 is a functional block diagram of an electronic device according to Embodiment 8 of the present invention.

As illustrated in FIG. 19, an electronic device $1e$ according to Embodiment 8 of the present invention includes a panel $10c$, a display unit $20c$, a first piezoelectric element $31c$, a second piezoelectric element $32c$, an input unit $40c$, a control unit $50e$, and a proximity sensor $80d$. When the electronic device $1e$ of the present embodiment functions as a mobile phone, vibration of the panel $10$ caused by the second piezoelectric element $32c$ generates sound that is transmitted inside the human body. The sound is transmitted inside the human body by vibration of the middle ear or the inner ear via soft tissue (such as cartilage) of the human body.

The control unit $50e$ is a processor that controls the electronic device $1e$. The control unit $50e$ applies a predetermined electric signal to the first piezoelectric element $31c$ and the second piezoelectric element $32c$. Upon the panel $10c$ detecting contact, the control unit $50e$ applies an electric signal to the first piezoelectric element $31c$ to drive the first piezoelectric element $31c$.

The control unit $50e$ also applies an electric signal to the second piezoelectric element $32c$ to drive the second piezoelectric element $32c$, thus controlling sound output. In this way, when controlling sound output by driving the second piezoelectric element $32c$, the control unit $50e$ can perform control to drive the second piezoelectric element $32c$ based on a trigger for sound output from a predetermined application or the like (based on an audio signal (sound signal) or the like).

The voltage that the control unit $50e$ applies to the second piezoelectric element $32c$ may, for example, be $\pm 15$ V. This is higher than $\pm 5$ V, i.e. the applied voltage of a so-called panel speaker for conduction of sound by air-conducted sound rather than vibration sound. In this way, even if the user presses the panel $10c$ against the user's body for example with a force of 3 N or greater (a force of 5 N to 10 N), sufficient vibration is generated in the panel $10c$ to allow for generation of a vibration sound transmitted via a part of the user's body. Note that the magnitude of the applied voltage used may be appropriately adjusted in accordance with the fixation strength of the panel $10c$ with respect to the housing or a support member, or in accordance with the performance of the first piezoelectric element $31c$ or the second piezoelectric element $32c$.

Upon the control unit $50e$ applying an electric signal to the first piezoelectric element $31c$ and the second piezoelectric element $32c$, the first piezoelectric element $31c$ and the second piezoelectric element $32c$ to which the electric signal has been applied expand and contract in the direction of the long sides of each element. At this point, the panel $10c$ to which the first piezoelectric element $31c$ and the second piezoelectric element $32c$ are attached deforms in accordance with expansion and contraction of the first piezoelectric element $31c$ and the second piezoelectric element $32c$, and the panel $10c$ vibrates. The panel $10c$ flexes due to expansion and contraction or to bending of the first piezoelectric element $31c$ and the second piezoelectric element $32c$. The panel $10c$ is bent directly by the first piezoelectric element $31c$ and the second piezoelectric element $32c$. Stating that "the panel $10c$ is bent directly by the piezoelectric element" differs from the phenomenon utilized in known panel speakers, whereby the panel deforms upon vibration of a particular region of the panel due to the inertial force of a piezoelectric actuator constituted by a piezoelectric element disposed in the casing. Stating that "the panel $10c$ is bent directly by the piezoelectric element" refers instead to how expansion and contraction or bending (flexure) of the piezoelectric element directly bends the panel via the joining member or via the joining member and the below-described reinforcing member.

Furthermore, in the present embodiment, the user of the electronic device $1e$ can talk with the user of another electronic device or the like by the control unit $50e$ executing (running) a calling function. When the calling function is executed in the electronic device $1e$, the below-described communication unit $90d$ communicates with a base station or another communication device via a wired or wireless connection. At this time, functional units pertaining to communication are used as appropriate in the electronic device $1e$, such as the second piezoelectric element for outputting sound and a microphone $90e$. The control unit $50e$ can also detect that the calling function is being executed in the electronic device $1e$. A variety of forms by which the control unit $50e$ detects execution of the calling function are envisioned. A typical example is that when an application for talking on the phone is being executed (running), the control unit $50e$ can detect that the calling function is being executed (running). Alternatively, at the time of a call, when the control unit $50e$ detects that the second piezoelectric element $32c$ for transmitting sound is being driven, the control unit $50e$ can detect execution of the calling function. Furthermore, at the time of the call, when the voice of the user or the like is being detected by the microphone 90e, the control unit 50e may detect execution of the calling function.

The microphone 90e picks up surrounding sound, such as speech by the user. The sound picked up by the microphone 90e is transmitted to the control unit 50e as an electric signal.

Figure 20A:
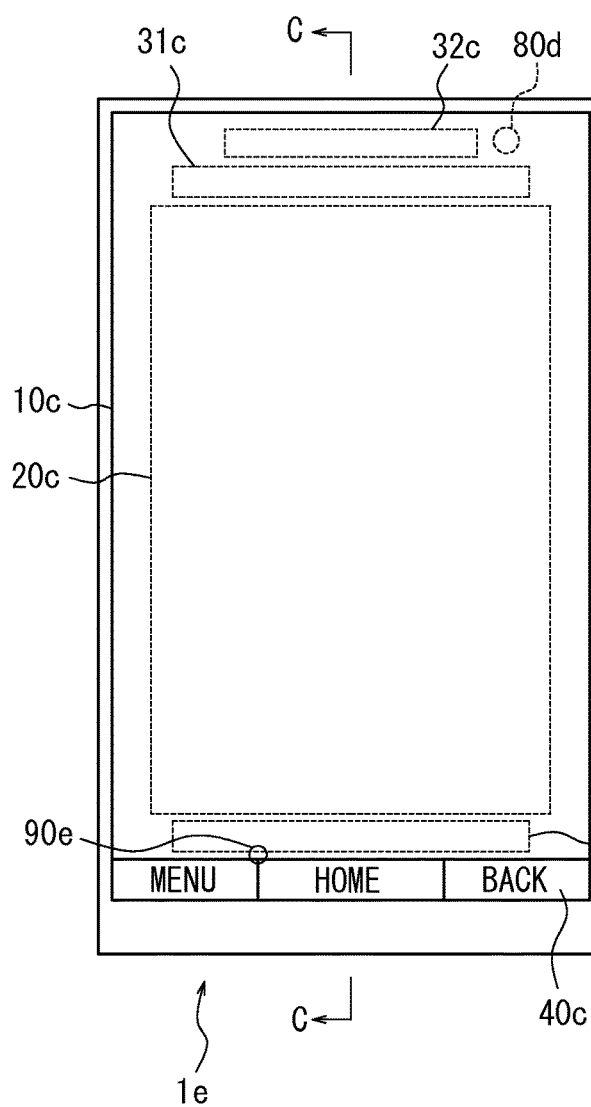
FIGS. 20(A) and 20(B) illustrate an example of a housing structure of the electronic device according to Embodiment 8.
Figure 20B:
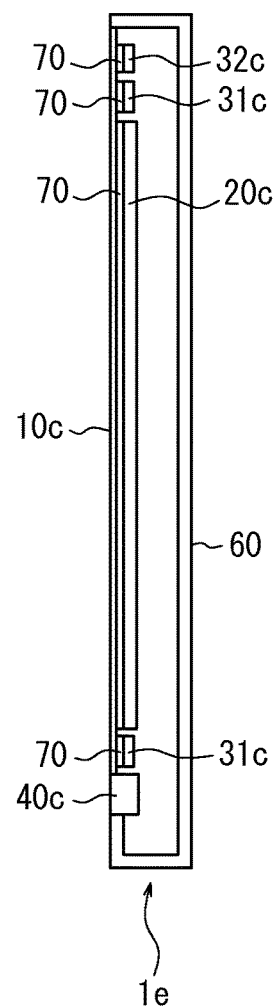

FIGS. 20(A) and 20(B) illustrate an example of a housing structure of the electronic device 1e according to Embodiment 1. FIG. 20(A) is a front view, and FIG. 20(B) is a cross-sectional view along the C-C line in FIG. 21(A).

The electronic device 1e illustrated in FIGS. 20(A) and 20(B) is a smartphone in which a touch panel that is a glass plate is disposed on the front face of a housing 60 (for example a metal or resin case) as the panel 10c. The panel 10c and the input unit 40c are supported by the housing 60. The display unit 20c, first piezoelectric elements 31c, and second piezoelectric element 32c are each adhered to the panel 10c via a joining member 70. Note that in the example illustrated in FIG. 20(A), the first piezoelectric elements 31c and the second piezoelectric element 32c are adhered to the back face of the panel. To illustrate this fact, the first piezoelectric elements 31c and the second piezoelectric element 32c are shown with dashed lines in FIG. 20(A). The joining member 70 is adhesive with thermosetting properties, ultraviolet curable properties, or other such properties; double-sided tape; or the like. The joining member 70 may, for example, be optical elasticity resin, which is clear and colorless acrylic ultraviolet curing adhesive. The panel 10c, display unit 20c, first piezoelectric elements 31c, and second piezoelectric element 32c are each generally rectangular.

As illustrated in FIG. 20(A), the proximity sensor 80d is preferably provided near the second piezoelectric element 32c so as to allow for detection of the user's ear or the like having come close to the location where the second piezoelectric element 32c is provided. As long as the proximity sensor 80d can detect that a portion of the user's body is close to the panel 10c, however, the position at which the proximity sensor 80d is disposed is not limited to the position illustrated in FIG. 20(A). Note that in the example illustrated in FIG. 20(A), the proximity sensor 80d is adhered to the back face of the panel 10c. To illustrate this fact, the proximity sensor 80d is shown with a dashed line in FIG. 20(A).

Furthermore, the microphone 90e is provided at a predetermined position in the panel 10c, typically near a position opposite the second piezoelectric element 32c with reference to the central portion of the panel 10c. The microphone 90e itself is preferably provided on the back face of the panel 10c, and by boring a hole in the panel 10c, the microphone 90e can pick up the user's voice from the front face of the panel 10c. Note that the microphone 90e is omitted from FIG. 20(B).

As illustrated in FIG. 20(A), the display unit 20c is disposed in approximately the center in the transverse direction of the panel 10c. The first piezoelectric elements 31c and the second piezoelectric element 32c are disposed at a predetermined distance from an edge of the panel 10c in the longitudinal direction, near the edge so that the longitudinal direction of the first piezoelectric elements 31c and the second piezoelectric element 32c extends along a short side of the panel 10c.

In FIGS. 20(A) and 20(B), the display unit 20c, first piezoelectric elements 31c, and second piezoelectric element 32c are disposed side by side, in parallel directions, on the back face of the panel 10c, yet the arrangement of these components is not limited to this example. For example, at least one of the first piezoelectric elements 31c and the second piezoelectric element 32c may be disposed in parallel to the longitudinal direction of the electronic device 1e (the lengthwise direction in FIG. 20(A)). In other words, in the present embodiment, any configuration that allows the first piezoelectric elements 31c and the second piezoelectric element 32c to transmit vibration to the panel 10c by being attached to the panel 10c may be adopted.

Furthermore, FIGS. 20(A) and 20(B) illustrate a configuration in which the display unit 20c is adhered to the back face of the panel 10c via the joining member 70, yet the arrangement of the display unit 20c is also not limited to the illustrated example. For example, the display unit 20c may be adhered to the back face of the panel 10c without the joining member 70 therebetween or may be disposed inside the housing 60 instead of being adhered to the panel 10c. When disposing the display unit 20c inside the housing 60, the display unit 20c may be fixed directly on the inside of the housing 60 or may be fixed to a substrate, or to a holder for the display unit, disposed on the inside of the housing 60. If the display unit 20c is disposed on the back face of the panel 10c, as illustrated in FIGS. 20(A) and 20(B), then when the panel 10c and the display unit 20c form a touch panel, any user interface may be displayed on the display unit 20c, and user operation can be detected by the panel 10c. In FIG. 20(A), the display unit 20c is illustrated with a dashed line to indicate that the display unit 20c is adhered to the back face of the panel 10c.

In FIGS. 20(A) and 20(B), in the space enclosed by the housing 60 and the panel 10c, illustration is omitted for components other than the display unit 20c, first piezoelectric elements 31c, second piezoelectric element 32c, input unit 40c, and joining member 70. Accordingly, apart from what is illustrated in FIGS. 20(A) and 20(B), the electronic device 1e may be provided with elements such as the control unit 50e and a variety of substrates, components, or the like. Furthermore, in FIG. 20(A), regarding the region in which display by the display unit 20c does not need to be transmitted to the panel 10c (i.e. the region where the panel 10c and display unit 20c do not overlap), the region near the edges of the panel 10c is preferably painted or covered with a bezel. The first piezoelectric elements 31c, second piezoelectric element 32c, and the like can thus be prevented from being seen from the exterior of the electronic device 1e.

Next, the processing performed by the control unit 50e according to the present embodiment is described.

In the present embodiment, upon execution of the calling function of the electronic device 1e, the control unit 50e performs control to output sound by driving the second piezoelectric element 32c based on an audio signal or the like received by the communication unit 90d from another electronic device. In this way, in the electronic device 1e, the second piezoelectric element can implement the function of outputting audio during a call and transmitting the audio to the user. In the electronic device 1e according to the present embodiment, the control unit 50e also performs control to drive the first piezoelectric elements 31c upon the panel 10c detecting contact. In this way, in the electronic device 1e, the first piezoelectric elements can implement the function of providing a tactile sensation to the user by generating vibration.

On the other hand, as described above, when providing a plurality of piezoelectric elements for different uses in one panel and driving the piezoelectric element for tactile sensation provision to generate vibration while the piezoelectric element for sound transmission is being vibrated to output sound, noise is generated during a call due to the vibration of both piezoelectric elements. Therefore, in the present embodiment, the processing described below is performed via control by the control unit 50e.

FIG. 21 is a flowchart illustrating processing by the control unit 50e in the electronic device 1e according to Embodiment 8.

Upon the start of processing according to the present embodiment, the control unit 50e first determines whether a trigger for outputting sound has occurred (step S11e). Here, a trigger for outputting sound is envisioned as taking on a variety of forms, such as an instruction to sound a ring tone from a calling application when a call is received or an instruction to output audio or the like for a call from a calling application. In other words, a trigger for outputting sound may be any of a variety of instructions that serve as an occasion for vibrating the panel 10c to output sound by driving the second piezoelectric element 32c for sound output in the electronic device 1e.

When a trigger for outputting sound has occurred in step S11e, the control unit 50e performs control to output sound by driving the second piezoelectric element 32c (step S12e).

Once the second piezoelectric element has been driven in step S12e, the control unit 50e determines whether the panel 10c has detected contact by the user's finger or the like (step S13e). Note that when a trigger for outputting sound has not occurred in step S11e, the control unit 50e proceeds to step S13e without driving the second piezoelectric element 32c.

When the panel 10c has not detected contact in step S13e, the control unit 50e returns to step S11e and continues processing. Conversely, when the panel 10c has detected contact in step S13e, the control unit 50e determines whether the calling function is running (step S14e).

When it is judged in step S14e that the calling function is not running, the problem of noise does not occur even if vibration for providing a tactile sensation is generated at this point. Therefore, the control unit 50e performs control to drive the first piezoelectric elements 31c to provide a tactile sensation (step S15e). In other words, when there is contact on the panel 10c in step S13e and the calling function is not running in step S14e, a tactile sensation is provided based on the contact. Accordingly, the user can confirm, via a tactile sensation, that the operation in which the user touched the panel 10c has been properly detected by the electronic device 1e.

Once the first piezoelectric elements are driven in step S15e, then based on the position of the contact detected in step S13e, the control unit 50e preferably performs control to execute predetermined processing associated with the position (step S16e). When, for example, the position of the contact detected on the panel 10c in step S13e corresponds to the position at which an icon for launching an address book application is displayed on the display unit 20c, this predetermined processing may be processing to launch the address book application. When the position of the contact detected on the panel 10c in step S13e corresponds, for example, to the position at which a character key is displayed on the display unit 20c, this predetermined processing may be processing to display the character key on the display unit 20c.

Even if contact is detected on the panel 10c in step S13e, when no processing is associated with the position of the detected contact, the control unit 50e preferably terminates the processing of the present embodiment without executing predetermined processing in step S16e. The case of no processing being associated with the position of detected contact is envisioned as being, for example, the case of the position of contact detected on the panel 10c in step S13e corresponding to a position at which no object, such as an icon or key, is displayed on the display unit 20c.

On the other hand, when it is judged in step S14e that the calling function is running, the control unit 50e controls the proximity sensor 80d to determine whether an object, such as the user's ear or the like, has approached the panel 10c to a predetermined distance (step S17e). When it is determined in step S17e that the proximity sensor 80d is not detecting proximity of an object, the control unit 50e performs control to drive the first piezoelectric elements 31c to provide a tactile sensation (step S15e).

Conversely, when it is determined in step S17e that the proximity sensor 80d is detecting proximity of an object, the control unit 50e performs control not to drive the first piezoelectric elements 31c, since at this point, the problem of noise arises if vibration is generated to provide a tactile sensation (step S18e). In other words, when there is contact on the panel 10c in step S13e, the calling function is running in step S14e, and the user's ear or the like is close to the proximity sensor in step S17e, then a tactile sensation is not provided based on the contact. Accordingly, in the present embodiment, while the second piezoelectric element is being driven and sound is being output, the problem of noise does not occur due to vibration of both piezoelectric elements as a result of driving the first piezoelectric element that provides a tactile sensation. After step S18e, based on the position of the contact detected in step S13e, the control unit 50e preferably performs control to execute predetermined processing associated with the position, without providing a tactile sensation (step S16e).

In this way, in the present embodiment, the control unit 50e performs control to output sound by driving the second piezoelectric element 32c upon execution of the calling function and performs control, based on contact on the panel 10c, to drive the first piezoelectric elements 31c. In the present embodiment, while executing the calling function, the control unit 50e also determines whether to drive the first piezoelectric elements 31c based on the result of detection by the proximity sensor 80d.

In the above-described embodiment, an example has been described in which, when a plurality of first piezoelectric elements 31c are provided as illustrated in FIGS. 20(A) and 20(B) (two in the example in FIGS. 20(A) and 20(B)), all of the first piezoelectric elements 31c are controlled not to be driven while the second piezoelectric element 32c is being driven. By performing such control, even if a plurality of piezoelectric elements are provided for different purposes, the electronic device 1e according to the present embodiment can substantially prevent noise due to vibration of these piezoelectric elements.

Conversely, depending on the specifications of the electronic device 1e, there may be circumstances in which a first piezoelectric element should be driven to provide a tactile sensation even while the second piezoelectric element 32c is being driven to output sound. In such a case, in the present embodiment, while the second piezoelectric element 32c is being driven to output sound, performing control so as not to drive a portion of the plurality of first piezoelectric elements 31c allows for a reduction in the noise due to these piezoelectric elements.

In this case, while the calling function is running, the control unit 50e preferably performs control, based on the results of detection by the proximity sensor 80d, to determine whether to drive the first piezoelectric element 31c that, among the first piezoelectric elements 31c, is disposed closest to the second piezoelectric element 32c. For example, when an upper and a lower first piezoelectric element 31c are provided as illustrated in FIGS. 20(A) and 20(B), control may be performed while driving the second piezoelectric element 32c so as not to drive the upper first piezoelectric element 31c, which out of the two first piezoelectric elements 31c is the one closer to the second piezoelectric element 32c.

In this case as well, as described above, when contact is detected on the panel 10c in step S13e, execution of predetermined processing in step S16e may be omitted when no processing is associated with the position of the detected contact.

For example, if the piezoelectric element for tactile sensation provision is driven to provide a tactile sensation while the piezoelectric element for transmitting sound is being driven to generate sound, the piezoelectric element for tactile sensation provision also vibrates the panel, and therefore this vibration is overlaid on the air-conducted sound or vibration sound as noise. When such an electronic device is a communication device, a microphone is normally included. Therefore, in such an electronic device, if a piezoelectric element is driven to provide a tactile sensation while another piezoelectric element is being driven to generate sound, the vibration pertaining to provision of the tactile sensation ends up being picked up by the microphone as noise. Furthermore, while the piezoelectric element for sound transmission is being driven to generate sound, the user may listen to audio by pressing the ear against the portion where sound is being output in the panel or the like of the electronic device. If vibration pertaining to provision of a tactile sensation is generated while the user is listening to audio by pressing the ear against the panel or the like of the electronic device in this way, the user may be surprised or feel uncomfortable. The electronic device 1e according to the present embodiment, however, can eliminate such an inconvenience.

Embodiment 9

Next, an electronic device according to Embodiment 9 of the present invention is described. Where the structure is the same as in Embodiments 1 through 8, the same reference signs are used, and a description thereof is omitted. The electronic device 2e according to Embodiment 9 has the structure of the electronic device 1e according to Embodiment 8, with changes to the control by the control unit 50e. Accordingly, Embodiment 9 of the present invention can basically be implemented with an electronic device having the same structure as the electronic device 1e described in Embodiment 8. Therefore, the same explanation as in Embodiment 8 is omitted.

In Embodiment 8, when contact is detected on the panel 10c, control is performed to execute predetermined processing as necessary without driving the first piezoelectric elements 31c while the calling function is running and an object is close to the proximity sensor 80d. In Embodiment 9, after pressure by the user on the panel 10c increases while contact is continually being detected on the panel, control is performed to execute predetermined processing as necessary without driving the first piezoelectric elements 31c while the calling function is running and an object is close to the proximity sensor 80d.

In order to implement such control, in the present embodiment, the first piezoelectric elements 31c attached to the panel 10c detect pressure on the panel 10c. In general, a piezoelectric element generates voltage when pressure is applied and deforms upon application of voltage. Accordingly, the first piezoelectric elements 31c can be configured as both a functional unit that provides a tactile sensation by generating vibration (tactile sensation providing unit) and a functional unit that detects pressure on the panel 10c (pressure detection unit).

Such a pressure detection unit detects pressure on the touch face of the panel 10c and may be configured using, for example, any number of strain gauge sensors, piezoelectric elements, or the like that experience a change in physical or electrical characteristics (strain, resistance, voltage, or the like) in response to pressure.

When the pressure detection unit is configured using a piezoelectric element, for example, the magnitude of the voltage (voltage value), which is an electrical characteristic, of the piezoelectric element changes in accordance with the magnitude of the load (force) of the pressure on the panel 10c (or the speed at which the magnitude of the load (force) changes (acceleration)). In this case, the pressure detection unit can notify the control unit 50e of the magnitude of the voltage (voltage value (referred to below simply as "data")). The control unit 50e acquires the data by the pressure detection unit notifying the control unit 50e of the data, or by the control unit 50e detecting data pertaining to the piezoelectric element of the pressure detection unit. In other words, the control unit 50e acquires the data based on pressure on the panel 10c. That is, the control unit 50e acquires the data based on pressure from the pressure detection unit. When the data based on pressure satisfies a predetermined standard, the control unit 50e can determine that an operation intended by the user has been performed and can generate predetermined vibration. This predetermined standard may be set appropriately in accordance with the load characteristics when pressing the push-button switch that is intended to be represented. Stating that the data based on pressure satisfies a predetermined standard may refer to the voltage value (data) reaching a predetermined standard, to the voltage value (data) exceeding a predetermined standard, or to detection of a voltage value (data) equivalent to a predetermined standard.

In Embodiment 9 as well, the control unit 50e performs control to output sound by driving the second piezoelectric element 32c. In this way, in the electronic device 1e, the second piezoelectric element can implement the function of outputting audio and transmitting the audio to the user. With regard to this point, Embodiment 9 is the same as Embodiment 8.

On the other hand, in Embodiment 9, when the data based on pressure detected by the first piezoelectric elements 31c satisfies a predetermined standard while the panel 10c is detecting contact, the control unit 50e performs control to drive the first piezoelectric elements 31c and to execute predetermined processing as necessary. In this way, in the electronic device 1e, the first piezoelectric elements 31c can implement the function of providing a tactile sensation to the user by generating vibration while pressure from the user is being applied to the elements. Therefore, in Embodiment 9, the frequency, amplitude, intensity, and the like when the first piezoelectric elements 31c generate vibration can be appropriately adjusted to allow for provision of a realistic tactile sensation such as that obtained when actually pressing a mechanical key.

Next, the processing performed by the control unit 50e according to the present embodiment is described. FIG. 22 is a flowchart illustrating processing by the control unit 50e in the electronic device 2e according to Embodiment 9.

As illustrated in FIG. 22, the processing performed by the control unit 50e in Embodiment 9 is the same as the processing pertaining to Embodiment 8 described in FIG.

21, with the insertion of step S21e between step S13e and step S14e. In Embodiment 9, once contact on the panel 10c is detected in step S13e, the control unit 50e determines whether the data based on pressure on the panel 10c detected by the first piezoelectric elements 31c (pressure detection unit) satisfies the above-described predetermined standard (step S21e).

When the data based on pressure on the panel 10c does not satisfy the predetermined standard in step S21e, the control unit 50e returns to step S13e and continues processing. Conversely, when the data based on pressure on the panel 10c satisfies the predetermined standard in step S21e, the control unit 50e determines whether the calling function is running (step S14e). From step S14e onwards, the processing is the same as in Embodiment 8 described in FIG. 21. In other words, when the calling function is not running, or when the calling function is running but the proximity sensor 80d has not detected proximity of an object, the control unit 50e performs control to execute predetermined processing after driving the first piezoelectric elements 31c to provide a tactile sensation. Conversely, when the calling function is running and the proximity sensor 80d has detected proximity of an object, the control unit 50e performs control to execute predetermined processing without driving the first piezoelectric elements 31c.

In the present embodiment, while executing the calling function, the control unit 50e thus performs control to determine whether to drive the first piezoelectric elements 31c based on the result of detection by the proximity sensor 80d. Accordingly, even if a plurality of piezoelectric elements are provided for different purposes, the electronic device 2e according to the present embodiment can substantially prevent the problem of noise due to vibration of these piezoelectric elements. According to the present embodiment, the first piezoelectric elements are driven to provide a tactile sensation while the user is pressing the panel 10c to a certain degree. Hence, a realistic tactile sensation, such as that obtained when actually pressing a mechanical key, is provided. Furthermore, according to the present embodiment, predetermined processing is not executed when only light contact is detected on the panel 10c, but rather is executed when pressure reflecting the user's intent is applied. Therefore, predetermined processing is prevented from being started based on an operation not intended by the user.

In the present embodiment as well, as described in Embodiment 8, when contact is detected on the panel 10c in step S13e, execution of predetermined processing in step S16e may be omitted when no processing is associated with the position of the detected contact. Furthermore, in the present embodiment, as described in Embodiment 8, while the second piezoelectric element 32c is being driven to output sound, performing control so as not to drive a portion of the plurality of first piezoelectric elements 31c allows for a reduction in the interference due to these piezoelectric elements.

In the above-described Embodiment 9, a structure in which the first piezoelectric element 31c functions as both the tactile sensation providing unit and the pressure detection unit has been described. The first piezoelectric element 31c may, however, be given the function of providing a tactile sensation, and a separate pressure detection unit from the first piezoelectric element 31c may be provided. In this case, when the panel 10c is detecting contact in step S13e and data based on pressure detected by the pressure detection unit in step S14e satisfies a predetermined standard, the control unit 50e proceeds to step S14e and continues processing.

In each of the above-described embodiments, the first piezoelectric element is controlled not to provide a tactile sensation while the second piezoelectric element is outputting sound. Conversely, however, the problem of noise due to vibration of both piezoelectric elements may, for example, similarly be reduced by controlling the second piezoelectric element not to output sound while the first piezoelectric element is providing a tactile sensation. In other words, in the present invention, while driving either the second piezoelectric element 32c or the first piezoelectric elements 31c, the control unit 50e may perform control not to drive the other piezoelectric element(s) when the calling function is running and the proximity sensor 80d has detected proximity of an object. For example, while driving the first piezoelectric elements 31c, the control unit 50e may perform control not to drive the second piezoelectric element 32c when the calling function is running and the proximity sensor 80d has detected proximity of an object.

In each of the above-described embodiments, a configuration has been described in which an object is displayed on the display unit 20c provided on the back face of the panel, and the panel 10c detects contact by the user. The present invention is not, however, limited to this configuration. For example, a configuration that does not include the display unit 20c may be adopted, with an object being printed directly on the panel 10c with ink or the like.

In the above embodiment, the panel 10c is used to detect contact on the panel 10c. In other words, the panel 10c in the above embodiment is envisioned as being a member such as a so-called touch sensor. The touch panel used in the electronic device according to the present invention, however, may be of any type that is contacted by a contacting object such as a user's finger, a stylus pen, or the like.

For example, the panel used in the electronic device according to the present invention may be a member that does not detect the position of contact on the panel by the contacting object (i.e. a member without a sensing function). In an electronic device with such a structure, further providing a pressure detection unit, for example, that detects pressure on the panel allows for determination, based on the pressure detected by the pressure detection unit, that the panel has been contacted.

By vibration of the panel 10c, the above-described electronic device 1e can transmit, to the user, air-conducted sound as well as vibration sound that is transmitted through a part of the user's body (such as the cartilage of the outer ear). Therefore, when sound is output at a volume equivalent to a known dynamic receiver, the sound that is transmitted to the periphery of the electronic device 1e by air vibrations due to vibration of the panel 10c is smaller than with a dynamic receiver. Accordingly, the electronic device 1e is appropriate for listening to recorded messages, for example, on the train or the like.

The above-described electronic device 1e transmits vibration sound by vibration of the panel 10c, and therefore even if the user is wearing earphones or headphones, for example, the user can hear sound through the earphones or headphones and through a part of the body by contacting the electronic device 1e against the earphones or headphones.

The above-described electronic device 1e transmits sound to a user by vibration of the panel 10c. Therefore, if the electronic device 1e is not provided with a separate dynamic receiver, it is unnecessary to form an opening (sound discharge port) for sound transmission in the housing 60, thereby simplifying waterproof construction of the electronic device 1e. On the other hand, if the electronic device 1e is provided with a dynamic receiver, the sound discharge port should be blocked by a member permeable by gas but not liquid. Gore-Tex (registered trademark) is an example of a member permeable by gas but not liquid.

In the above-described Embodiment 8, when contact is detected on the panel 10c, predetermined processing is executed without driving the first piezoelectric elements 31c when the calling function is running and a predetermined object is close to the proximity sensor 80d. The present invention, however, is not limited in this way. When contact is detected on the panel 10c, the electronic device may execute predetermined processing without driving the first piezoelectric elements 31c when the calling function is running, regardless of whether the proximity sensor 80d has detected proximity of a predetermined object.

In the above-described Embodiment 8, when data based on pressure on the panel 10c satisfies a predetermined standard, predetermined processing is executed without driving the first piezoelectric elements 31c when the calling function is running and a predetermined object is close to the proximity sensor 80d. The present invention, however, is not limited in this way. When data based on pressure on the panel 10c satisfies a predetermined standard, the electronic device may execute predetermined processing without driving the first piezoelectric elements 31c when the calling function is running, regardless of whether the proximity sensor 80d has detected proximity of a predetermined object.

Embodiment 10

Figure 23:
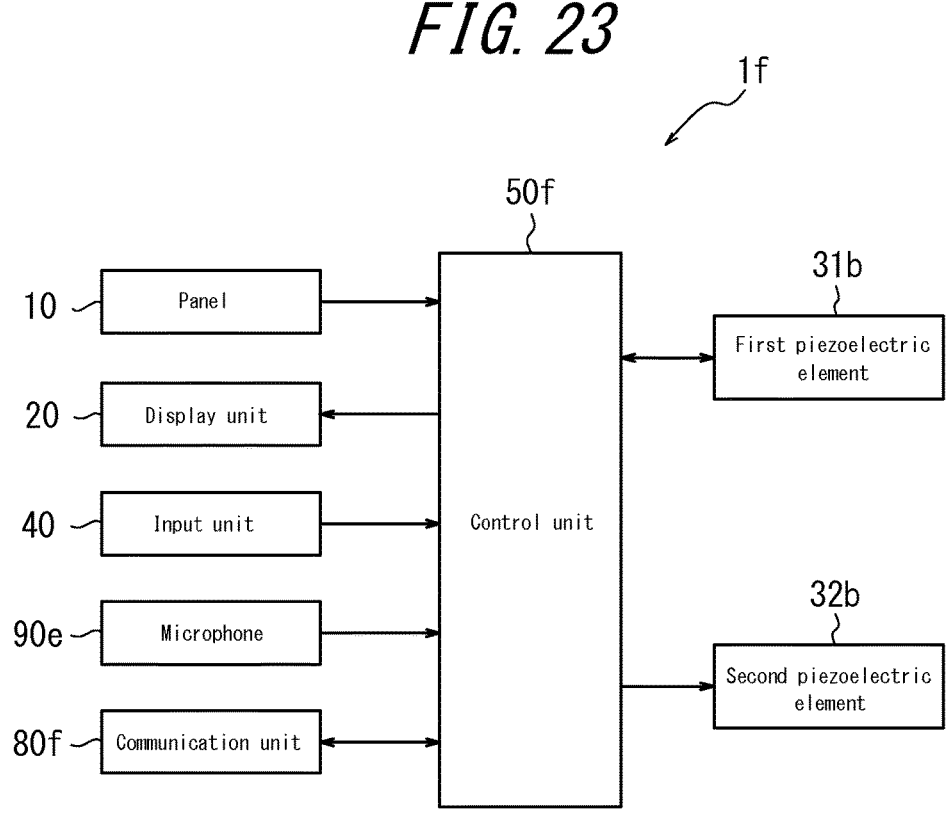
FIG. 23 is a functional block diagram of a panel device according to Embodiment 10.

Embodiment 10 of the present invention is described below in detail with reference to the accompanying drawings. Where the structure is the same as in Embodiments 1 through 9, the same reference signs are used, and a description thereof is omitted. FIG. 23 is a functional block diagram of a panel device 1f according to an embodiment of the present invention. The panel device 1f is, for example, a mobile phone (smartphone) and is provided with a panel 10, a display unit 20, a first piezoelectric element 31b, a second piezoelectric element 32b, an input unit 40, a control unit 50f, a microphone 90e, and a communication unit 80f. When the panel device 1f of the present embodiment functions as a mobile phone, vibration of the panel 10 caused by the first piezoelectric element 31b generates sound transmitted inside the human body. The sound is transmitted inside the human body by vibration of the middle ear or the inner ear via soft tissue (such as cartilage) of the human body.

The control unit 50f is a processor that controls the panel device 1f. The control unit 50f applies a predetermined electric signal to the first piezoelectric element 31b and the second piezoelectric element 32b. The magnitude of the applied voltage used may be appropriately adjusted in accordance with the fixation strength of the panel 10 with respect to the housing or a support member, or in accordance with the performance of the first piezoelectric element 31b or the second piezoelectric element 32b.

The control unit 50f applies an electric signal to the first piezoelectric element 31b to drive the first piezoelectric element 31b, thus controlling sound output. The voltage that the control unit 50f applies to the first piezoelectric element 31b may, for example, be ±15 V. This is higher than ±5 V, i.e. the applied voltage of a so-called panel speaker for conduction of sound by air-conducted sound rather than vibration sound. In this way, even if the user presses the panel 10 against the user's body for example with a force of 3 N or greater (a force of 5 N to 10 N), sufficient vibration is generated in the panel 10 to allow for generation of a vibration sound transmitted via a part of the user's body. The control unit 50f also drives the first piezoelectric element 31b based on a trigger for sound output from a predetermined application or the like (based on an audio signal (sound signal) or the like).

Upon the panel 10 detecting contact, the control unit 50f also applies an electric signal to the second piezoelectric element 32b to drive the second piezoelectric element 32b. Instead of the panel 10 detecting contact and the control unit 50f applying an electric signal to the second piezoelectric element 32b, the panel device 1f may include a pressure detection unit (not illustrated) that detects pressure on the panel 10. The second piezoelectric element 32b may then be driven upon data based on pressure on the panel 10 satisfying a predetermined standard.

The pressure detection unit detects pressure on the panel 10 and is configured using, for example, an element such as a strain gauge sensor, a piezoelectric element, or the like that experiences a change in physical or electrical characteristics (strain, resistance, voltage, or the like) in response to pressure. When the pressure detection unit is configured using a piezoelectric element or the like, for example, the magnitude of the voltage (voltage value (referred to below simply as "data")), which is an electrical characteristic, of the piezoelectric element changes in accordance with the magnitude of the load (force) of the pressure on the touch face of the panel 10 (or the speed at which the magnitude of the load (force) changes (acceleration)). The control unit 50f acquires the data by the pressure detection unit notifying the control unit 50f of the data, or by the control unit 50f detecting data pertaining to the piezoelectric element of the pressure detection unit. In other words, the control unit 50f acquires the data based on pressure on the touch face of the panel 10 from the pressure detection unit. Note that when the pressure detection unit is configured using a piezoelectric element, the second piezoelectric element 32b may also serve as the pressure detection unit.

Upon the control unit 50f applying an electric signal to the first piezoelectric element 31b and the second piezoelectric element 32b, the first piezoelectric element 31b and the second piezoelectric element 32b to which the electric signal has been applied expand and contract in the direction of the long sides. At this point, the panel 10 to which the first piezoelectric element 31b and the second piezoelectric element 32b are attached deforms in accordance with expansion and contraction of the first piezoelectric element 31b and the second piezoelectric element 32b, and the panel 10 vibrates. The panel 10 flexes due to expansion and contraction or to bending of the first piezoelectric element 31b and the second piezoelectric element 32b. The panel 10 is bent directly by the first piezoelectric element 31b and the second piezoelectric element 32b. Stating that "the panel 10 is bent directly by the piezoelectric element" differs from the phenomenon utilized in known panel speakers, whereby the panel deforms upon vibration of a particular region of the panel due to the inertial force of a piezoelectric actuator constituted by a piezoelectric element disposed in the casing. Stating that "the panel 10 is bent directly by the piezoelectric element" refers instead to how expansion and contraction or bending (flexure) of the piezoelectric element directly bends the panel via the joining member or via the joining member and the below-described reinforcing member.

When the first piezoelectric element 31b expands and contracts and the panel 10 vibrates, then along with generating air-conducted sound, the panel 10 generates vibration sound transmitted via a part of the user's body when the user brings a part of the body (such as the cartilage of the outer ear) into contact. The control unit 50f transmits air-conducted sound and vibration sound to a contacting object that contacts the panel 10. For example, the control unit 50f can apply an electric signal, corresponding to an audio signal related to the other party's voice, to the first piezoelectric element 31b to generate air-conducted sound and vibration sound that correspond to the audio signal. The audio signal may be related to ringtones, music including songs, or the like. Note that the audio signal pertaining to the electric signal may be based on music data stored in internal memory of the panel device 1f, or may be music data stored on an external server or the like and played back over a network.

The panel 10 vibrates not only in the region in which the first piezoelectric element 31b is attached, but also in a region separate from the attachment region. In the region of vibration, the panel 10 includes a plurality of locations at which the panel 10 vibrates in a direction intersecting the main surface of the panel 10. At each of these locations, the value of the vibration amplitude changes over time from positive to negative or vice-versa. At a given instant during vibration of the panel 10, portions with a relatively large vibration amplitude and portions with a relatively small vibration amplitude appear to be distributed randomly or cyclically over nearly the entire panel 10. In other words, a plurality of vibration waves are detected across the entire panel 10. The voltage that the control unit 50f applies to the first piezoelectric element 31b may be ±15 V to prevent damping of the above-described vibration of the panel 10 even if the user presses the panel 10 against the user's body with a force of, for example, 5 N to 10 N. Therefore, the user can hear sound by contacting a region distant from the above-described attachment region of the panel 10 to the ear.

The microphone 90e picks up surrounding sound, such as speech by the user. The microphone 90e then outputs an electric signal based on the picked-up sound to the control unit 50f.

The communication unit 80f is used to communicate with other electronic devices or the like. With the communication unit 80f, the user of the panel device 1f can talk with the user of another electronic device or the like. During a call, the microphone 90e picks up the sound spoken by the user of the panel device 1f. The panel 10 also vibrates to output sound spoken by the user of another electronic device or the like.

Figure 24:
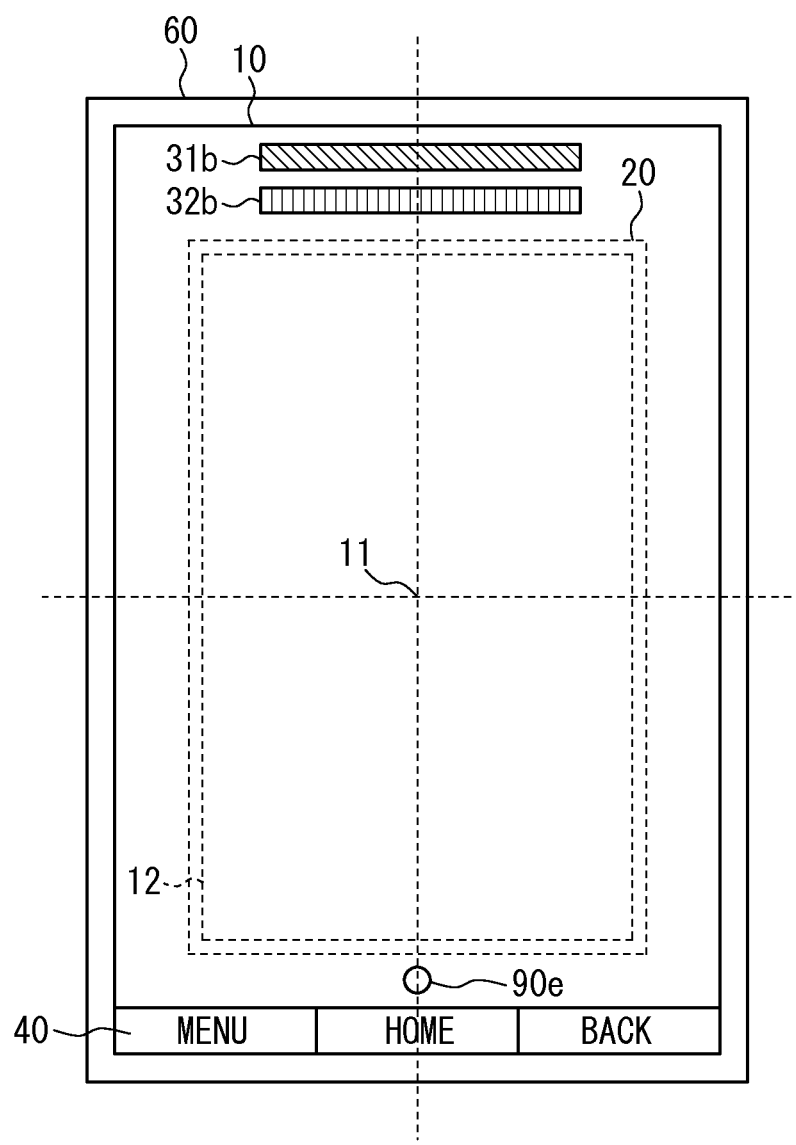
FIG. 24 illustrates a housing structure of the panel device according to Embodiment 10.

FIG. 24 illustrates a housing structure of the panel device 1f according to the present embodiment. The panel device 1f illustrated in FIG. 24 is a smartphone in which a touch panel that is a glass plate is disposed on the front face of a housing 60 (for example a metal or resin case) as the panel 10. The panel 10 and the input unit 40 are supported by the housing 60, and the display unit 20, first piezoelectric element 31b, and second piezoelectric element 32b are each adhered to the panel 10 by a joining member. The joining member is adhesive with thermosetting properties, ultraviolet curable properties, or other such properties; double-sided tape; or the like. The joining member may, for example, be optical elasticity resin, which is clear and colorless acrylic ultraviolet curing adhesive. In the example illustrated in FIG. 24, the panel 10, display unit 20, first piezoelectric element 31b, and second piezoelectric element 32b are each rectangular. FIG. 24 shows the approximate central portion of the panel 10 as a central portion 11. FIG. 24 also shows the region of the panel 10 in which input (contact) is detected as an input detection region 12.

The display unit 20 is disposed in approximately the center in the transverse direction of the panel 10. The first piezoelectric element 31b is disposed at a predetermined distance from an edge of the panel 10 in the longitudinal direction, near the edge so that the direction of the long sides of the first piezoelectric element 31b extends along a short side of the panel 10. The display unit 20 and the first piezoelectric element 31b are disposed side by side, in parallel directions, on the inner face of the panel 10.

The second piezoelectric element 32b is disposed at a predetermined distance from an edge of the panel 10 in the longitudinal direction, near the edge so that the direction of the long sides of the second piezoelectric element 32b extends along a short side of the panel 10. The second piezoelectric element 32b is also disposed further inward than the first piezoelectric element 31b with reference to the central portion 11 of the panel 10.

In other words, the first piezoelectric element 31b is disposed so that the long sides of the first piezoelectric element 31b extend along a short side of the panel 10 and is disposed further outward than the second piezoelectric element 32b with reference to the central portion 11 of the panel 10. Note that due to the structure of the panel device 1f, it may not be possible to dispose a piezoelectric element to extend along a long side of the panel 10. The above-described structure may be implemented in such a case as well.

The microphone 90e is disposed on the opposite side, with reference to the central portion 11 of the panel 10, from the side on which the first piezoelectric element 31b is disposed. By being disposed at this position, the microphone 90e can effectively pick up the user's voice. The input detection region 12 is disposed further inward than the second piezoelectric element 32b with reference to the central portion 11 of the panel 10.

Note that the first piezoelectric element 31b and the second piezoelectric element 32b need not be rectangular. In this case, the first piezoelectric element 31b is disposed at a predetermined distance from an edge of the panel 10 in the longitudinal direction, near the edge so that the direction of expansion and contraction of the first piezoelectric element 31b extends along a short side of the panel 10. The second piezoelectric element 32b is disposed at a predetermined distance from an edge of the panel 10 in the longitudinal direction, near the edge so that the direction of expansion and contraction of the second piezoelectric element 32b extends along a short side of the panel 10. The second piezoelectric element 32b is also disposed further inward than the first piezoelectric element 31b with reference to the central portion 11 of the panel 10. In other words, the first piezoelectric element 31b is disposed so that the direction of expansion and contraction of the first piezoelectric element 31b extends along a short side of the panel 10 and is disposed further outward than the second piezoelectric element 32b with reference to the central portion 11 of the panel 10.

The panel 10 has been described as being rectangular, yet the panel 10 is not limited in this way and may be any shape, such as a polygon or the like. The second piezoelectric element 32b is disposed so that the long sides, or the direction of expansion and contraction, of the second piezoelectric element 32b extend along a side of the panel 10. The first piezoelectric element 31b is disposed so that the long sides, or the direction of expansion and contraction, of the first piezoelectric element 31b extend along the same side and is disposed further outward than the second piezoelectric element 32b with reference to the central portion 11 of the panel 10.

In this way, according to the panel device 1f of the present embodiment, the second piezoelectric element 32b is disposed so that the long sides of the second piezoelectric element 32b extend along a side of the panel 10, and the first piezoelectric element 31b is disposed so that the long sides of the first piezoelectric element 31b extend along the same side and is disposed further outward than the second piezoelectric element 32b with reference to the central portion 11 of the panel 10. In other words, the second piezoelectric element 32b is disposed so that the direction of expansion and contraction of the second piezoelectric element 32b extends along a side of the panel 10. The first piezoelectric element 31b is disposed so that the direction of expansion and contraction of the first piezoelectric element 31b extend along the same side and is disposed further outward than the second piezoelectric element 32b with reference to the central portion 11 of the panel 10. Therefore, when providing two piezoelectric elements, the second piezoelectric element 32b that provides a tactile sensation is closer to the central portion 11 of the panel 10 than the first piezoelectric element 31b is, allowing for effective provision of a tactile sensation to the user. In particular, this arrangement of the first piezoelectric element 31b and the second piezoelectric element 32b allows for a more effective provision of a tactile sensation to the user that is contacting the input detection region 12 than the case of the opposite arrangement from the present embodiment. Since the first piezoelectric element 31b that transmits sound is disposed further outward than the second piezoelectric element 32b with reference to the central portion 11 of the panel 10, sound can effectively be transmitted when, for example, the user grips and brings the panel device 1f close to the ear. In particular, this arrangement of the first piezoelectric element 31b and the second piezoelectric element 32b allows for more effective transmission of sound to the user than the case of the opposite arrangement from the present embodiment. During a call, the user speaks towards the microphone 90e while placing the ear close to or against the touch panel to hear the other party's voice. Therefore, the user's ear is naturally positioned near the side opposite the side where the microphone 90e is disposed. Accordingly, particularly during a call, sound can effectively be transmitted to the user since the first piezoelectric element 31b that transmits sound is disposed closer to the side that the user's ear approaches than is the second piezoelectric element 32b that provides a tactile sensation.

By vibration of the panel 10, the panel device 1f can transmit, to the user, air-conducted sound as well as vibration sound that is transmitted through a part of the user's body (such as the cartilage of the outer ear). Therefore, when sound is output at a volume equivalent to a known dynamic receiver, the sound that is transmitted to the periphery of the panel device 1f by air vibrations due to vibration of the panel 10 is smaller than with a dynamic receiver. Accordingly, the panel device 1f is appropriate for listening to recorded messages, for example, on the train or the like.

The panel device 1f transmits vibration sound by vibration of the panel 10, and therefore even if the user is wearing earphones or headphones, for example, the user can hear sound through the earphones or headphones and through a part of the body by contacting the panel device 1f against the earphones or headphones.

The panel device 1f transmits sound to a user by vibration of the panel 10. Therefore, if the panel device 1f is not provided with a separate dynamic receiver, it is unnecessary to form an opening (sound discharge port) for sound transmission in the housing 60, thereby simplifying waterproof construction of the panel device 1f. On the other hand, if the panel device 1f is provided with a dynamic receiver, the sound discharge port should be blocked by a member permeable by gas but not liquid. Gore-Tex (registered trademark) is an example of a member permeable by gas but not liquid.

Bimorph has been described above as bending upon the application of an electric signal (voltage). In greater detail, bimorph is formed from two (two layers of) elements (piezoelectric elements) that are polarized in the direction of thickness, and electrodes are embedded and bonded together therein. Upon applying voltage to bimorph having this structure, one of the elements (piezoelectric elements) contracts due to a piezoelectric transverse effect, and the other element (piezoelectric element) expands. As a result, the bimorph as a whole bends. Bimorph thus also expands and contracts and has a direction of expansion and contraction. Since a laminated piezoelectric element includes a piezoelectric element that expands and contracts, a laminated piezoelectric element also expands and contracts and has a direction of expansion and contraction.

Embodiment 11

The following describes an electronic device according to Embodiment 11 of the present invention with reference to the drawings. Where the structure is the same as in Embodiments 1 through 10, the same reference signs are used, and a description thereof is omitted. The electronic device according to the present invention may be a mobile phone, a smartphone, a tablet PC, or the like provided with a touch panel. The present invention is not, however, limited to such mobile devices and may be any of a variety of electronic devices such as a household appliance, industrial device (factory automation equipment), dedicated terminal, or the like provided with a touch panel.

Figure 25:
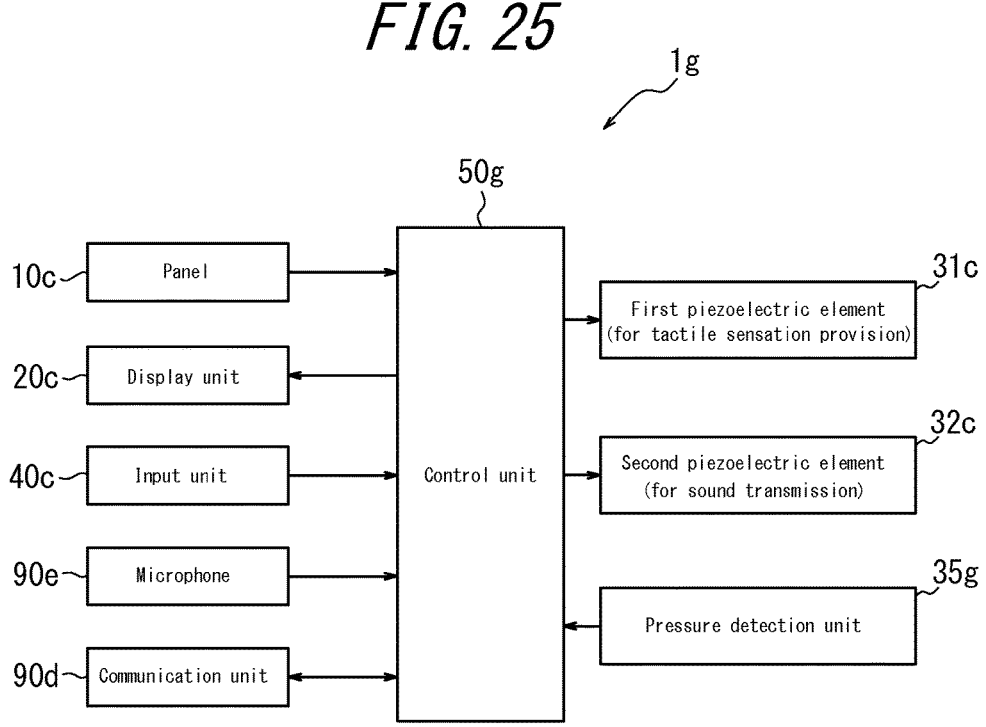
FIG. 25 is a functional block diagram of an electronic device according to Embodiment 11.

FIG. 25 is a functional block diagram of an electronic device according to Embodiment 11 of the present invention.

As illustrated in FIG. 25, an electronic device 1g according to Embodiment 11 of the present invention includes a panel 10c, a display unit 20c, a first piezoelectric element 31c, a second piezoelectric element 32c, a pressure detection unit 35g, an input unit 40c, a control unit 50g, and a microphone 90e. When the electronic device 1g of the present embodiment functions as a mobile phone, vibration of the panel 10 caused by the second piezoelectric element 32c generates sound that is transmitted inside the human body. The sound is transmitted inside the human body by vibration of the middle ear or the inner ear via soft tissue (such as cartilage) of the human body.

In the present embodiment, the first piezoelectric element 31c is a piezoelectric element mainly used for providing a tactile sensation. Accordingly, the first piezoelectric element 31c is preferably a piezoelectric element designed to have a suitable frequency characteristic for providing a predetermined tactile sensation based on an electric signal from the control unit 50g. In the present embodiment, when the specifications of the electronic device 1g do not indicate provision of a tactile sensation, the first piezoelectric element 31c need not be provided. On the other hand, in the present embodiment, the second piezoelectric element 32c is a piezoelectric element mainly used for transmitting sound. Accordingly, the second piezoelectric element 32c is preferably a piezoelectric element designed to have a suitable frequency characteristic for transmitting a predetermined sound based on an electric signal from the control unit 50g.

The pressure detection unit 35g detects pressure on the panel 10c and is configured using, for example, an element such as a strain gauge sensor, a piezoelectric element, or the like that experiences a change in physical or electrical characteristics (strain, resistance, voltage, or the like) in response to pressure. When the pressure detection unit 35g is configured using a piezoelectric element, for example, the magnitude of the voltage (voltage value (referred to below as "data based on pressure")), which is an electrical characteristic, of the piezoelectric element changes in accordance with the magnitude of the load (force) of the pressure on the panel 10c (or the speed at which the magnitude of the load (force) changes (acceleration)). Note that instead of a voltage value, the data based on pressure may be power, resistance, magnitude of the load, or the like related to the pressure.

The pressure detection unit 35g may be configured integrally with the first piezoelectric element 31c. In other words, the first piezoelectric element 31c for providing a tactile sensation may be a piezoelectric element that also functions as the pressure detection unit 35g. The reason is that a piezoelectric element generates voltage when pressure is applied and deforms upon application of voltage.

Furthermore, the pressure detection unit 35g can be configured in accordance with the contact detection type of the panel 10c. For example, in the case of a resistive film type, a configuration without a strain gauge sensor, piezoelectric element, or the like may be adopted by associating the magnitude of the resistance that corresponds to the size of the contact area with the load (force) of the pressure on the panel 10c. Alternatively, in the case of a capacitive type, a configuration without a strain gauge sensor, a piezoelectric element, or the like may be adopted by associating the magnitude of the capacitance with the load (force) of the pressure on the panel 10c.

The control unit 50g is a processor that controls the electronic device 1g. The control unit 50g applies a predetermined electric signal to the first piezoelectric element 31c and the second piezoelectric element 32c. By applying a predetermined electric signal to the first piezoelectric element 31c and the second piezoelectric element 32c, the control unit 50g can drive the first piezoelectric element 31c and the second piezoelectric element 32c.

The control unit 50g also applies an electric signal to the second piezoelectric element 32c to drive the second piezoelectric element 32c, thus controlling sound output. In this way, when controlling sound output by driving the second piezoelectric element 32c, the control unit 50g can perform control to drive the second piezoelectric element 32c based on a trigger for sound output from a predetermined application or the like (based on an audio signal (sound signal) or the like).

The voltage that the control unit 50g applies to the second piezoelectric element 32c may, for example, be ±15 V. This is higher than ±5 V, i.e. the applied voltage of a so-called panel speaker for conduction of sound by air-conducted sound rather than vibration sound. In this way, even if the user presses the panel 10c against the user's body for example with a force of 3 N or greater (a force of 5 N to 10 N), sufficient vibration is generated in the panel 10c to allow for generation of a vibration sound transmitted via a part of the user's body. Note that the magnitude of the applied voltage used may be appropriately adjusted in accordance with the fixation strength of the panel 10c with respect to the housing or a support member, or in accordance with the performance of the first piezoelectric element 31c or the second piezoelectric element 32c.

Upon the control unit 50g applying an electric signal to the first piezoelectric element 31c and the second piezoelectric element 32c, the first piezoelectric element 31c and the second piezoelectric element 32c to which the electric signal has been applied expand and contract in the direction of the long sides of each element. At this point, the panel 10c to which the first piezoelectric element 31c and the second piezoelectric element 32c are attached deforms in accordance with expansion and contraction of the first piezoelectric element 31c and the second piezoelectric element 32c, and the panel 10c vibrates. The panel 10c flexes due to expansion and contraction or to bending of the first piezoelectric element 31c and the second piezoelectric element 32c. The panel 10 is bent directly by the first piezoelectric element 31c and the second piezoelectric element 32c. Stating that "the panel 10c is bent directly by the piezoelectric element" differs from the phenomenon utilized in known panel speakers, whereby the panel deforms upon vibration of a particular region of the panel due to the inertial force of a piezoelectric actuator constituted by a piezoelectric element disposed in the casing. Stating that "the panel 10c is bent directly by the piezoelectric element" refers instead to how expansion and contraction or bending (flexure) of the piezoelectric element directly bends the panel via the joining member or via the joining member and the below-described reinforcing member.

When the second piezoelectric element 32c expands and contracts and the panel 10c vibrates, then along with generating air-conducted sound, the panel 10c generates vibration sound that is transmitted via a part of the user's body when the user brings a part of the body (such as the cartilage of the outer ear) into contact. The control unit 50g transmits air-conducted sound and vibration sound to an object that contacts the panel 10c. For example, the control unit 50g can apply an electric signal, corresponding to an audio signal related to the other party's voice, to the second piezoelectric element 32c to generate air-conducted sound and vibration sound that correspond to the audio signal. The audio signal may be related to ringtones, music including songs, or the like. Note that the audio signal pertaining to the electric signal may be based on music data stored in internal memory of the electronic device 1g, or may be music data stored on an external server or the like and played back over a network.

The panel 10c vibrates not only in the region in which the second piezoelectric element 32c is attached, but also in a region separate from the attachment region. In the region in which vibration is generated, the panel 10c includes a plurality of locations at which the panel 10c vibrates in a direction intersecting the main surface of the panel 10c. At each of these locations, the value of the vibration amplitude changes over time from positive to negative or vice-versa. At a given instant during vibration of the panel 10c, portions with a relatively large vibration amplitude and portions with a relatively small vibration amplitude appear to be distributed randomly or cyclically over nearly the entire panel 10c. In other words, a plurality of vibration waves are detected across the entire panel 10c. The voltage that the control unit 50g applies to the second piezoelectric element 32c may be ±15 V to suppress damping of the above-described vibration of the panel 10c even if the user presses the panel 10c against the user's body with a force of, for example, 5 N to 10 N.

Therefore, the user can hear sound by contacting a region distant from the above-described attachment region of the panel 10c to the ear.

The control unit 50g acquires the data based on pressure by the pressure detection unit 35g notifying the control unit 50g of the data based on pressure, or by the control unit 50g detecting data based on pressure of the pressure detection unit 35g. In other words, the control unit 50g acquires the data based on pressure on the panel 10c from the pressure detection unit 35g.

Furthermore, in the present embodiment, the user of the electronic device 1g can talk with the user of another electronic device or the like by the control unit 50g executing (running) a calling function. When the calling function is executed in the electronic device 1g, the below-described communication unit 90d communicates with a base station or another communication device via a wired or wireless connection. At this time, functional units pertaining to communication are used as appropriate in the electronic device 1g, such as the second piezoelectric element for outputting sound and the microphone 90e. The control unit 50g can also detect that the calling function is being executed in the electronic device 1g. A variety of forms by which the control unit 50g detects execution of the calling function are envisioned. A typical example is that when an application for talking on the phone is being executed (running), the control unit 50g can detect that the calling function is being executed (running).

Alternatively, at the time of a call, when the control unit 50g detects that the second piezoelectric element 32c for transmitting sound is being driven, the control unit 50g can detect execution of the calling function. Furthermore, at the time of the call, when the voice of the user or the like is being detected by the microphone 90e, the control unit 50g may detect execution of the calling function. At the time of a call, when driving of the second piezoelectric element 32c for transmitting sound is detected, the control unit 50g can also detect execution of the calling function. Furthermore, for example by providing a proximity sensor such as a photosensor or the like, the control unit 50g can detect execution of the calling function when, for example, it is detected that the user's ear or the like has come close to the panel 10c. For example by providing an acceleration sensor or the like, the control unit 50g also can detect execution of the calling function when, for example, it is detected that the electronic device 1g has come close to the user's ear or the like.

Figure 26A:
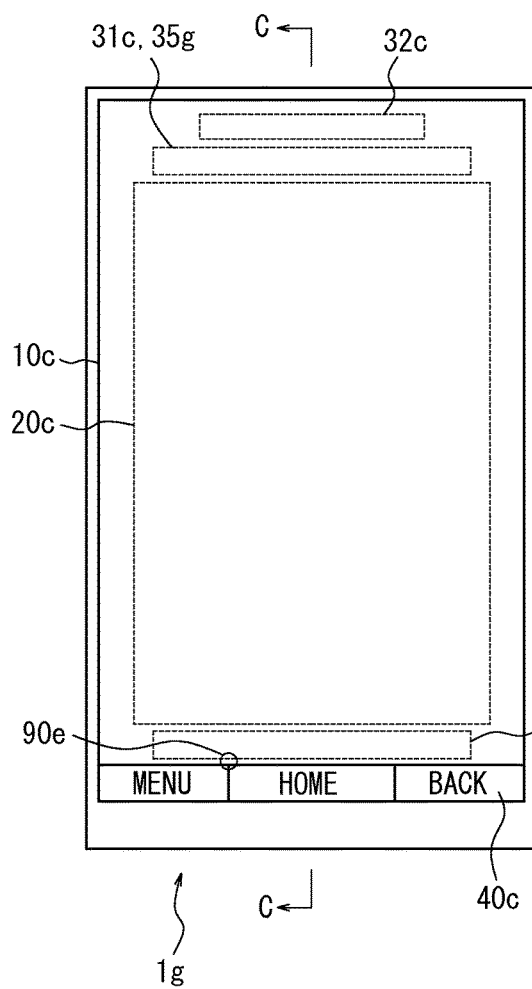
FIGS. 26(A) and 26(B) illustrate an example of a housing structure of the electronic device according to Embodiment 11.
Figure 26B:
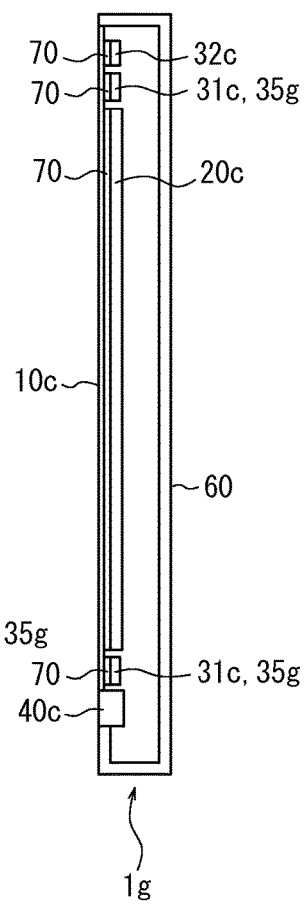

FIGS. 26(A) and 26(B) illustrate an example of a housing structure of the electronic device 1g according to Embodiment 1. FIG. 26(A) is a front view, and FIG. 26(B) is a cross-sectional view along the C-C line in FIG. 27(A).

The electronic device 1g illustrated in FIGS. 26(A) and 26(B) is a smartphone in which a touch panel that is a glass plate is disposed on the front face of a housing 60 (for example a metal or resin case) as the panel 10c. The panel 10c and the input unit 40c are supported by the housing 60. The display unit 20c, first piezoelectric elements 31c, and second piezoelectric element 32c are each adhered to the panel 10c via a joining member 70. In the example illustrated in FIG. 26(A), as described above, each first piezoelectric element 31c is shown as a piezoelectric element that also serves the function of the pressure detection unit 35g. Furthermore, in the example illustrated in FIG. 26(A), the first piezoelectric elements 31c and the second piezoelectric element 32c are adhered to the back face of the panel. To illustrate this fact, the first piezoelectric elements 31c and the second piezoelectric element 32c are shown with dashed lines in FIG. 26(A). The joining member 70 is adhesive with thermosetting properties, ultraviolet curable properties, or other such properties; double-sided tape; or the like. The joining member 70 may, for example, be optical elasticity resin, which is clear and colorless acrylic ultraviolet curing adhesive. The panel 10c, display unit 20c, first piezoelectric elements 31c, and second piezoelectric element 32c are each generally rectangular. Furthermore, the microphone 90e is provided at a predetermined position in the panel 10c, typically near a position opposite the second piezoelectric element 32c with reference to the central portion of the panel 10c. Note that the microphone 90e is omitted from FIG. 26(B).

As illustrated in FIG. 26(A), the display unit 20c is disposed in approximately the center in the transverse direction of the panel 10c. The first piezoelectric elements 31c and the second piezoelectric element 32c are disposed at a predetermined distance from an edge of the panel 10c in the longitudinal direction, near the edge so that the longitudinal direction of the first piezoelectric elements 31c and the second piezoelectric element 32c extends along a short side of the panel 10c.

In FIGS. 26(A) and 26(B), the display unit 20c, first piezoelectric elements 31c, and second piezoelectric element 32c are disposed side by side, in parallel directions, on the back face of the panel 10c, yet the arrangement of these components is not limited to this example. For example, at least one of the first piezoelectric elements 31c and the second piezoelectric element 32c may be disposed in parallel to the longitudinal direction of the electronic device 1g (the lengthwise direction in FIG. 26(A)). In other words, in the present embodiment, any configuration that allows the first piezoelectric elements 31c and the second piezoelectric element 32c to transmit vibration to the panel 10c by being attached to the panel 10c may be adopted.

Furthermore, FIGS. 26(A) and 26(B) illustrate a configuration in which the display unit 20c is adhered to the back face of the panel 10c via the joining member 70, yet the arrangement of the display unit 20c is also not limited to the illustrated example. For example, the display unit 20c may be adhered to the back face of the panel 10c without the joining member 70 therebetween or may be disposed inside the housing 60 instead of being adhered to the panel 10c. When disposing the display unit 20c inside the housing 60, the display unit 20c may be fixed directly on the inside of the housing 60 or may be fixed to a substrate, or to a holder for the display unit, disposed on the inside of the housing 60. If the display unit 20c is disposed on the back face of the panel 10c, as illustrated in FIGS. 26(A) and 26(B), then when the panel 10c and the display unit 20c form a touch panel, any user interface may be displayed on the display unit 20c, and user operation can be detected by the panel 10c. In FIG. 26(A), the display unit 20c is illustrated with a dashed line to indicate that the display unit 20c is adhered to the back face of the panel 10c.

In FIGS. 26(A) and 26(B), in the space enclosed by the housing 60 and the panel 10c, illustration is omitted for components other than the display unit 20c, first piezoelectric elements 31c, second piezoelectric element 32c, input unit 40c, joining member 70, and microphone 90e. Accordingly, apart from what is illustrated in FIGS. 26(A) and 26(B), the electronic device 1g may be provided with elements such as the control unit 50g and a variety of substrates, components, or the like. Furthermore, in FIG. 26(A), regarding the region in which display by the display unit 20c does not need to be transmitted to the panel 10c (i.e. the region where the panel 10c and display unit 20c do not overlap), the region near the edges of the panel 10c is preferably painted or covered with a bezel. The first piezoelectric elements 31c, second piezoelectric element 32c, and the like can thus be prevented from being seen from the exterior of the electronic device 1g.

Next, the processing performed by the control unit 50g according to the present embodiment is described.

Figure 27:
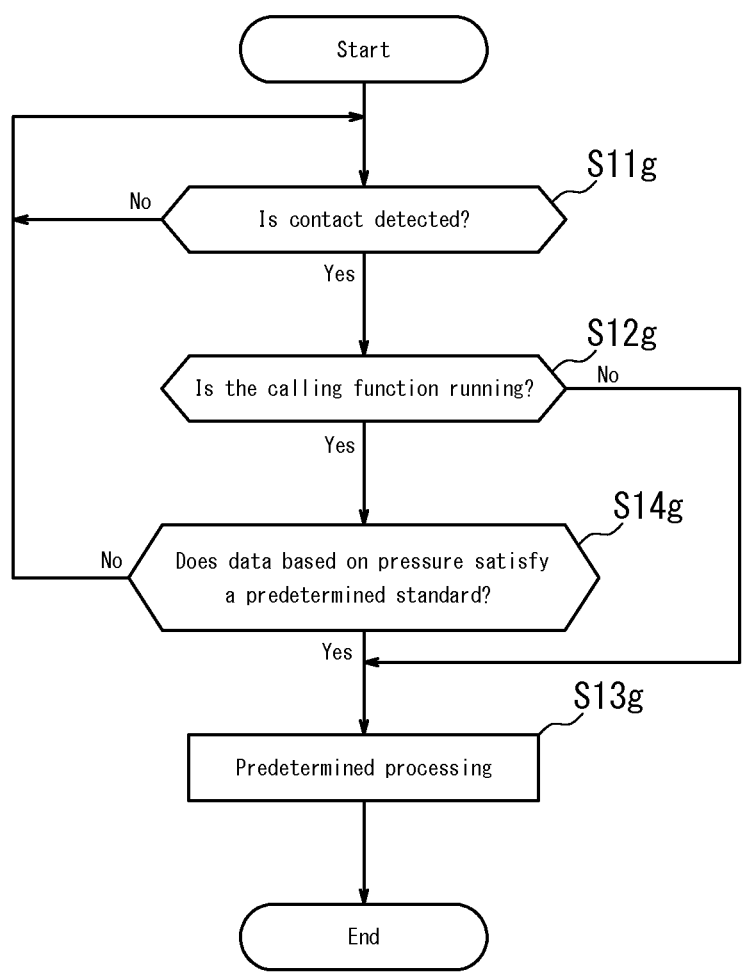
FIG. 27 is a flowchart illustrating processing by the electronic device according to Embodiment 11.

FIG. 27 is a flowchart illustrating the processing in the present embodiment. In the present embodiment, when the calling function is not running, the control unit 50g performs control to execute predetermined processing based on detection of contact by the panel 10c. In other words, when the calling function is not running, the control unit 50g performs control to execute predetermined processing upon detection that the user's finger or the like has contacted the panel 10c. At this time, when contact on the panel 10c is detected at a position corresponding to a position at which an object, such as a predetermined key or button, is displayed on the display unit 20c, predetermined processing associated with the object is preferably executed.

Upon the start of processing in the present embodiment, the control unit 50g determines whether the panel 10c has detected contact, as described above (step S11g). If the panel 10c has detected contact in step S11g, the control unit 50g determines whether execution of the calling function has been detected in the electronic device 1g (step S12g).

When execution of the calling function is not detected in step S12g, i.e. when the user is not on a call, the control unit 50g performs control to execute predetermined processing based on the detected contact (step S13g). For example, when contact on the panel 10c is detected at a position corresponding to the position at which an object for a character input key is displayed on the display unit 20c, the control unit 50g performs control to execute processing to display the character on the display unit 20c. Another example is that when contact on the panel 10c is detected at a position corresponding to the position at which an object for placing or disconnecting a call is displayed on the display unit 20c, the control unit 50g performs control to begin or disconnect a call. In the present embodiment, the control unit 50g thus performs control to execute predetermined processing based on detection of contact by the panel 10c.

On the other hand, when contact is detected in step S11g and execution of the calling function is detected in step S12g, i.e. during a call, processing proceeds to step S14g. In step S14g, the control unit 50g performs control to execute the predetermined processing based on detection of contact by the panel 10c and on detection of pressure by the pressure detection unit 35g. In other words, in the present embodiment, upon detecting execution of the calling function, the control unit 50g preferably performs control so that the predetermined processing is not executed based only on detection of contact by the panel 10c.

In step S14g, upon detecting execution of the calling function, the control unit 50g preferably performs control to execute the predetermined processing when the data based on pressure detected by the pressure detection unit 35g satisfies a predetermined standard. The predetermined standard to be satisfied by the data based on pressure on the panel 10c is set to be a standard such that the predetermined processing is not executed when the user's ear or the like has only lightly contacted the panel 10c.

Such a predetermined standard can be set in advance and stored in the control unit 50g or the like. Such a predetermined standard can preferably be changed afterwards taking into consideration usability. Furthermore, the predetermined standard may be calculated from, for example, data based on normal pressure when the user performs a normal operation on the panel 10c and/or when the user presses the ear or the like to the panel.

In sum, in the present embodiment, the control unit 50g does not execute predetermined processing when the panel 10c merely detects light contact during a call, but rather executes the predetermined processing only when the pressure detected by the pressure detection unit 35g has a certain degree of intensity. In this way, according to the electronic device 1g of the present embodiment, even if the user contacts an ear or the like to the panel 10c during a call, the risk of predetermined processing based on the contact being executed is reduced. Therefore, according to the electronic device 1g of the present embodiment, the risk of executing processing not intended by the user can be reduced.

Note that when execution of the calling function is detected and data based on pressure satisfies a predetermined standard, the control unit 50g may perform control so that the first piezoelectric element 31c provides a tactile sensation by generating predetermined vibration. This predetermined standard may be set appropriately in accordance with the load characteristics when pressing an object.

When the first piezoelectric element 31c also serves as the pressure detection unit 35g, the first piezoelectric element 31c can also be configured to generate vibration by being driven when the magnitude of the voltage (voltage value (data)) of the piezoelectric element satisfies a predetermined standard. Stating that the magnitude of the voltage (voltage value (data)) of the piezoelectric element satisfies a predetermined standard may refer to the voltage value (data) reaching a predetermined standard, to the voltage value (data) exceeding a predetermined standard, or to detection of a voltage value (data) equivalent to a predetermined standard.

Embodiment 12

Next, an electronic device according to Embodiment 12 of the present invention is described. Where the structure is the same as in Embodiments 1 through 11, the same reference signs are used, and a description thereof is omitted. The electronic device 2g according to Embodiment 12 has the structure of the electronic device 1g according to Embodiment 11, with changes to the control by the control unit 50g. Accordingly, Embodiment 12 of the present invention can basically be implemented with an electronic device having the same structure as the electronic device 1g described in Embodiment 11. Therefore, the same explanation as in Embodiment 11 is omitted.

In Embodiment 12 as well, the control unit 50g performs control to output sound by driving the second piezoelectric element 32c. In this way, in the electronic device 2g, the second piezoelectric element can implement the function of outputting audio and transmitting the audio to the user. With regard to this point, Embodiment 12 is the same as Embodiment 11.

In Embodiment 11, other than during a call, control is performed to execute predetermined processing upon detection of contact on the panel 10c, whereas during a call, control is performed to execute predetermined processing when it is also the case that data based on pressure detected by the pressure detection unit 35g satisfies a predetermined standard. In Embodiment 12, regardless of whether the user is on a call, predetermined processing is executed when data based on pressure detected by the pressure detection unit 35g satisfies a predetermined standard, yet during a call, the predetermined standard is set higher than when the user is not on a call.

Figure 28:
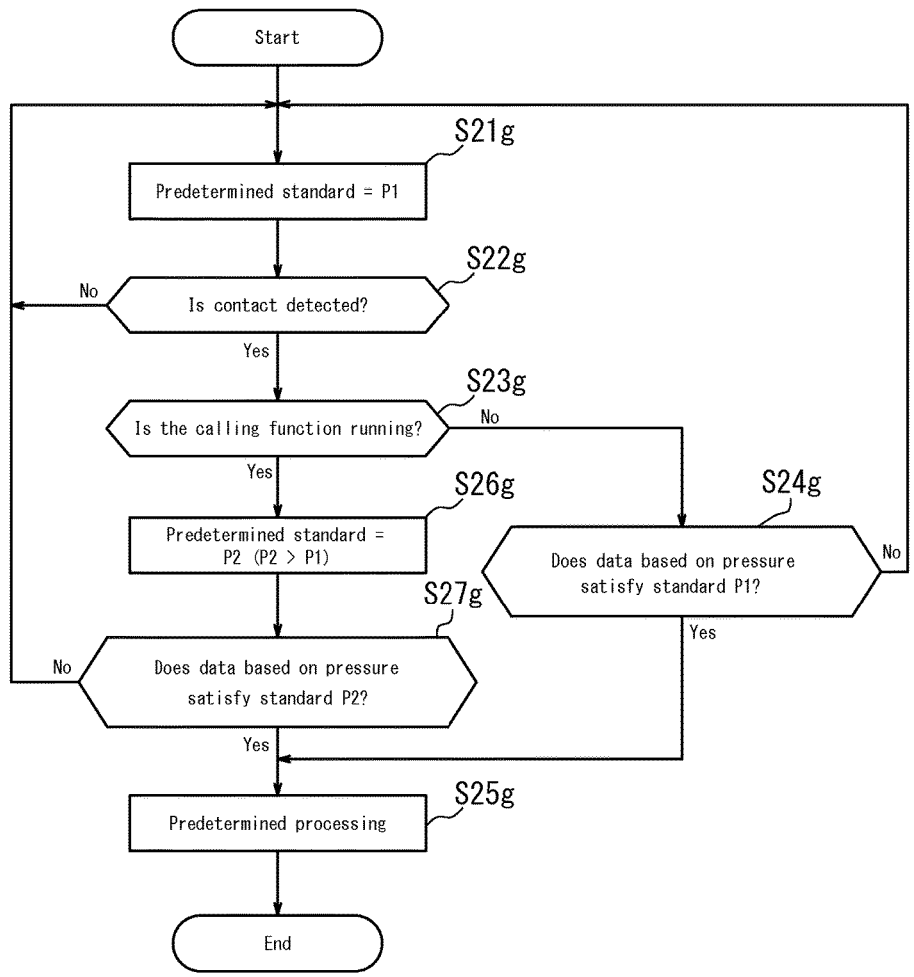
FIG. 28 is a flowchart illustrating processing by the electronic device according to Embodiment 12.

FIG. 28 is a flowchart illustrating the processing in the present embodiment.

Upon the start of processing in Embodiment 12, the control unit 50g sets a predetermined value P1 as the above-described predetermined standard (step S21g). The predetermined standard P1 is preferably set in advance to a value that takes into consideration data based on pressure at the time of a regular user operation and that is not excessively low. The setting of the predetermined standard P1 can also preferably be changed afterwards.

By setting the predetermined standard P1 to be a value for which data based on pressure at the time of a regular user operation (for example, an average or the like) has been taken into consideration, predetermined processing is prevented from being executed at the time of light, unintentional contact by the user. With this approach, the sense of pressure at the user's fingertip is also stimulated when data based on pressure detected by the pressure detection unit 35g satisfies the predetermined standard P1. In this state, driving the first piezoelectric element 31c so as to vibrate at an appropriate amplitude and frequency allows for provision of a realistic click sensation such as that obtained when pressing a switch such as an actual push-button switch (push-type button switch). In this case, even if a push-button switch is rendered as an image on the touch sensor, the user can perform a contact operation on the panel 10c while obtaining a realistic click sensation similar to that obtained when operating an actual push-button switch.

Once the predetermined standard P1 is set in step S21g, the control unit 50g determines whether the panel 10c has detected contact (step S22g). If the panel 10c has detected contact in step S22g, the control unit 50g determines whether execution of the calling function has been detected in the electronic device 2g (step S23g).

When execution of the calling function is not detected in step S23g, i.e. when the user is not on a call, processing proceeds to step S24g. In step S24g, the control unit 50g determines whether data based on pressure on the panel 10c satisfies the predetermined standard P1. When the data based on pressure on the panel 10c does not satisfy the predetermined standard P1 in step S24g, the control unit 50g returns to step S21g and continues processing.

Conversely, when the data based on pressure on the panel 10c satisfies the predetermined standard P1 in step S24g, the control unit 50g performs control to execute predetermined processing based on the detected contact (step S25g). The predetermined processing executed in step S25g is similar to the predetermined processing in step S13g of FIG. 27 described in Embodiment 11. Note that as in Embodiment 11, when execution of the calling function is detected and data based on pressure satisfies the predetermined standard P1, the control unit 50g may perform control so that the first piezoelectric element 31c provides a tactile sensation by generating predetermined vibration.

When execution of the calling function is detected in step S23g, i.e. during a call, the control unit 50g sets the predetermined standard, which had been set to P1, to P2, which is a higher (greater) value than P1 (step S26g). The value that is set as P2, which is a higher value than P1, allows for a standard such that the predetermined processing is not executed when the user's ear or the like only contacts the panel 10c to a certain degree.

Once P2, which is a higher value than P1, is set as the predetermined standard in step S26g, the control unit 50g determines whether data based on pressure on the panel 10c satisfies the predetermined standard P2 (step S27g). When the data based on pressure on the panel 10c does not satisfy the predetermined standard P2 in step S27g, the control unit 50g returns to step S21g and continues processing.

Conversely, when the data based on pressure on the panel 10c satisfies the predetermined standard P2 in step S27g, the control unit 50g executes predetermined processing (step S25g). Note that as in Embodiment 11, when execution of the calling function is detected and data based on pressure satisfies the predetermined standard P2, the control unit 50g may perform control so that the first piezoelectric element 31c provides a tactile sensation by generating predetermined vibration.

In the present embodiment, the control unit 50g thus performs control to execute predetermined processing when data based on pressure on the panel 10c satisfies the predetermined standard P1. In the present embodiment, however, upon detecting execution of the calling function, the control unit 50g performs control to set the predetermined standard P1 higher (to P2). In this case, upon detecting execution of the second piezoelectric element 32c for transmitting sound, the control unit 50g preferably performs control to set the predetermined standard higher. When the data based on pressure on the panel 10c satisfies the predetermined standard P1 or P2, the control unit 50g preferably performs control to drive the first piezoelectric element 31c for providing a tactile sensation.

According to the electronic device 2g of the present embodiment, even if the user contacts an ear or the like to the panel 10c during a call, the risk of predetermined processing based on the contact being executed is reduced. Therefore, according to the electronic device 2g of the present embodiment, the risk of executing processing not intended by the user can be reduced. Furthermore, according to the electronic device 2g of the present embodiment, when the calling function is not running, predetermined processing is not executed even if the user unintentionally contacts the panel 10c lightly. Accordingly, the risk of executing processing not intended by the user is even further reduced.

In each of the above-described embodiments, a configuration has been described in which an object is displayed on the display unit 20c provided on the back face of the panel, and the panel 10c detects contact by the user. The present invention is not, however, limited to this configuration. For example, a configuration that does not include the display unit 20c may be adopted, with an object being printed directly on the panel 10c with ink or the like.

In the above embodiment, the panel 10c is used to detect contact on the panel 10c. In other words, the panel 10c in the above embodiment is envisioned as being a member such as a so-called touch sensor. The touch panel used in the electronic device according to the present invention, however, may be of any type that is contacted by a contacting object such as a user's finger, a stylus pen, or the like.

For example, the panel used in the electronic device according to the present invention may be a member that does not detect the position of contact on the panel by the contacting object (i.e. a member without a sensing function). In an electronic device with such a structure, providing a pressure detection unit, for example, that detects pressure on the panel allows for determination, based on the pressure detected by the pressure detection unit, that the panel has been contacted.

By vibration of the panel 10c, the above-described electronic device 1g can transmit, to the user, air-conducted sound as well as vibration sound that is transmitted through a part of the user's body (such as the cartilage of the outer ear). Therefore, when sound is output at a volume equivalent to a known dynamic receiver, the sound that is transmitted to the periphery of the electronic device 1g by air vibrations due to vibration of the panel 10c is smaller than with a dynamic receiver. Accordingly, the panel device 1f is appropriate for listening to recorded messages, for example, on the train or the like.

The above-described electronic device 1g transmits vibration sound by vibration of the panel 10c, and therefore even if the user is wearing earphones or headphones, for example, the user can hear sound through the earphones or headphones and through a part of the body by contacting the electronic device 1g against the earphones or headphones.

The above-described electronic device 1g transmits sound to a user by vibration of the panel 10c. Therefore, if the electronic device 1g is not provided with a separate dynamic receiver, it is unnecessary to form an opening (sound discharge port) for sound transmission in the housing 60, thereby simplifying waterproof construction of the electronic device 1g. On the other hand, if the electronic device 1g is provided with a dynamic receiver, the sound discharge port should be blocked by a member permeable by gas but not liquid. Gore-Tex (registered trademark) is an example of a member permeable by gas but not liquid.

In the above-described embodiment, the control unit 50g performs control to execute predetermined processing based on detection of contact by the panel 10c and on detection of pressure by the pressure detection unit 35g while the calling function is running. The control unit 50g may, however, perform control to execute predetermined processing based on detection of contact by the panel 10c and on detection of pressure by the pressure detection unit 35g while driving the piezoelectric element 32 that is for transmitting sound and is attached to the panel 10c.

When the control unit 50g performs control to execute predetermined processing based on detection of contact by the panel 10c, the control unit 50g may perform control to execute predetermined processing based on detection of pressure by the pressure detection unit 35g while the calling function is running. In this case, while the calling function is running, the control unit 50g may perform control so as not to execute predetermined processing based on detection by the panel 10c.

The control unit 50g may also perform control to execute predetermined processing based on detection of contact by the panel 10c while driving the piezoelectric element 32c for transmitting sound. In this case, while driving the piezoelectric element 32c for transmitting sound, the control unit 50g may perform control so as not to execute predetermined processing based on detection by the panel 10c.

In the case that the control unit 50g performs both control to execute predetermined processing when the data based on pressure satisfies a predetermined standard and control to output sound by driving the piezoelectric element 32 for transmitting sound while the calling function is running, the control unit 50g may perform control to set the predetermined standard higher while driving the piezoelectric element 32 for transmitting sound.

Embodiment 13

The following describes an electronic device according to Embodiment 13 of the present invention with reference to the drawings. Where the structure is the same as in Embodiments 1 through 12, the same reference signs are used, and a description thereof is omitted. The electronic device according to the present invention may be a mobile phone, a smartphone, a tablet PC, or the like provided with a touch panel. The present invention is not, however, limited to such mobile devices and may be any of a variety of electronic devices such as a household appliance, industrial device (factory automation equipment), dedicated terminal, or the like provided with a touch panel.

Figure 29:
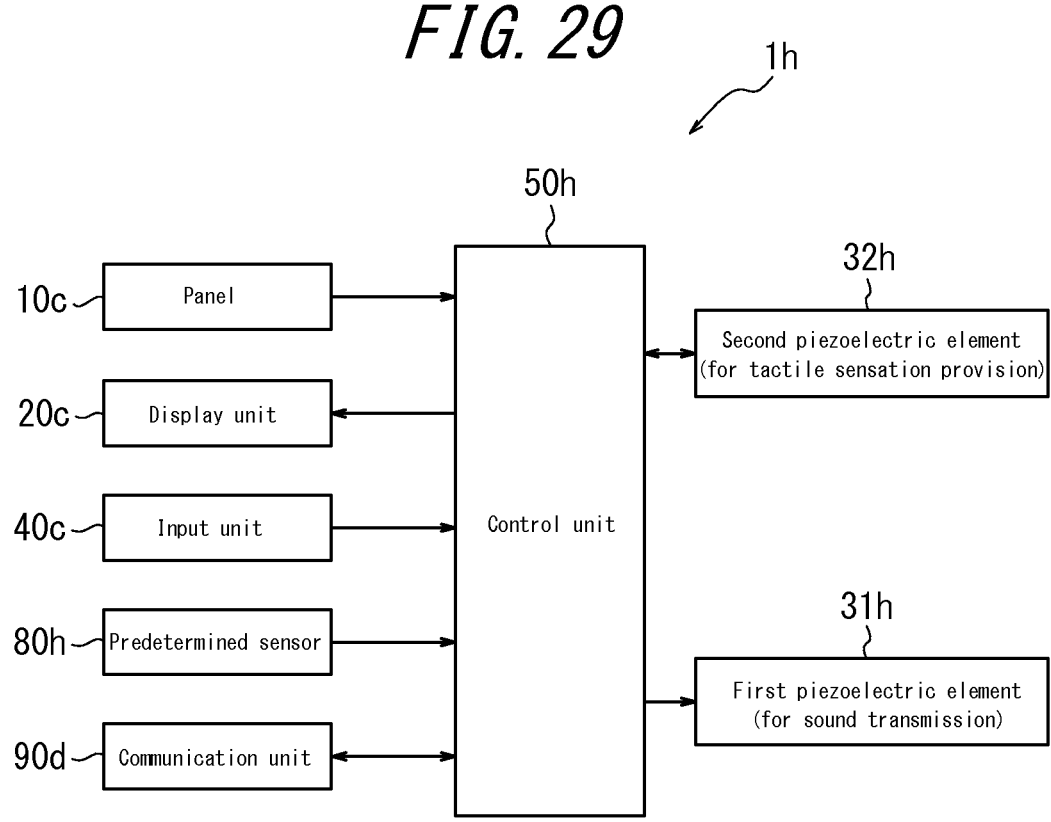
FIG. 29 is a functional block diagram of an electronic device according to Embodiment 13.

FIG. 29 is a functional block diagram of an electronic device according to Embodiment 13 of the present invention.

As illustrated in FIG. 29, an electronic device 1h according to Embodiment 13 of the present invention includes a panel 10c, a display unit 20c, a first piezoelectric element 31h, a second piezoelectric element 32h, an input unit 40c, a control unit 50h, a predetermined sensor 80h, and a communication unit 90d. When the electronic device 1h of the present embodiment functions as a mobile phone, vibration of the panel 10c caused by the first piezoelectric element 31h generates sound that is transmitted inside the human body. The sound is transmitted inside the human body by vibration of the middle ear or the inner ear via soft tissue (such as cartilage) of the human body.

The first piezoelectric element 31h and the second piezoelectric element 32h are formed by elements that, upon application of an electric signal (voltage), either expand and contract or bend (flex) in accordance with the electromechanical coupling coefficient of their constituent material. For these piezoelectric elements, ceramic or crystal elements, for example, may be used. The first piezoelectric element 31h and the second piezoelectric element 32h may be a unimorph, bimorph, or laminated piezoelectric element. Examples of a laminated piezoelectric element include a laminated unimorph element with layers of unimorph (for example, 16 or 24 layers) and a laminated bimorph element with layers of bimorph (for example, 16 or 24 layers). Such a laminated piezoelectric element may be configured with a laminated structure formed by a plurality of dielectric layers composed of, for example, lead zirconate titanate (PZT) and electrode layers disposed between the dielectric layers. Unimorph expands and contracts upon the application of an electric signal (voltage), and bimorph bends upon the application of an electric signal (voltage).

The first piezoelectric element 31h and the second piezoelectric element 32h are preferably disposed on the back face of the panel 10c (the side facing the inside of the electronic device 1h). The first piezoelectric element 31 and the second piezoelectric element 32h are attached to the panel 10c by a joining member (for example, double-sided tape). The first piezoelectric element 31h and the second piezoelectric element 32h may be attached to the panel 10c with an intermediate member (for example, sheet metal) therebetween. Once disposed on the back face of the panel 10c, the first piezoelectric element 31h and the second piezoelectric element 32h are separated from the inner surface of the housing by a predetermined distance. The first piezoelectric element 31h and the second piezoelectric element 32h are preferably separated from the inner surface of the housing by the predetermined distance even when expanding and contracting or bending. In other words, the distance between the first piezoelectric element 31h and second piezoelectric element 32h and the inner face of the housing is preferably larger than the maximum amount of deformation of the first piezoelectric element 31h and the second piezoelectric element 32h.

In the present embodiment, the first piezoelectric element 31h is a piezoelectric element mainly used for transmitting sound. Accordingly, the first piezoelectric element 31h is preferably a piezoelectric element designed to have a suitable frequency characteristic for transmitting a predetermined sound based on an electric signal from the control unit 50h.

On the other hand, in the present embodiment, the second piezoelectric element 32h is a piezoelectric element mainly used for detecting pressure on the panel 10c and for providing a tactile sensation. Accordingly, the second piezoelectric element 32h is preferably a piezoelectric element designed to allow for appropriate detection of pressure on the panel 10c and to have a suitable frequency characteristic for providing a predetermined tactile sensation based on an electric signal from the control unit 50h. In the present embodiment, the first piezoelectric element and the second piezoelectric element are thus disposed in the panel 10c as different piezoelectric elements.

In Embodiment 13, a configuration for controlling only the first piezoelectric element 31h is described. Therefore, the second piezoelectric element 32h is not an essential constituent element and may be omitted in a simple structure. In the present embodiment, the second piezoelectric element 32h is described as providing a tactile sensation by being driven due to control by the control unit 50h in cases such as when contact on the panel 10c is detected at a position corresponding to the position at which a predetermined object is displayed on the display unit 20c. Due to the control unit 50h providing such a tactile sensation and also starting processing associated with the object for which contact was detected, the user can recognize that input to the panel 10c with the user's own finger or the like has been detected properly by the electronic device 1h.

The control unit 50h applies an electric signal to the first piezoelectric element 31h to drive the first piezoelectric element 31h, thus controlling sound output. In this way, when controlling sound output by driving the first piezoelectric element 31h, the control unit 50h can perform control to drive the first piezoelectric element 31h based on a trigger for sound output from a predetermined application or the like (based on an audio signal (sound signal) or the like).

The voltage that the control unit 50h applies to the first piezoelectric element 31h may, for example, be ±15 V. This is higher than ±5 V, i.e. the applied voltage of a so-called panel speaker for conduction of sound by air-conducted sound rather than vibration sound. In this way, even if the user presses the panel 10c against the user's body for example with a force of 3 N or greater (a force of 5 N to 10 N), sufficient vibration is generated in the panel 10c to allow for generation of a vibration sound transmitted via a part of the user's body. Note that the magnitude of the applied voltage used may be appropriately adjusted in accordance with the fixation strength of the panel 10c with respect to the housing or a support member, or in accordance with the performance of the first piezoelectric element 31h or the second piezoelectric element 32h.

Upon the control unit 50h applying an electric signal to the first piezoelectric element 31h and the second piezoelectric element 32h, the first piezoelectric element 31h and the second piezoelectric element 32h to which the electric signal has been applied expand and contract in the direction of the long sides of each element. At this point, the panel 10c to which the first piezoelectric element 31h and the second piezoelectric element 32h are attached deforms in accordance with expansion and contraction of the first piezoelectric element 31h and the second piezoelectric element 32h, and the panel 10c vibrates. The panel 10c flexes due to expansion and contraction or to bending of the first piezoelectric element 31h and the second piezoelectric element 32h. The panel 10c is bent directly by the first piezoelectric element 31h and the second piezoelectric element 32h. Stating that "the panel 10c is bent directly by the piezoelectric element" differs from the phenomenon utilized in known panel speakers, whereby the panel deforms upon vibration of a particular region of the panel due to the inertial force of a piezoelectric actuator constituted by a piezoelectric element disposed in the casing. Stating that "the panel 10c is bent directly by the piezoelectric element" refers instead to how expansion and contraction or bending (flexure) of the piezoelectric element directly bends the panel via the joining member or via the joining member and the below-described reinforcing member.

When the first piezoelectric element 31h expands and contracts and the panel 10c vibrates, then along with generating air-conducted sound, the panel 10c generates vibration sound that is transmitted via a part of the user's body when the user brings a part of the body (such as the cartilage of the outer ear) into contact. The control unit 50h transmits air-conducted sound and vibration sound to a contacting object that contacts the panel 10c. For example, the control unit 50h can apply an electric signal, corresponding to an audio signal related to the other party's voice, to the first piezoelectric element 31h to generate air-conducted sound and vibration sound that correspond to the audio signal. The audio signal may be related to ringtones, music including songs, or the like. Note that the audio signal pertaining to the electric signal may be based on music data stored in internal memory of the electronic device 1h, or may be music data stored on an external server or the like and played back over a network.

The panel 10c vibrates not only in the region in which the first piezoelectric element 31h is attached, but also in a region separate from the attachment region. In the region in which vibration is generated, the panel 10c includes a plurality of locations at which the panel 10c vibrates in a direction intersecting the main surface of the panel 10c. At each of these locations, the value of the vibration amplitude changes over time from positive to negative or vice-versa. At a given instant during vibration of the panel 10c, portions with a relatively large vibration amplitude and portions with a relatively small vibration amplitude appear to be distributed randomly or cyclically over nearly the entire panel 10c. In other words, a plurality of vibration waves are detected across the entire panel 10c. The voltage that the control unit 50h applies to the first piezoelectric element 31h may be ±15 V to suppress damping of the above-described vibration of the panel 10c even if the user presses the panel 10c against the user's body with a force of, for example, 5 N to 10 N. Therefore, the user can hear sound by contacting a region distant from the above-described attachment region of the panel 10c to the ear.

Furthermore, in the present embodiment, the user of the electronic device 1h can talk with the user of another electronic device or the like by the control unit 50h executing (running) a calling function. When the calling function is executed in the electronic device 1h, the below-described communication unit 90d communicates with a base station or another communication device via a wired or wireless connection. At this time, functional units pertaining to communication are used as appropriate in the electronic device 1h, such as the second piezoelectric element for outputting sound and a microphone, which is omitted from the drawings. The control unit 50h can also detect that the calling function is being executed in the electronic device 1h. A variety of forms by which the control unit 50h detects execution of the calling function are envisioned. A typical example is that when an application for talking on the phone is being executed (running), the control unit 50*h* can detect that the calling function is being executed (running). Alternatively, at the time of a call, when the control unit 50*h* detects that the second piezoelectric element 32*h* for transmitting sound is being driven, the control unit 50*h* can detect execution of the calling function. Furthermore, at the time of the call, when the voice of the user or the like is being detected by the non-illustrated microphone, the control unit 50*h* may detect execution of the calling function.

The predetermined sensor 80*h* may be any of a variety of sensors that judge a user operation during a call, such as an operation by which the user places an ear or the like close to or against the panel 10*c* in order to talk on the phone using the electronic device 1*h*. In the present embodiment, the control unit 50*h* determines whether the result of detection by the predetermined sensor 80*h* satisfies a predetermined standard.

For example, the predetermined sensor 80*h* may be a proximity sensor that detects that a predetermined object, such as the user's ear or the like, has approached the panel 10*c* to a predetermined distance. A variety of sensors may be used as the proximity sensor. This predetermined distance includes, for example, the state of a predetermined object, such as the user's ear or the like, contacting the proximity sensor (i.e. a distance of zero) and is preferably a distance short enough to allow sufficient transmission of sound to the user's ear or the like by vibration of the first piezoelectric element 31*h* for outputting sound.

By using, for example, a photosensor or the like for the predetermined sensor 80*h*, the predetermined sensor 80*h* can detect that a predetermined object, such as the user's ear or the like, has approached the panel 10*c* to a predetermined distance, or that a talking operation has been performed, for example when the user's ear or the like is close to the panel 10*c* and light is blocked. Furthermore, by using an acceleration sensor, a three-axis sensor, or the like, for example, as the predetermined sensor 80*h*, the predetermined sensor 80*h* can detect that a predetermined object, such as the user's ear or the like, has approached the panel 10*c* to a predetermined distance, or that a talking operation has been performed, when a predetermined condition is satisfied. The result thus detected by the predetermined sensor 80*h* is transmitted to the control unit 50*h* as an electric signal.

The predetermined sensor 80*h* may also, for example, be a member such as a camera or the like that can acquire an image and detect that a predetermined object, such as the user's ear or the like, has approached to a predetermined distance, or that a talking operation has been performed. In this case, it is possible to determine whether a predetermined object, such as the user's ear or the like, has approached to a predetermined distance, or whether a talking operation has been performed, by having the control unit 50*h* process and analyze the image provided by the predetermined sensor 80*h*.

Furthermore, by using a temperature sensor or the like, for example, as the predetermined sensor 80*h*, the predetermined sensor 80*h* may detect the temperature when a predetermined object, such as the user's ear or the like, has approached to a predetermined distance.

Below, the predetermined sensor 80*h* is described as a sensor provided separately from other functional units, yet when another functional unit also serves as the functional unit for the predetermined sensor 80*h*, the predetermined sensor 80*h* need not be provided independently. For example, when the panel 10*c* can detect contact by an object such as the user's ear, the panel 10*c* may also fulfill the function of the predetermined sensor 80*h*. In this case, taking into consideration the area of contact detected by the panel 10*c*, the control unit 50*h* preferably detects a predetermined object upon detection of a larger area than a predetermined area, such as that of the user's ear or the like. With this approach, even when detecting an area equal to or less than a predetermined area, such as the user's finger, the control unit 50*h* can judge that detection has not been made of a predetermined object used in a call. Of course, the other functional unit may cause the independently provided predetermined sensor 80*h* to detect an area larger than a predetermined area, such as the user's ear or the like.

When, for example, a piezoelectric element such as the second piezoelectric element 32*h* is caused to function as a pressure detection unit, as described below, and can detect pressure on the panel 10*c* by a predetermined object, such as the user's ear or the like, this piezoelectric element may also fulfill the function of the predetermined sensor 80*h*.

Figure 30A:
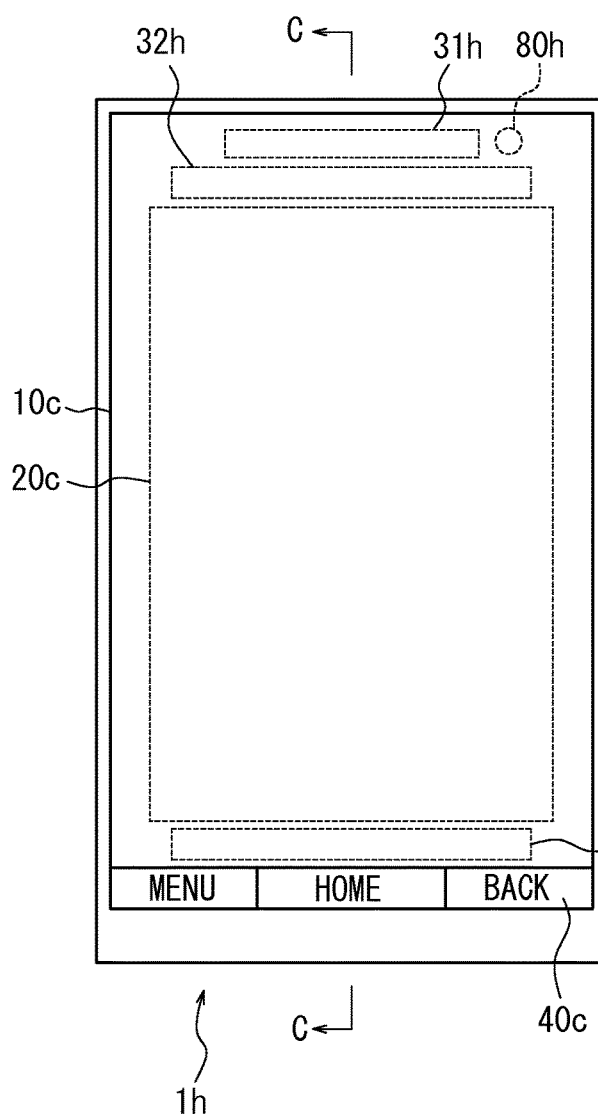
FIGS. 30(A) and 30(B) illustrate an example of a housing structure of the electronic device according to Embodiment 13.
Figure 30B:
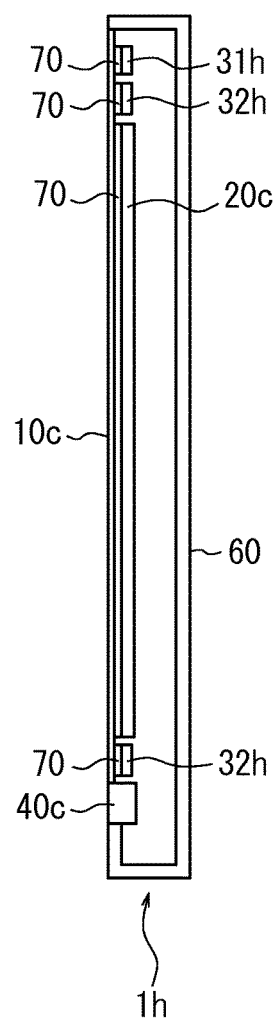

FIGS. 30(A) and 30(B) illustrate an example of a housing structure of the electronic device 1*h* according to Embodiment 1. FIG. 30(A) is a front view, and FIG. 30(B) is a cross-sectional view along the C-C line in FIG. 31(A).

The electronic device 1*h* illustrated in FIGS. 30(A) and 30(B) is a smartphone in which a touch panel that is a glass plate is disposed on the front face of a housing 60 (for example a metal or resin case) as the panel 10*c*. The panel 10*c* and the input unit 40*c* are supported by the housing 60. The display unit 20*c*, first piezoelectric element 31*h*, and second piezoelectric elements 32*h* are each adhered to the panel 10*c* via a joining member 70. Note that in the example illustrated in FIG. 30(A), the first piezoelectric element 31*h* and the second piezoelectric elements 32*h* are adhered to the back face of the panel. To illustrate this fact, the first piezoelectric element 31*h* and the second piezoelectric elements 32*h* are shown with dashed lines in FIG. 30(A). The joining member 70 is adhesive with thermosetting properties, ultraviolet curable properties, or other such properties; double-sided tape; or the like. The joining member 70 may, for example, be optical elasticity resin, which is clear and colorless acrylic ultraviolet curing adhesive. The panel 10*c*, display unit 20*c*, first piezoelectric element 31*h*, and second piezoelectric elements 32*h* are each generally rectangular.

As illustrated in FIG. 30(A), when configured as a proximity sensor, the predetermined sensor 80*h* is preferably provided near the first piezoelectric element 31*h* so as to allow for detection of the user's ear or the like having come close to the location where the first piezoelectric element 31*h* is provided. As long as the proximity sensor can detect that a portion of the user's body is close to the panel 10*c*, however, the position at which the proximity sensor is disposed is not limited to the position illustrated in FIG. 30(A). Note that in the example illustrated in FIG. 30(A), the predetermined sensor 80*h* is adhered to the back face of the panel 10*c*. To illustrate this fact, the predetermined sensor 80*h* is shown with a dashed line in FIG. 30(A).

As illustrated in FIG. 30(A), the display unit 20*c* is disposed in approximately the center in the transverse direction of the panel 10*c*. The first piezoelectric element 31*h* and the second piezoelectric elements 32*h* are disposed at a predetermined distance from an edge of the panel 10*c* in the longitudinal direction, near the edge so that the longitudinal direction of the first piezoelectric element 31*h* and the second piezoelectric elements 32*h* extends along a short side of the panel 10*c*.

In FIGS. 30(A) and 30(B), the display unit 20*c*, first piezoelectric element 31*h*, and second piezoelectric elements 32h are disposed side by side, in parallel directions, on the back face of the panel 10c, yet the arrangement of these components is not limited to this example. For example, at least one of the first piezoelectric element 31h and the second piezoelectric elements 32h may be disposed in parallel to the longitudinal direction of the electronic device 1h (the lengthwise direction in FIG. 30(A)). In other words, in the present embodiment, any configuration that allows the first piezoelectric element 31h and the second piezoelectric elements 32h to transmit vibration to the panel 10c by being attached to the panel 10c may be adopted.

Furthermore, FIGS. 30(A) and 30(B) illustrate a configuration in which the display unit 20c is adhered to the back face of the panel 10c via the joining member 70, yet the arrangement of the display unit 20c is also not limited to the illustrated example. For example, the display unit 20c may be adhered to the back face of the panel 10c without the joining member 70 therebetween or may be disposed inside the housing 60 instead of being adhered to the panel 10c. When disposing the display unit 20c inside the housing 60, the display unit 20c may be fixed directly on the inside of the housing 60 or may be fixed to a substrate, or to a holder for the display unit, disposed on the inside of the housing 60. If the display unit 20c is disposed on the back face of the panel 10c, as illustrated in FIGS. 30(A) and 30(B), then when the panel 10c and the display unit 20c form a touch panel, any user interface may be displayed on the display unit 20c, and user operation can be detected by the panel 10c. In FIG. 30(A), the display unit 20c is illustrated with a dashed line to indicate that the display unit 20c is adhered to the back face of the panel 10c.

In FIGS. 30(A) and 30(B), in the space enclosed by the housing 60 and the panel 10c, illustration is omitted for components other than the display unit 20c, first piezoelectric element 31h, second piezoelectric elements 32h, input unit 40c, joining member 70, and predetermined sensor 80h. Accordingly, apart from what is illustrated in FIGS. 30(A) and 30(B), the electronic device 1h may be provided with elements such as the control unit 50h and a variety of substrates, components, or the like. Furthermore, in FIG. 30(A), regarding the region in which display by the display unit 20c does not need to be transmitted to the panel 10c (i.e. the region where the panel 10c and display unit 20c do not overlap), the region near the edges of the panel 10c is preferably painted or covered with a bezel. The first piezoelectric element 31h, second piezoelectric elements 32h, and the like can thus be prevented from being seen from the exterior of the electronic device 1h.

Next, the processing performed by the control unit 50h of the electronic device 1h according to the present embodiment is described.

In the electronic device 1h according to the present embodiment, the control unit 50h performs control to output sound by driving the first piezoelectric element 31h while the calling function of the electronic device 1h is running. In this way, in the electronic device 1h, the first piezoelectric element 31h can implement the function of outputting audio during a call and transmitting the audio to the user.

On the other hand, as described above, there is a risk of power being wastefully consumed in the electronic device if sound is always output in response to a trigger for outputting sound while the communication function is running. Therefore, in the present embodiment, the processing described below is performed via control by the control unit 50h.

Figure 31:
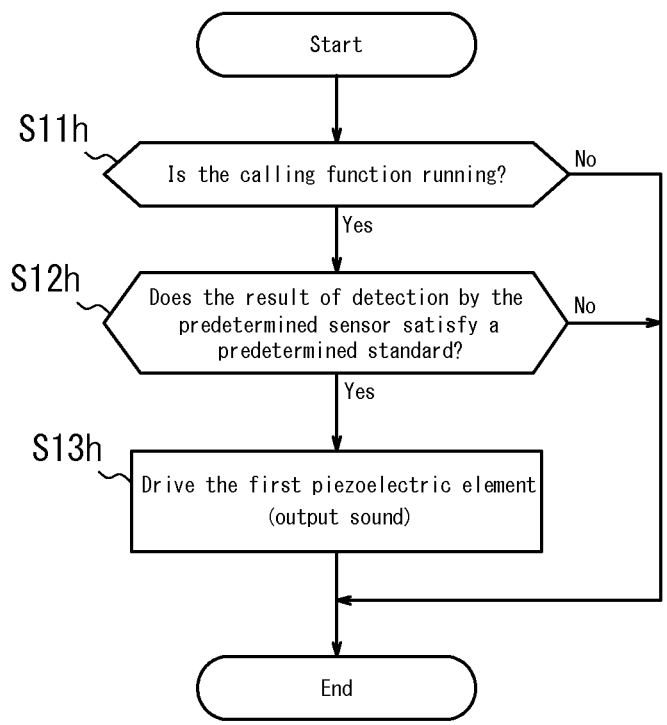
FIG. 31 is a flowchart illustrating processing by the electronic device according to Embodiment 13.

FIG. 31 is a flowchart illustrating processing by the control unit 50h in the electronic device 1h according to Embodiment 13.

Upon the start of processing according to the present embodiment, the control unit 50h first determines whether the calling function is running in the electronic device 1h (step S11h). When judging in step S11h that the calling function is running, the control unit 50h determines whether the result of detection by the predetermined sensor 80h has satisfied a predetermined standard (step S12h). For example, when the predetermined sensor 80h is a proximity sensor, the control unit 50h can control the predetermined sensor 80h to determine whether a predetermined object, such as the user's ear or the like, has approached the panel 10c to a predetermined distance.

When determining in step S12h that the result of detection by the predetermined sensor 80h has satisfied a predetermined standard, the control unit 50h can judge that the user is on a call. Accordingly, in this case, by driving the first piezoelectric element 31h, the control unit 50h performs control to output sound (step S13h).

On the other hand, when the calling function is not running in the electronic device 1h in step S11h, or when it is determined that the result of detection by the predetermined sensor 80h in step S12h has not satisfied a predetermined standard, then power is wastefully consumed if the first piezoelectric element 31h is driven to generate sound. Accordingly, in these cases, as illustrated in FIG. 31, the first piezoelectric element 31h is caused not to be driven by executing processing that does not pass through step S13h.

In this way, in the present embodiment, the control unit 50h performs control while the calling function is running to drive the first piezoelectric element 31h based on the result of detection by the predetermined sensor 80h. Therefore, according to the electronic device 1h of the present embodiment, when a piezoelectric element that is disposed on the panel for transmitting sound is driven to output sound, wasteful consumption of power can be reduced.

Embodiment 14

Next, an electronic device according to Embodiment 14 of the present invention is described. Where the structure is the same as in Embodiments 1 through 13, the same reference signs are used, and a description thereof is omitted. The electronic device 2h according to Embodiment 14 has the structure of the electronic device 1h according to Embodiment 13, with changes to the control by the control unit 50h. Accordingly, Embodiment 14 of the present invention can basically be implemented with an electronic device having the same structure as the electronic device 1h described in Embodiment 13. Therefore, the same explanation as in Embodiment 13 is omitted.

The electronic device 2h according to Embodiment 14 may have the same device structure as the electronic device 1h described in Embodiment 13, yet the electronic device 2h according to Embodiment 14 does not omit the second piezoelectric element 32h that detects pressure, as described in FIG. 29.

In the electronic device 2h according to Embodiment 14, the second piezoelectric element 32h detects pressure on the panel 10c. Also in Embodiment 14, the control unit 50h performs control to execute predetermined processing based on pressure on the panel 10c. Furthermore, in Embodiment 14, when executing the predetermined processing, the control unit 50h may provide the user with a tactile sensation by driving the second piezoelectric element 32h to generate vibration. In other words, in the present embodiment, when pressure by the user on the panel 10c increases to a certain degree while contact is continually being detected on the panel 10c, the control unit 50h performs control to execute predetermined processing (and also to provide a tactile sensation by driving the second piezoelectric element 32h).

In order to implement such control, the second piezoelectric element 32h attached to the panel 10c detects pressure on the panel 10c. In general, a piezoelectric element generates voltage when pressure is applied and deforms upon application of voltage. Accordingly, the second piezoelectric element 32h can be configured as both a functional unit that detects pressure on the panel 10c (pressure detection unit) and a functional unit that provides a tactile sensation by generating vibration (tactile sensation providing unit).

Such a pressure detection unit detects pressure on the touch face of the panel 10c and may be configured using, for example, any number of strain gauge sensors, piezoelectric elements, or the like that experience a change in physical or electrical characteristics (strain, resistance, voltage, or the like) in response to pressure.

When the pressure detection unit is configured using a piezoelectric element, for example, the magnitude of the voltage (voltage value), which is an electrical characteristic, of the piezoelectric element changes in accordance with the magnitude of the load (force) of the pressure on the panel 10c (or the speed at which the magnitude of the load (force) changes (acceleration)). In this case, the pressure detection unit can notify the control unit 50h of the magnitude of the voltage (voltage value (referred to below simply as "data")). The control unit 50h acquires the data by the pressure detection unit notifying the control unit 50h of the data, or by the control unit 50h detecting data pertaining to the piezoelectric element of the pressure detection unit. In other words, the control unit 50h acquires the data based on pressure on the panel 10c. That is, the control unit 50h acquires the data based on pressure from the pressure detection unit. When the data based on pressure satisfies a predetermined standard, the control unit 50h can determine that an operation intended by the user has been performed and can generate predetermined vibration. This predetermined standard may be set appropriately in accordance with, for example, the load characteristics when pressing the push-button switch that is intended to be represented. Stating that the data based on pressure satisfies a predetermined standard may refer to the voltage value (data) reaching a predetermined standard, to the voltage value (data) exceeding a predetermined standard, or to detection of a voltage value (data) equivalent to a predetermined standard.

In Embodiment 14, as described above, the control unit 50h acquires the data that is based on pressure on the panel 10c as detected by the second piezoelectric element 32h. The control unit 50h also applies a predetermined electric signal to the first piezoelectric element 31h and the second piezoelectric element 32h. For example, based on the pressure on the panel 10c as detected by the second piezoelectric element 32h, the control unit 50h can perform control to execute predetermined processing, and can also perform control to apply an electric signal to the second piezoelectric element 32h to drive the second piezoelectric element 32h, thereby vibrating the panel 10c to provide a tactile sensation.

Figure 32:
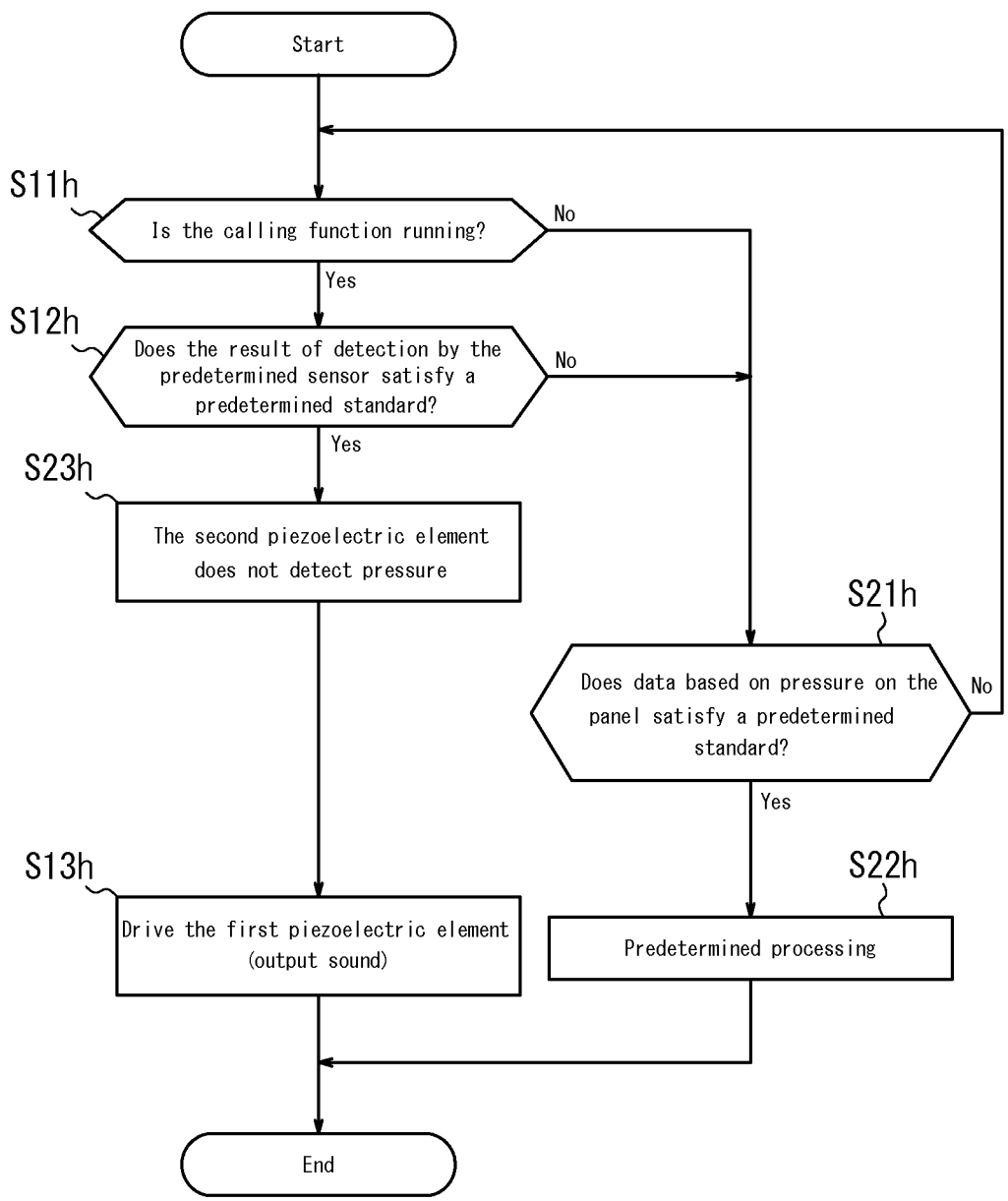
FIG. 32 is a flowchart illustrating processing by the electronic device according to Embodiment 14.

Next, the processing performed by the control unit 50h of the electronic device 2h according to the present embodiment is described. FIG. 32 is a flowchart illustrating processing by the control unit 50h in the electronic device 2h according to Embodiment 14. The following mainly describes the processing that differs from Embodiment 13 described in FIG. 31.

The flowchart in FIG. 32 is the same as the flowchart in FIG. 31, with the addition of the processing from step S21h to step S23h.

In the present embodiment, when the calling function is not running in the electronic device 1h in step S11h, or when determining in step S12h that the result of detection by the predetermined sensor 80h does not satisfy a predetermined standard, the control unit 50h performs the processing in step S21h. When processing proceeds to step S21h, the user might perform an operation on the panel 10c using a finger or the like. In other words, in this case, pressure on the panel 10c due to the user's finger or the like might be detected. Accordingly, in this case, the control unit 50h determines whether data based on pressure detected by the second piezoelectric element 32h has satisfied a predetermined standard (step S21h) and performs control to execute predetermined processing when the data based on pressure has satisfied a predetermined standard (step S22h).

When, for example, the position of the contact detected on the panel 10c in step S21h corresponds to the position at which an icon for launching an address book application is displayed on the display unit 20c, this predetermined processing may be processing to launch the address book application. When the position of the contact detected on the panel 10c in step S21h corresponds, for example, to the position at which a character key is displayed on the display unit 20c, this predetermined processing may be processing to display the character key on the display unit 20c.

In this way, when processing is performed by passing through step S21h and step S22h, processing that passes through step S13h is not performed, and hence the first piezoelectric element 31h is not driven. Therefore, in the present embodiment as well, when a piezoelectric element that is disposed on the panel for transmitting sound is driven to output sound, wasteful consumption of power can be reduced.

On the other hand, when the calling function is running in step S11h and when the result of detection by the predetermined sensor 80h satisfies a predetermined standard in step S12h, the control unit 50h performs the processing in step S13h after passing through step S23h. In other words, in this case, the control unit 50h controls the second piezoelectric element not to detect pressure (step S23h) and performs control to output sound by driving the first piezoelectric element (step S13h).

In the present embodiment, the control unit 50h thus performs control to execute predetermined processing based on pressure on the panel 10c. Furthermore, in the present embodiment, while detecting execution of the calling function, the control unit 50h performs control based on the result of detection by the predetermined sensor 80h so that detection of pressure on the panel 10c by the second piezoelectric element 32h is not performed and so as to drive the first piezoelectric element 31h. In greater detail, when the data based on pressure detected by the second piezoelectric element 32h satisfies a predetermined standard, the control unit 50h preferably performs control to execute predetermined processing.

The electronic device 2h according to the present embodiment may also be provided with a piezoelectric element that vibrates the panel 10c (for example the second piezoelectric element 32h). In this case, when the data based on pressure detected by the second piezoelectric element 32h satisfies a predetermined standard, the control unit 50h may perform control to drive the piezoelectric element (for example the second piezoelectric element 32h) that vibrates the panel 10c. As described above, the second piezoelectric element 32h may also include the function of a piezoelectric element that vibrates the panel 10c.

Therefore, like the electronic device 1h of Embodiment 13, according to the electronic device 2h of the present embodiment as well, when a piezoelectric element that is disposed on the panel for transmitting sound is driven to output sound, wasteful consumption of power can be reduced. Furthermore, according to the electronic device 2h of the present embodiment, when the user is not on a call, or when the result of detection by the predetermined sensor 80h does not satisfy a predetermined standard, it is possible suitably to detect an operation by the user while reducing wasteful consumption of power.

By providing a tactile sensation not when contact by the user on the panel 10c is simply detected, but rather when the panel 10c is also being pressed by the user to a certain degree, as in the electronic device 2h of the present embodiment, a more effective tactile sensation can be provided. In order to implement the provision of such a tactile sensation, the second piezoelectric element 32h is preferably driven and vibrated while a certain degree of pressure is being applied to the panel 10c.

In this way, by appropriately adjusting the amplitude, frequency, and the like when the second piezoelectric element 32h vibrates, a realistic tactile sensation, such as that obtained when pressing an actual mechanical key or button, can be provided when the user performs an operation on the panel 10c. Furthermore, with this approach, the occurrence of erroneous operations can be reduced, since the electronic device 2h does not detect an operation in which the user unintentionally contacts the panel 10c lightly, but rather only detects an operation in which the user intentionally applies pressure to the panel 10c.

In the above-described embodiment, a structure in which the first piezoelectric element 31h functions as both the tactile sensation providing unit and the pressure detection unit has been described. The first piezoelectric element 31h may, however, be given the function of providing a tactile sensation, and a separate pressure detection unit from the first piezoelectric element 31h may be provided. In this case, in step S21h, when the panel 10c is detecting contact and data based on pressure detected by the pressure detection unit satisfies a predetermined standard, the control unit 50h proceeds to step S22h and executes predetermined processing.

In each of the above-described embodiments, a configuration has been described in which an object is displayed on the display unit 20c provided on the back face of the panel, and the panel 10c detects contact by the user. The present invention is not, however, limited to this configuration. For example, a configuration that does not include the display unit 20c may be adopted, with an object being printed directly on the panel 10c with ink or the like.

In the above embodiment, the panel 10c is used to detect contact on the panel 10c. In other words, the panel 10c in the above embodiment is envisioned as being a member such as a so-called touch sensor. The touch panel used in the electronic device according to the present invention, however, may be of any type that is contacted by a contacting object such as a user's finger, a stylus pen, or the like.

For example, the panel used in the electronic device according to the present invention may be a member that does not detect the position of contact on the panel by the contacting object (i.e. a member without a sensing function). In an electronic device with such a structure, further providing a pressure detection unit, for example, that detects pressure on the panel allows for determination, based on the pressure detected by the pressure detection unit, that the panel has been contacted.

By vibration of the panel 10c, the above-described electronic device 1h can transmit, to the user, air-conducted sound as well as vibration sound that is transmitted through a part of the user's body (such as the cartilage of the outer ear). Therefore, when sound is output at a volume equivalent to a known dynamic receiver, the sound that is transmitted to the periphery of the electronic device 1h by air vibrations due to vibration of the panel 10c is smaller than with a dynamic receiver. Accordingly, the electronic device 1h is appropriate for listening to recorded messages, for example, on the train or the like.

The above-described electronic device 1h transmits vibration sound by vibration of the panel 10c, and therefore even if the user is wearing earphones or headphones, for example, the user can hear sound through the earphones or headphones and through a part of the body by contacting the electronic device 1h against the earphones or headphones.

The above-described electronic device 1h transmits sound to a user by vibration of the panel 10c. Therefore, if the electronic device 1h is not provided with a separate dynamic receiver, it is unnecessary to form an opening (sound discharge port) for sound transmission in the housing 60, thereby simplifying waterproof construction of the electronic device 1h. On the other hand, if the electronic device 1h is provided with a dynamic receiver, the sound discharge port should be blocked by a member permeable by gas but not liquid. Gore-Tex (registered trademark) is an example of a member permeable by gas but not liquid.

Figure 33A:
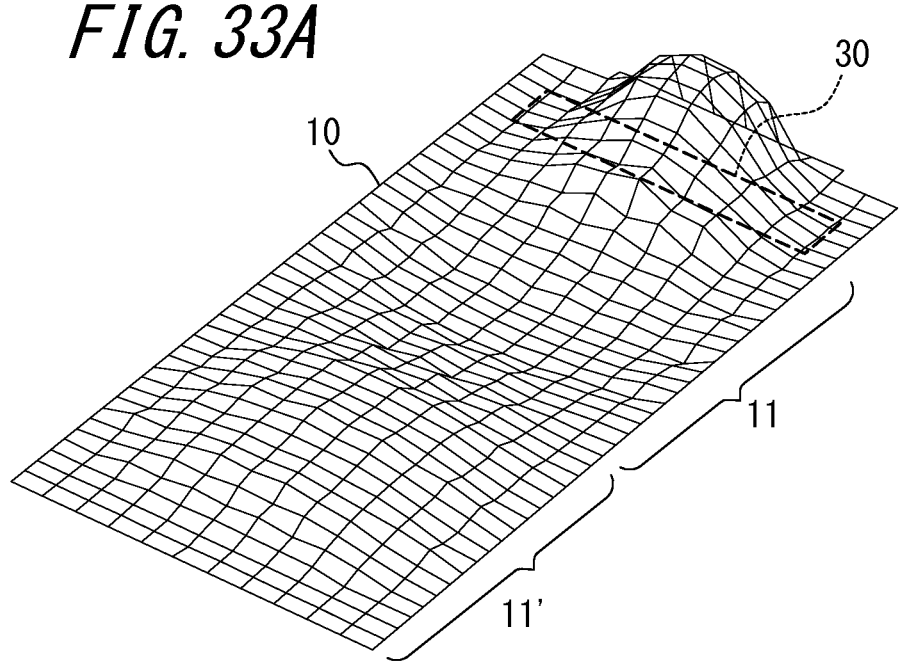
FIGS. 33(a) and 33(b) illustrate an example of vibration of a panel in an electronic device according to the present invention.
Figure 33B:
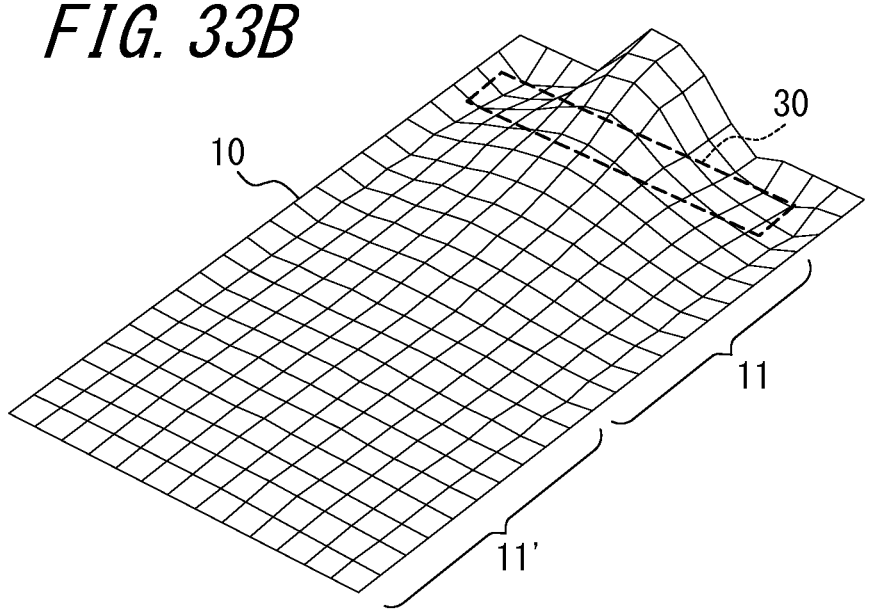

FIGS. 33(a) and 33(b) illustrate an example of vibration of the panel 10 in the electronic device 1 according to the present invention. FIGS. 33(a) and (b) illustrate an example of vibration of the panel 10 when uniform pressure is applied to the panel 10 (FIG. 33(a)), and by comparison, when the pressure from the housing is lessened in the contact region (FIG. 33(b)). The upper part of the panel 10 is bent directly by the piezoelectric element 30, and hence vibration is damped at the lower part as compared to the upper part. The panel 10 is bent by the piezoelectric element 30 in the direction of the long sides of the piezoelectric element 30 such that the portion of the panel 10 immediately above the piezoelectric element 30 rises the highest as compared to adjacent portions. When uniform pressure is applied to the panel 10 from the housing, it is more difficult for the lower part of the panel 10 to vibrate as compared to the upper part of the panel 10 where the piezoelectric element 30 is attached. On the other hand, when the pressure from the housing is lessened in the contact region, not only the region in which the piezoelectric element 30 is attached, but also a region separate from the attachment region vibrates. For example, here, vibration is shown as being transmitted along the longitudinal direction 2a of the panel 10 without being damped as much as in FIG. 33(a). Therefore, in addition to hearing air-conducted sound through the air, the user can hear vibration sound by contacting the ear to any position on the panel 10.

Although the present invention has been described based on embodiments and drawings, it is to be noted that various changes and modifications will be apparent to those skilled in the art based on the present disclosure. Therefore, such changes and modifications are to be understood as included within the scope of the present invention. For example, the functions and the like included in the various members and steps may be reordered in any logically consistent way. Furthermore, components or steps may be combined into one or divided.

REFERENCE SIGNS LIST 1, 1b, 1c, 1d, 1e, 1g, 1h: Electronic device
2b, 2c, 2d, 2e, 2g, 2h: Electronic device
1f: Panel device
10, 10c: Panel
11: Central portion
12: Input detection region
20, 20c: Display unit
30: Vibration unit
31, 31b, 31c, 31h: First piezoelectric element
32, 32b, 32c, 32h: Second piezoelectric element
35g: Pressure detection unit
40: Detection unit
40b, 40c: Input unit
50, 50b, 50c, 50d, 50e, 50f, 50g, 50h: Control unit
51: Signal combiner
52: Band separator
60: Housing
70: Joining member
80d: Proximity sensor
80f: Communication unit
80h: Sensor
90d: Communication unit
90e: Microphone

The invention claimed is:

1. An electronic device comprising:
a panel configured to detect contact;
a first piezoelectric element disposed on the panel; and
a control unit configured to perform control to output sound by driving the first piezoelectric element, wherein
while executing a calling function, the control unit performs control to drive the first piezoelectric element based on an area of the contact detected by the panel,
the control unit performs control to drive the first piezoelectric element when the area of the contact detected by the panel satisfies a predetermined standard,
the predetermined standard is a size of a user's ear, and
the control unit performs control to drive the first piezoelectric element based on whether the area of the contact is equal to or less than the size of the user's ear.

2. The electronic device according to claim 1, further comprising:
a second piezoelectric element disposed on the panel and configured to detect pressure on the panel, wherein
the control unit performs control, based on pressure on the panel, to execute predetermined processing, and
while executing the calling function, the control unit, based on the area of the contact detected by the panel, performs control so that the second piezoelectric element does not detect pressure on the panel and performs control to drive the first piezoelectric element.

* * * * *